United States Patent
Zeyliger et al.

(10) Patent No.: US 9,172,608 B2
(45) Date of Patent: Oct. 27, 2015

(54) CENTRALIZED CONFIGURATION AND MONITORING OF A DISTRIBUTED COMPUTING CLUSTER

(75) Inventors: Philip Zeyliger, San Francisco, CA (US); Philip L. Langdale, Mountain View, CA (US); Patrick D. Hunt, Palo Alto, CA (US)

(73) Assignee: Cloudera, Inc., Palo Alto, CA (US)

( * ) Notice: Subject to any disclaimer, the term of this patent is extended or adjusted under 35 U.S.C. 154(b) by 188 days.

(21) Appl. No.: 13/566,943

(22) Filed: Aug. 3, 2012

(65) Prior Publication Data

US 2013/0204948 A1    Aug. 8, 2013

Related U.S. Application Data

(60) Provisional application No. 61/596,172, filed on Feb. 7, 2012, provisional application No. 61/643,035, filed on May 4, 2012, provisional application No. 61/642,937, filed on May 4, 2012.

(51) Int. Cl.

| | |
|---|---|
| *G06F 15/177* | (2006.01) |
| *G06F 15/173* | (2006.01) |
| *H04L 12/24* | (2006.01) |
| *G06F 9/445* | (2006.01) |
| *H04L 29/08* | (2006.01) |
| *G06F 11/32* | (2006.01) |
| *H04L 12/26* | (2006.01) |

(Continued)

(52) U.S. Cl.
CPC ........ *H04L 41/0816* (2013.01); *G06F 9/44505* (2013.01); *G06F 11/3055* (2013.01); *G06F 11/328* (2013.01); *H04L 41/5041* (2013.01); *H04L 43/0817* (2013.01); *H04L 67/16* (2013.01); *G06F 11/3051* (2013.01); *G06F 11/3409* (2013.01)

(58) Field of Classification Search
CPC ........... G06F 11/3476; G06F 11/3495; G06F 11/3684; G06F 2201/875; G06F 2209/508; H04L 41/046; H04L 41/0896; H04L 41/145; H04L 67/10
USPC ................................................. 709/220–224
See application file for complete search history.

(56) References Cited

U.S. PATENT DOCUMENTS

| | | |
|---|---|---|
| 5,325,522 A | 6/1994 | Vaughn |
| 5,825,877 A | 10/1998 | Dan et al. |
| 6,542,930 B1 | 4/2003 | Auvenshine |

(Continued)

OTHER PUBLICATIONS

Exam Report for GB1403929.1, Applicant: Clouders, Inc, Mailed May 2, 2014, 6 pages.

(Continued)

*Primary Examiner* — Edward Kim
(74) *Attorney, Agent, or Firm* — Perkins Coie LLP

(57) ABSTRACT

Systems and methods for centralized configuration and monitoring of a distributed computing cluster are disclosed. One embodiment of the disclose technology enables deployment and central operation a complete Hadoop stack. The application automates the installation process and reduces deployment time from weeks to minutes. One embodiment further provides a cluster-wide, real time view of the services running and the status of the host machines in a cluster via a single, central place to enact configuration changes across the computing cluster which further incorporates reporting and diagnostic tools to optimize cluster performance and utilization.

17 Claims, 74 Drawing Sheets

(51) Int. Cl.
   *G06F 11/30* (2006.01)
   *G06F 11/34* (2006.01)

(56) References Cited

U.S. PATENT DOCUMENTS

| | | |
|---|---|---|
| 6,553,476 B1 | 4/2003 | Ayaki et al. |
| 6,651,242 B1 | 11/2003 | Hebbagodi et al. |
| 6,678,828 B1 | 1/2004 | Pham et al. |
| 6,687,847 B1 | 2/2004 | Aguilera et al. |
| 6,931,530 B2 | 8/2005 | Pham et al. |
| 7,031,981 B1 | 4/2006 | DeLuca et al. |
| 7,069,497 B1 | 6/2006 | Desai |
| 7,107,323 B2 | 9/2006 | Hara et al. |
| 7,143,288 B2 | 11/2006 | Pham et al. |
| 7,325,041 B2 | 1/2008 | Hara et al. |
| 7,392,421 B1 * | 6/2008 | Bloomstein et al. ............ 714/4.4 |
| 7,487,228 B1 | 2/2009 | Preslan et al. |
| 7,496,829 B2 | 2/2009 | Rubin et al. |
| 7,577,667 B2 | 8/2009 | Zane et al. |
| 7,620,698 B2 | 11/2009 | Hara et al. |
| 7,631,034 B1 | 12/2009 | Haustein et al. |
| 7,640,512 B1 | 12/2009 | Appling |
| 7,653,668 B1 | 1/2010 | Shelat et al. |
| 7,664,729 B2 | 2/2010 | Klein et al. |
| 7,685,109 B1 | 3/2010 | Ransil et al. |
| 7,698,321 B2 | 4/2010 | Hackworth |
| 7,702,610 B2 | 4/2010 | Zane et al. |
| 7,734,961 B2 | 6/2010 | Almoustafa et al. |
| 7,818,313 B1 | 10/2010 | Tsimelzon et al. |
| 7,831,991 B1 | 11/2010 | Kiraly |
| 7,904,809 B2 | 3/2011 | Corning et al. |
| 7,937,482 B1 | 5/2011 | Vermeulen et al. |
| 7,970,861 B2 | 6/2011 | Simitci et al. |
| 7,984,043 B1 | 7/2011 | Waas |
| 8,024,560 B1 | 9/2011 | Alten |
| 8,069,267 B2 | 11/2011 | Powers-Boyle et al. |
| 8,108,338 B2 | 1/2012 | Castro et al. |
| 8,108,771 B2 | 1/2012 | Chijiiwa et al. |
| 8,306,919 B2 | 11/2012 | Sakamura et al. |
| 8,311,980 B2 | 11/2012 | Saito et al. |
| 8,468,244 B2 | 6/2013 | Redlich et al. |
| 8,484,716 B1 | 7/2013 | Hodgson et al. |
| 8,631,403 B2 | 1/2014 | Soundararajan et al. |
| 8,655,939 B2 | 2/2014 | Redlich et al. |
| 8,667,267 B1 | 3/2014 | Garcia et al. |
| 8,732,674 B1 | 5/2014 | Agha |
| 8,788,815 B1 | 7/2014 | Garcia et al. |
| 2002/0055989 A1 | 5/2002 | Stringer-Calvert et al. |
| 2002/0073322 A1 | 6/2002 | Park et al. |
| 2002/0138762 A1 | 9/2002 | Horne |
| 2002/0174194 A1 | 11/2002 | Mooney et al. |
| 2003/0051036 A1 | 3/2003 | Wang et al. |
| 2003/0055868 A1 | 3/2003 | Fletcher et al. |
| 2003/0093633 A1 | 5/2003 | Thiesfeld et al. |
| 2004/0003322 A1 | 1/2004 | Collins et al. |
| 2004/0059728 A1 | 3/2004 | Miller et al. |
| 2004/0103166 A1 | 5/2004 | Bae et al. |
| 2004/0172421 A1 | 9/2004 | Saito et al. |
| 2004/0186832 A1 | 9/2004 | Jardin |
| 2005/0044311 A1 | 2/2005 | Lahiri et al. |
| 2005/0071708 A1 | 3/2005 | Bartfai et al. |
| 2005/0138111 A1 | 6/2005 | Aton et al. |
| 2005/0171983 A1 | 8/2005 | Deo et al. |
| 2005/0182749 A1 | 8/2005 | Matsui |
| 2006/0020854 A1 | 1/2006 | Cardona et al. |
| 2006/0050877 A1 | 3/2006 | Nakamura |
| 2006/0143453 A1 | 6/2006 | Imamoto et al. |
| 2006/0156018 A1 | 7/2006 | Lauer et al. |
| 2006/0224784 A1 | 10/2006 | Nishimoto et al. |
| 2006/0247897 A1 | 11/2006 | Lin |
| 2007/0100913 A1 | 5/2007 | Sumner et al. |
| 2007/0113188 A1 | 5/2007 | Bales et al. |
| 2007/0136442 A1 | 6/2007 | Palma et al. |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0234115 A1 | 10/2007 | Saika |
| 2007/0255943 A1 | 11/2007 | Kern et al. |
| 2007/0282988 A1 | 12/2007 | Bornhoevd et al. |
| 2008/0104579 A1 | 5/2008 | Hartmann |
| 2008/0140630 A1 | 6/2008 | Sato et al. |
| 2008/0168135 A1 | 7/2008 | Redlich et al. |
| 2008/0244307 A1 | 10/2008 | Dasari et al. |
| 2008/0256486 A1 | 10/2008 | Hagiwara |
| 2008/0263006 A1 | 10/2008 | Wolber et al. |
| 2008/0276130 A1 | 11/2008 | Almoustafa et al. |
| 2008/0307181 A1 | 12/2008 | Kuszmaul et al. |
| 2009/0013029 A1 | 1/2009 | Childress et al. |
| 2009/0177697 A1 | 7/2009 | Gao et al. |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0010968 A1 | 1/2010 | Redlich et al. |
| 2010/0070769 A1 | 3/2010 | Shima et al. |
| 2010/0107048 A1 | 4/2010 | Takahara et al. |
| 2010/0131817 A1 | 5/2010 | Kong et al. |
| 2010/0179855 A1 | 7/2010 | Chen et al. |
| 2010/0198972 A1 | 8/2010 | Umbehocker |
| 2010/0296652 A1 | 11/2010 | Nakayama et al. |
| 2010/0306286 A1 * | 12/2010 | Chiu et al. .................... 707/827 |
| 2010/0325713 A1 | 12/2010 | Kurita et al. |
| 2010/0332373 A1 * | 12/2010 | Crabtree et al. ................ 705/37 |
| 2011/0055578 A1 | 3/2011 | Resch |
| 2011/0078549 A1 | 3/2011 | Thueringer et al. |
| 2011/0119328 A1 | 5/2011 | Simitci et al. |
| 2011/0179160 A1 | 7/2011 | Liu et al. |
| 2011/0228668 A1 | 9/2011 | Pillai et al. |
| 2011/0236873 A1 * | 9/2011 | Bowers ......................... 434/362 |
| 2011/0246816 A1 * | 10/2011 | Hsieh et al. .................. 714/4.12 |
| 2011/0246826 A1 * | 10/2011 | Hsieh et al. ..................... 714/20 |
| 2011/0276396 A1 | 11/2011 | Rathod |
| 2011/0276495 A1 | 11/2011 | Varadarajan et al. |
| 2011/0302417 A1 | 12/2011 | Whillock et al. |
| 2011/0307534 A1 | 12/2011 | Peng et al. |
| 2012/0036146 A1 | 2/2012 | Annapragada |
| 2012/0036357 A1 | 2/2012 | Struik |
| 2012/0102072 A1 | 4/2012 | Jia et al. |
| 2012/0130874 A1 | 5/2012 | Mane et al. |
| 2012/0131341 A1 | 5/2012 | Mane et al. |
| 2013/0031240 A1 * | 1/2013 | Byzek ........................... 709/224 |
| 2013/0041872 A1 | 2/2013 | Aizman et al. |
| 2013/0054976 A1 | 2/2013 | Brown et al. |
| 2013/0218840 A1 | 8/2013 | Smith et al. |
| 2013/0304761 A1 | 11/2013 | Redlich et al. |
| 2014/0188841 A1 | 7/2014 | Sun et al. |
| 2014/0195558 A1 | 7/2014 | Murthy et al. |

OTHER PUBLICATIONS

U.S. Appl. No. 13/854,773, filed Apr. 1, 2013, Kirkland et al.

Beomseok Nam et al: "Spatial indexing of distributed multidimensional datasets", Cluster Computing and the Grid, 2005. CCGRID 2005. IEEE International Symposium on Cardiff~ Wales, UK May 9-12, 2005, Piscataway, NJ, USA,IEEE, Piscataway, NJ, USA, vol. 2, May 9, 2005, pp. 743-750.

Chapter 25: Distributed Databases ED—; ; Ramez Elmasri; Shamkant B Navathe (eds), Jan. 1, 2011, Fundamentals of Database Systems (Sixth Edition), Addison-Wesley, pp. 877-927.

Cheng, Security Attack Safe Mobil and Cloud-Based One-Time Password Tokens Using Rubbing Encryption Algorithm, ACM, Jun. 2011, pp. 304-336.

Du et al., "A Pairwise Key Predistribution Scheme for Wireless Sensor Networks," ACM, May 2005, vol. 8 Issue 2, pp. 228-258.

European Search Report for European Application No. 14157984.7, mailing date Jun. 6, 2014, 10 pages.

Kim et al., Design and Implementation of a Private and Public Key Crypto Processor and Its Applicaiton to a Security System, IEEE, Feb. 2004, vol. %0, Issue 1, pp. 214-224.

Ko et al., "A Study of Encryption Algorithm for RFID tag (SEED: 8 Rounds X 64 bit block)," IEEE, s008, pp. 672-677.

(56) References Cited

OTHER PUBLICATIONS

Kossmann D: "The State of the Art in Distributed Query Processing", ACM Computing Surveys, ACM, New York, NY, us, vol. 32, No. 4, Dec. 1, 2000, pp. 422-469.

Non-Final Office Action for U.S. Appl. No. 13/362,695, mailed Apr. 29, 2013, 23 pgs.

Tamer Dzsu et al: "Principles of Distributed Database Systems", Principles of Distributed Database Systems, XX, XX, Jan. 1, 1991, pp. 74-93.

Canada Exam Report for application No. 2843459, mailing date Aug. 5, 2014, 3 pages.

Babaoglu, O., and K. Marzullo, "Consistent global states of distributed systems: Fundamental concepts and mechanisms," *Distributed Systems*, 53 pages, Jan. 1993.

Corbett et al., "Spanner: Google's Globally Distributed Database," *Transactions on Computer Systems (TOCS)*, vol. 31, No. 3, 14 pages, Aug. 2013.

Lamport, L., "Time, clocks, and the ordering of events in a distributed system," *Communications of the ACM*, vol. 21, No. 7, pp. 558-565, Jul. 1978.

Stoller, S.D., "Detecting global predicates in distributed systems with clocks," *Distributed Computing*, vol. 13, No. 2, pp. 85-98, Feb. 2000.

* cited by examiner

| | |
|---|---|
| ✓ Good | For individual health metrics, the returned results are good.<br>For a role or service, this means all health checks for that role or service are Good. |
| ⚠ Concerning | For an individual metric, the returned result indicates a potential problem. Typically this means the test result has gone above (or below) a configured Warning threshold.<br>For a role or service, this means that at least one health check is Concerning. |
| ⊘ Bad | For an individual health metric, the check failed, or the returned result indicates a serious problem. Typically this means the test result has gone above (or below) a configured Critical threshold.<br>For a role or service, this means that at least one health check is Bad. |
| ⊘ Unknown | For a role or service, its health is Unknown. This can occur for a number of reasons, such as the Service Monitor is not running, or connectivity to the agent doing the health monitoring has been lost. |
| ⊘ Checks disabled | Health Checks have been disabled in the configuration for this service or role. |
| ⊘ History unavailable | Cloudera Manager does not support the collection of historical information for this role or service. This is the case for services such as ZooKeeper, Oozie, or Hue — services other than HDFS, MapReduce and HBase. |

*FIG. 40*

| | Started | The service or role is running normally. |
|---|---|---|
| | Started with Outdated Config | For a service, this indicates the service is running, but at least one of its roles is running with a configuration that does not match the current configuration settings in Cloudera Manager. For a role, this indicates a configuration change has been made that requires a restart, and that restart has not yet occurred. |
| | Starting | The service or role is starting up but is not yet running. |
| | Starting with Outdated Config | For a service, this indicates the service is starting up, but at least one of its roles has a configuration that does not match the current configuration settings in Cloudera Manager. For a role, this indicates a configuration change has been made that requires a restart, and that restart has not yet occurred. |
| | Stopping | The service or role is stopping: a stop command has been issued, but the service (and its roles) have not finished shutting down. |
| | Stopped | The role or service is not running. |
| | History Unavailable | Cloudera Manager does not support historical information for this role or service. This is the case for services such as ZooKeeper, Oozie, or Hue — services other than HDFS, MapReduce and HBase. |
| | Unknown | Status of the service or role is not known. |

| | |
|---|---|
| Children | For a Pig, Hive or Oozie activity, this takes you to the Children tab of the individual activity page. You can also go to this page by clicking the activity ID in the activity list. This command only appears for Pig, Hive or Oozie activities. |
| Tasks | For a MapReduce job, this takes you to the Tasks tab of the individual job page. You can also go to this page by clicking the job ID in the activity or activity children list. This command only appears for a MapReduce job. |
| Details | Takes you to the Details tab where you can view the activity or job statistics in report form. |
| Compare | Takes you to the Compare tab where you can see how the selected activity compares to other similar activities in terms of a wide variety of metrics. |
| Task Distribution | Takes you to the Task Distribution tab where you can view the distribution of task attempts that made up this job, by amount of data and task duration. This tab is available for MapReduce and Streaming jobs. |

*FIG. 50B*

| | |
|---|---|
| ◆ | The job has been submitted. |
| ▷ | The job has been started. |
| ✓ | The job has finished successfully. |
| ⊙ | The job has been suspended. |
| ⊗ | The job has failed. |
| ▲ | The job has been killed. |

*FIG. 50C*

| | |
|---|---|
| ▦ | MapReduce job |
| ● | Pig job |
| ◈ | Hive job |
| ■ | Oozie job |
| ◆ | Streaming job |

*FIG. 50D*

| Authorization Manager Application Permissions | Superuser | Group Administrator | User |
|---|---|---|---|
| Add and delete user accounts, and activate or deactivate user accounts? | Yes | Yes, for own groups | No |
| Change any user's password or e-mail address? | Yes | No | No |
| Assign superuser status (privilege) to users? | Yes | No | No |
| Create and assign a home directory to a user? | Yes | No | No |
| Add and delete groups and subgroups? | Yes | Yes, for managed/ administered groups | No |
| Restrict a user from launching an application by configuring group permissions? | Yes | Yes, for own groups | No |
| Assign users to group memberships? | Yes | Yes, for own groups | No |
| View the application access history of users? | Yes | Yes, for own groups | No |
| Change own name information, E-mail address, or password in Authorization Manager? | Yes | Yes | Yes |
| Launch Hue applications? | Yes | Yes (as specified by group permissions) | Yes (as specified by group permissions) |

*FIG. 54*

| User Account Option | Description |
|---|---|
| Username | Specify a user name that contains only letters, numbers, and underscores; blank spaces are not allowed and the name cannot begin with a number. The user name is used to log into Hue and in file permissions and job submissions. This is a required field. |
| Active | Select this option to enable this user account and allow the user to log in. Deselect this option to disable an account without deleting it. |
| First name and Last name | Specify the user's first and last name. |
| E-mail address | Specify the user's e-mail address. The e-mail address is used by the Job Designer and Beeswax applications to send users an e-mail message after certain actions have occurred. The Job Designer sends an e-mail message after a user's job has completed. Beeswax sends a message after a query has completed. If an e-mail address is not specified, the application will not attempt to email the user. |
| Superuser status | Select this option to assign superuser privileges to the user. |
| Password and Password Confirmation | Specify and confirm a password for the user. These are required fields. |
| Create Home Directory | If a home directory for users doesn't already exist, select this option to create one. If you don't select this option, you can create a home directory in the Users list (see Creating a User's Home Directory). |
| Home directory | Specify the path for the user's home directory. You can either type the path or click the button next to this text box to browse and select a directory. The home directory stores files for the user, such as output files for Hive and MapReduce jobs. This is a required field. |
| Groups | Select the group(s) you want to assign to the user. The union of the user's group permissions determine which applications and features the user can use. (If you don't select any group, the user has no permissions to launch any applications or perform any tasks in Cloudera Authorization Manager.)<br>You can select one optional primary group for the user by clicking the radio button next to a group. The primary group is used as the default group associated with an Oozie job submitted by that user, in the event the user does not explicitly set a group to be associated with that job. |

CENTRALIZED CONFIGURATION AND MONITORING OF A DISTRIBUTED COMPUTING CLUSTER

CROSS-REFERENCES TO RELATED APPLICATIONS

This application claims the benefit of, and incorporates by reference, U.S. Provisional Application No. 61/596,172 filed Feb. 7, 2012, and entitled "MANAGING THE SYSTEM LIFECYCLE AND CONFIGURATION OF APACHE HADOOP AND OTHER DISTRIBUTED SYSTEMS,"U.S. Provisional Application No. 61/643,035, filed May 4, 2012, and entitled "MANAGING THE SYSTEM LIFECYCLE AND CONFIGURATION OF APACHE HADOOP AND OTHER DISTRIBUTED SYSTEMS"and U.S. Provisional Application No. 61/642,937, filed May 4, 2012, and entitled "CONFIGURING HADOOP SECURITY WITH CLOUDERA MANAGER,".

BACKGROUND

As powerful and useful as Apache Hadoop is, anyone who has setup up a cluster from scratch is well aware of how challenging it can be: every machine has to have the right packages installed and correctly configured so that they can all work together, and if something goes wrong in that process, it can be even harder to nail down the problem. This is and has been be a serious barrier to adoption of Hadoop as deployment and ongoing administration of a Hadoop stack can be difficult and time consuming.

In addition, deciding which components and versions to deploy based on use cases; assigning roles for nodes; effectively configuring, starting and managing services across the cluster; and performing diagnostics to optimize cluster performance requires significant expertise in modifying service installations and continuously ensuring that all the machines in a cluster are correctly and consistently configured

BRIEF DESCRIPTION OF THE DRAWINGS

FIG. 10-11 depict example screenshots showing the installation process where hosts are selected and added for the computing cluster setup and installation.

FIG. 13 depicts an example screenshot for monitoring the services that are running in a computing cluster.

FIG. 14-15 depict example screenshots showing the configuration process of hosts in a computing cluster including selection of services, selecting host assignments/roles to the services, and showing service configuration recommendations.

FIG. 16A-B depicts example screenshots showing user environments for reviewing configuration changes.

FIG. 22 depicts an example screenshot showing user environment for viewing the configuration history for a service.

FIG. 25 depicts an example screenshot showing user environment for accessing an audit history of a computing cluster and its services.

FIG. 26-27 depicts example screenshots showing user environment for viewing system status, usage statistics, and health information.

FIG. 28 depicts an example screenshot showing user environment for accessing or searching log files.

FIG. 32 depicts an example screenshot showing user environment for viewing health and performance data of an HDFS service.

FIG. 33 depicts an example screenshot showing user environment for viewing a snapshot of system status at the host machine level of the computing cluster.

FIG. 40 depicts a table showing examples of different levels of health metrics and statuses.

FIG. 42 depicts a table showing examples of different service or role configuration statuses.

FIG. 50A depicts an example screenshot showing the user environment for viewing jobs and running job comparisons with similar jobs.

FIG. 50B depicts a table showing the functions provided via the user environment of FIG. 50A.

FIG. 50C-D depict example legends for types of jobs and different job statuses shown in the user environment of FIG. 50A.

Figure 57:
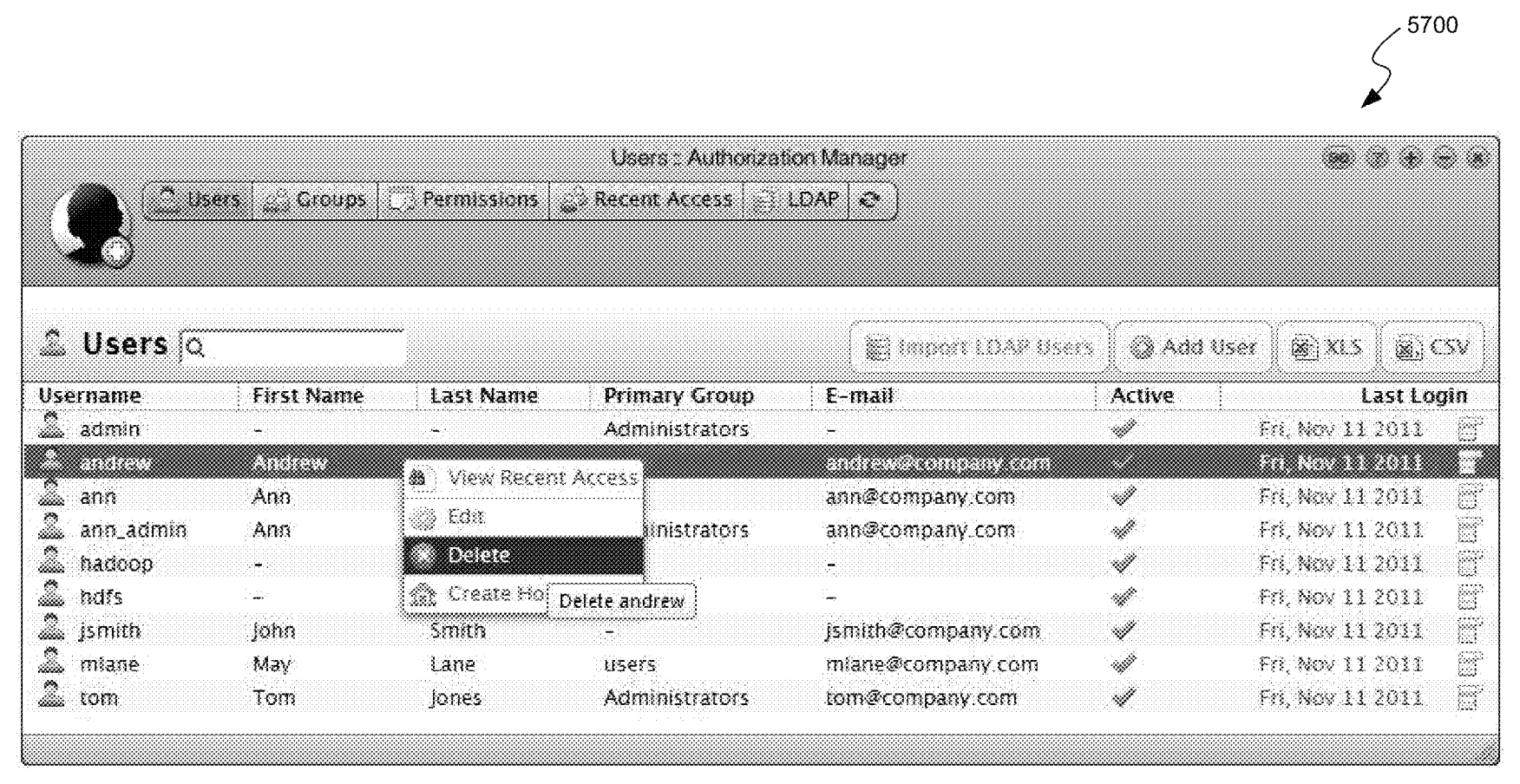

FIG. 53-57 depict example screenshots showing user interfaces for managing user accounts.

FIG. 63-64 depict example screenshots showing user interfaces for managing permissions for applications by service or by user groups.

FIG. 65 depicts an example screenshot showing the user environment for viewing recent access information for users.

DETAILED DESCRIPTION

Figure 1:
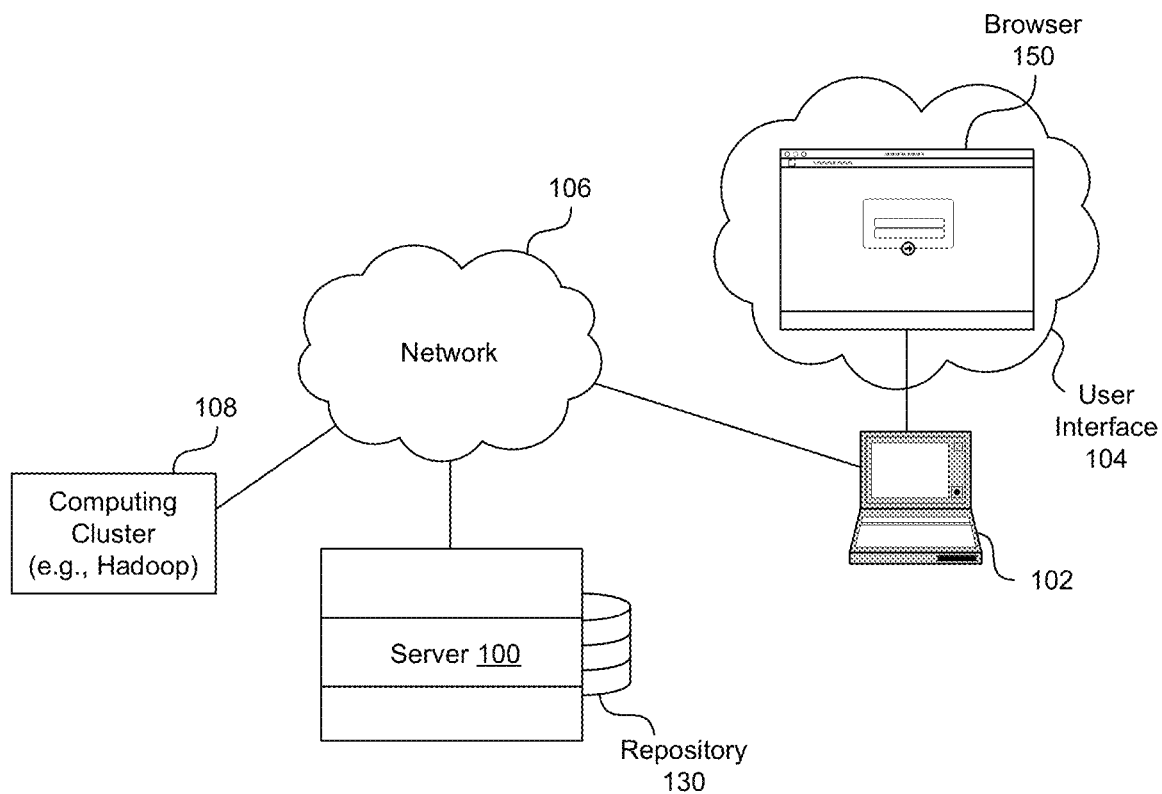
FIG. 1 illustrates a system level block diagram of a computing cluster that centrally configured and monitored by an end user through a user device over a network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for centralized configuration, monitoring, troubleshooting, and/or diagnosing a distributed computing cluster.

FIG. 1 illustrates a system level block diagram of a computing cluster 108 that centrally configured and monitored by an end user through a client device 102 (e.g., via a web browser 150) over a network 106.

The client device 102 can be any system and/or device, and/or any combination of devices/systems that is able to establish a connection with another device, a server and/or other systems. The client device 102 typically includes a display or other output functionalities to present data exchanged between the devices to a user, for example through a user interface 104. The user interface 104 can be used to access a web page via browser 150 used to access an application or console enabling configuration and monitoring of the distributed computing cluster 108.

The console accessed via the browser 150 is coupled to the server 100 via network 106 which is able to manage the configuration settings, monitor the health of the services running in the cluster 108, and monitor or track user activity on the cluster 108. In one embodiment, the console or user environment accessed via browser 150 to control the server 100 which provides an end-to-end management application for frame works supporting distributed applications that run on a distributed computing cluster 108 such as Apache Hadoop and other related services. The server 100 is able to provide granular visibility into and control over the every part of the cluster 108, and enables operators or users to improve cluster performance, enhance quality of service, increase compliance and reduce administrative costs.

The console or user environment provided by the server 100 can allow distributed application frameworks (e.g., Hadoop services) to be easily deploy and centrally operated. The application can automate the installation process, and reduce deployment time from weeks to minutes. In addition, through the console, the server 100 provides a cluster-wide and real time or near real time view of the services running and the status of their hosts. In addition, the server 100, through the console or user environment accessed via a web browser 150 can provide a single, central place to enact configuration changes across the computing cluster and incorporate reporting and diagnostic tools to assist with cluster performance optimization and utilization. Some example functions performed by the server 100 include, for example:

Installs the complete Hadoop stack or other distributed application management frame work in minutes via a wizard-based interface.

Provides end-to-end visibility and control over the computing cluster from a single interface.

Correlates jobs, activities, logs, system changes, configuration changes and service metrics along a timeline to simplify diagnosis.

Allows users to set server roles, configure services and manage security across the cluster.

Allows users to gracefully start, stop and restart of services as needed.

Maintains a complete record of configuration changes with the ability to roll back to previous states.

Monitors dozens of service performance metrics and generates alerts when critical thresholds are approached, reached or exceeded.

Allows users to gather, view and search logs collected from across the cluster.

Creates and aggregates relevant events pertaining to system health, log messages, user services and activities and makes them available for alerting (by email) and searching.

Consolidates cluster activity (user jobs) into a single, real-time view.

Allows users to drill down into individual workflows and jobs at the task attempt level to diagnose performance issues.

Shows information pertaining to hosts in the cluster including status, resident memory, virtual memory and roles.

Provides operational reports on current and historical disk usage by user, group, and directory, as well as service activity (e.g., MapReduce activity) on the cluster by job or user.

Takes a snapshot of the cluster state and automatically sends it to support to assist with problem resolution.

The client device 102 can be, but are not limited to, a server desktop, a desktop computer, a thin-client device, an internet kiosk, a computer cluster, a mobile computing device such as a notebook, a laptop computer, a handheld computer, a mobile phone, a smart phone, a PDA, a Blackberry device, a Treo, and/or an iPhone, etc. In one embodiment, the client device 102 is coupled to a network 106.

In one embodiment, users or developers interact with the client device 102 (e.g., machines or devices) to access the server 100 and services provided therein. Specifically, users, enterprise operators, system admins, or software developers can configure, access, monitor, or reconfigure the computing cluster 108 by interacting with the server 100 via the client device 102. The functionalities and features of user environment which enables centralized configuration and/or monitoring are illustrated with further references to the example screenshots of FIG. 10-FIG. 70.

In operation, end users interact with the computing cluster 108 (e.g., machines or devices). As a results of the user interaction, the cluster 108 can generate datasets such as log files to be collected and aggregated. The file can include logs, information, and other metadata about clicks, feeds, status updates, data from applications, and associated properties and attributes. The computer cluster 108 can be managed under the Hadoop framework (e.g., via the Hadoop distributed file system or other file systems which may be distributed file systems, non-distributed file systems, distributed fault-tolerant file systems, parallel file systems, peer-to-peer file systems, including but not limited to, CFS, Unilium, OASIS, WebDFS, CloudStore, Cosmos, dCache, Parallel Virtual File System, Starfish, DFS, NFS, VMFS, OCFS, CXFS, DataPlow SAN File System, etc.). Such log files and analytics can be accessed or manipulated through applications hosted by the server 100 (e.g., supported by the Hadoop framework, Hadoop services, or other services supporting distributed applications and clusters).

The network 106, over which the client device 102, server 100, and cluster 208 communicate may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and may appear as one or more networks to the serviced systems and devices. In one embodiment, communications to and from the client device 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 106 broadly includes anything from a minimalist coupling of the components illustrated in the example of FIG. 1, to every component of the Internet and networks coupled to the Internet.

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client device 102 can be coupled to the network (e.g., Internet) via a dial up connection, a digital subscriber loop (DSL, ADSL), cable modem, and/or other types of connection. Thus, the client device 102 can communicate with remote servers (e.g., web server, host server, mail server, and instant messaging server) that provide access to user interfaces of the World Wide Web via a web browser, for example.

The repository 130, though illustrated to be coupled to the server 100, can also be coupled to the computing cluster 108, either directly or via network 106. In one embodiment, the repository 130 can store catalog of the available host machines in the cluster 108, and the services, roles, and configurations assigned to each host.

The repository 130 can additionally store software, descriptive data, images, system information, drivers, collected datasets, aggregated datasets, log files, analytics of collected datasets, enriched datasets, etc. The repository may be managed by a database management system (DBMS), for example but not limited to, Oracle, DB2, Microsoft Access, Microsoft SQL Server, MySQL, FileMaker, etc.

The repository can be implemented via object-oriented technology and/or via text files, and can be managed by a distributed database management system, an object-oriented database management system (OODBMS) (e.g., Concept-Base, FastDB Main Memory Database Management System, JDOInstruments, ObjectDB, etc.), an object-relational database management system (ORDBMS) (e.g., Informix, Open-Link Virtuoso, VMDS, etc.), a file system, and/or any other convenient or known database management package.

Figure 2:
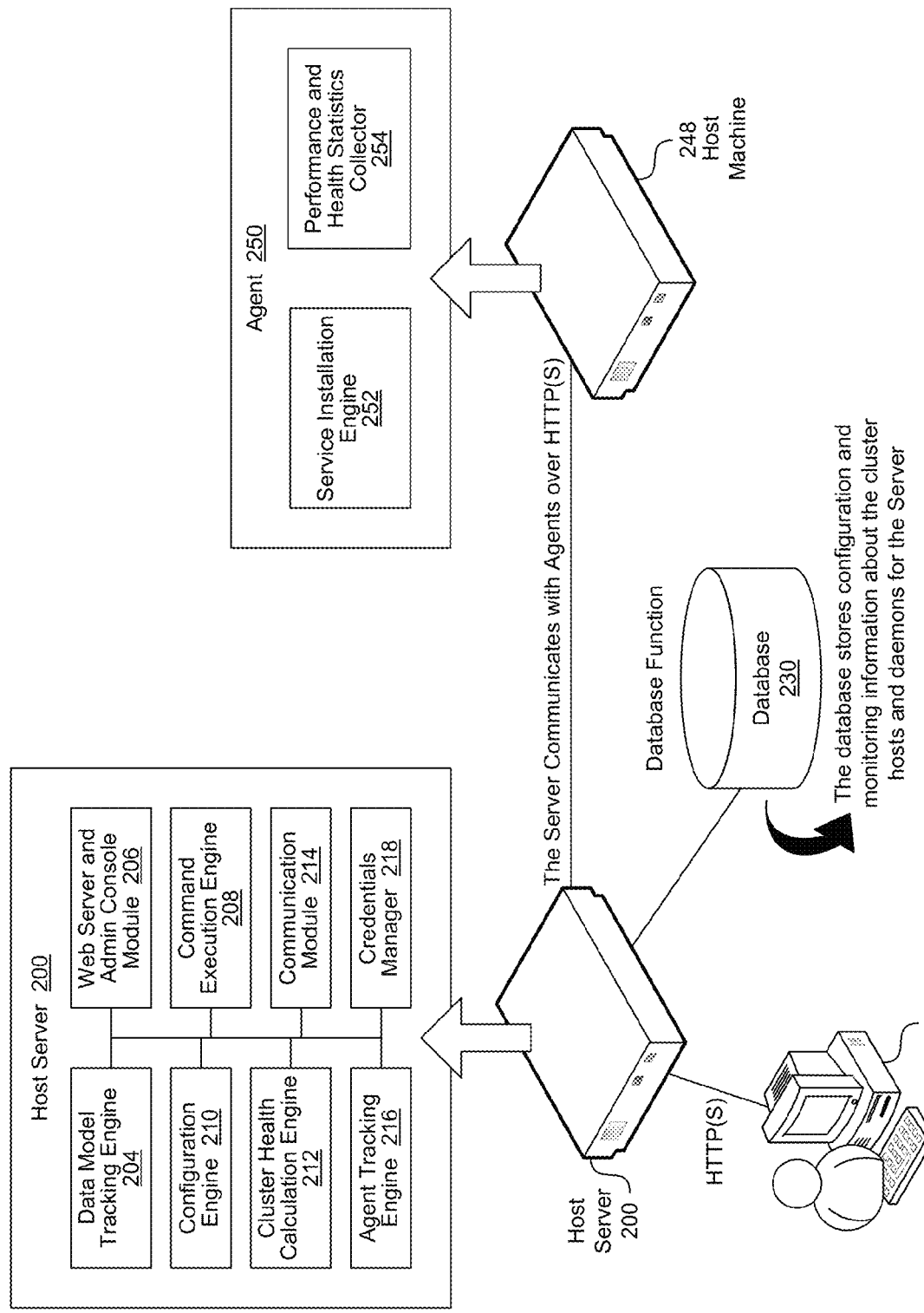
FIG. 2 depicts an architectural view of a system having a host server and an agent for centralized configuration and monitoring of a distributed computing cluster.

FIG. 2 depicts an architectural view of a system having a host server 200 and an agent 250 for centralized configuration and monitoring of a distributed computing cluster.

Figure 3:
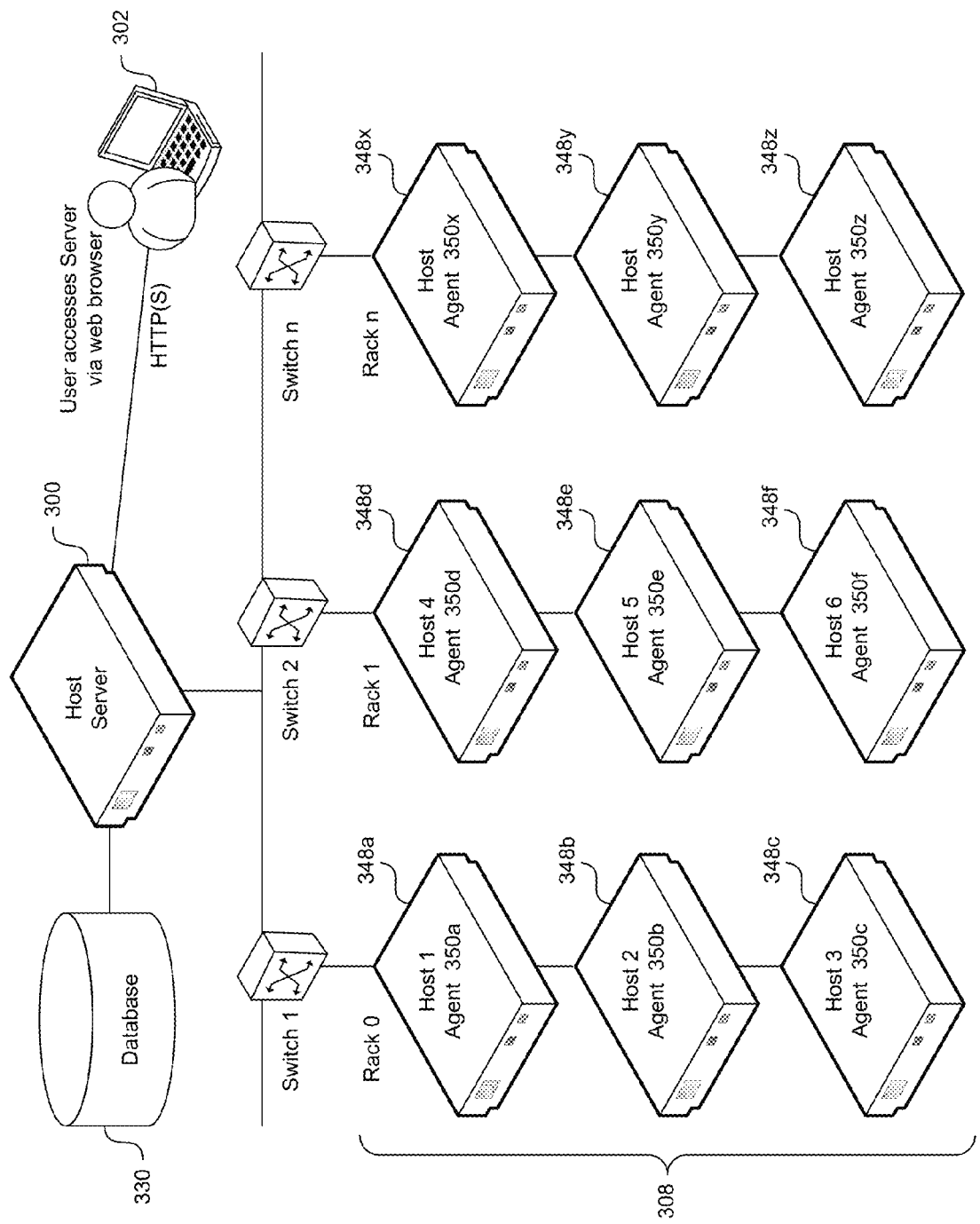
FIG. 3 depicts an example of a distributed computing cluster that is configured and monitored by a host server in a centralized fashion and agents distributed among the hosts in the cluster.
Figure 4:
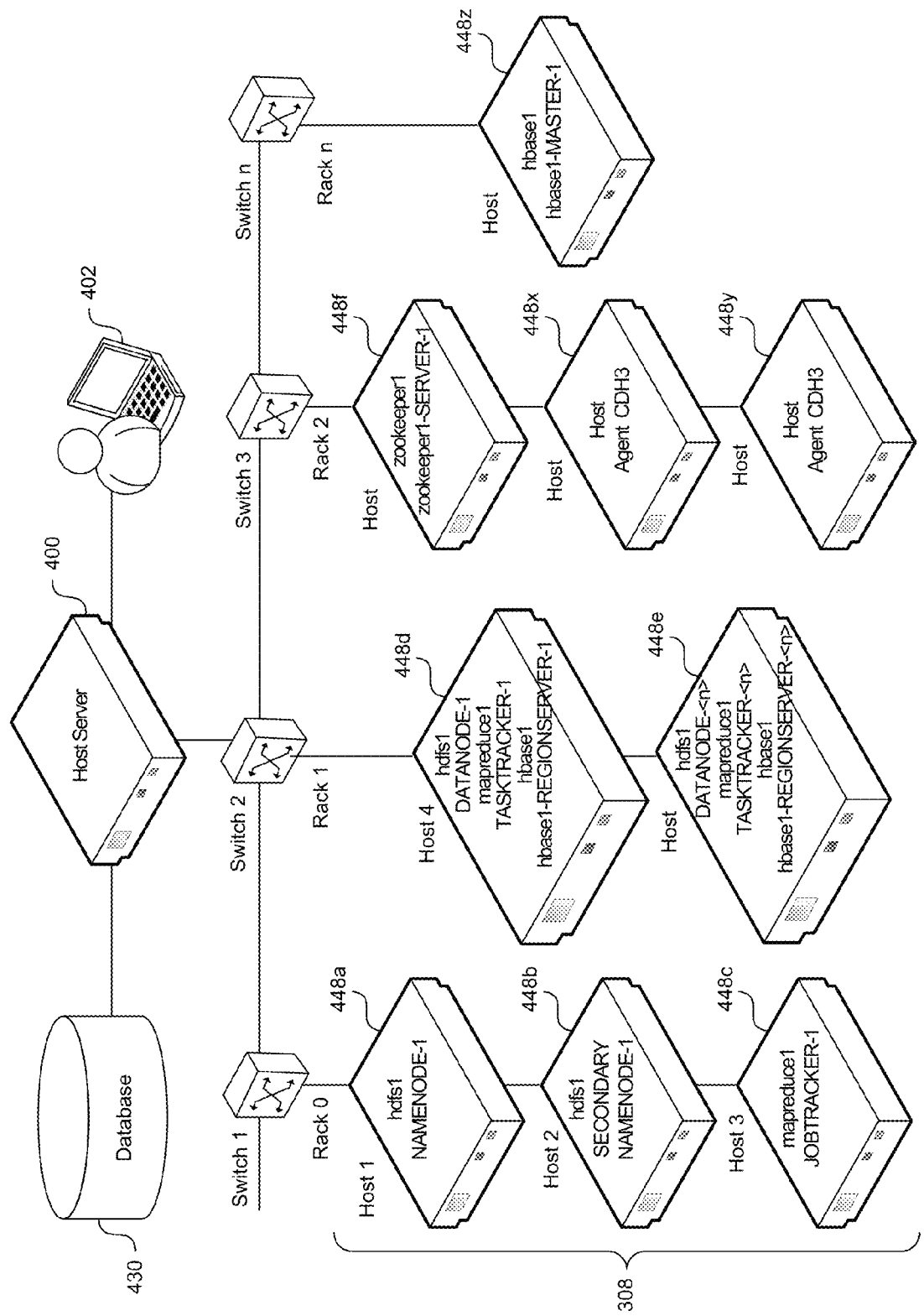
FIG. 4 depicts another example of a distributed computing cluster that is configured and monitored by a host server in a centralized fashion and agents distributed among the hosts in the cluster.

The system includes the host server 200 components and the agent 250 components on each host machine 248 which is part of a computing cluster (e.g., as shown in the examples of FIG. 3 and FIG. 4). The host server 200 can track the data models (e.g., by the data model tracking engine 204), which can be stored in the database 230. The data model can include a catalog of the available host machines in the cluster, and the services, roles, and configurations that are assigned to each host.

In addition, the host server 200 performs the following functions: communicates with agents (e.g., by the communication module 214) to send configuration instructions and track agents' 250 heartbeats (e.g., by the agent tracking engine 216), performs command execution (e.g., by the command execution engine 208) to perform tasks in the cluster, provides a console for the operator (e.g., by the web server and admin console module 206) to perform management and configuration tasks.

In addition, the host server 200 creates, reads, validates, updates, and deletes configuration settings or generates recommended configuration settings based on resources available to each machine in the cluster. For example, through the console or user environment, the user or operator can view the suggested ranges of values for parameters and view the illegal values for the parameters. In addition, override settings can also be configured on specific hosts through the user environment.

The host server 200 further calculates and displays health of cluster (e.g., by the cluster health calculation engine 212), tracks disk usage, CPU, and RAM, manages monitors the health of daemons (e.g., Hadoop daemons), generates service performance metrics, generates/delivers alerts when critical thresholds are detected. In addition, the host server 200 can generate and maintain a history of activity monitoring data and configuration changes Agents 250 can be deployed to each machine in a cluster. The agents are configured by the host server 200 with settings and configuration settings for services and roles assigned to each host machine in the cluster. Each agent 250 starts and stops Hadoop daemons (e.g., by the service installation engine 252) on the host machine and collects statistics (overall and per-process memory usage and CPU usage, log tailing) for health calculations and status (e.g., by the performance and health statistics collector 254) in the console. In one embodiment, the agent 250 runs as root on a host machine in a cluster to ensure that the required directories are created and that processes and files are owned by or associated with the appropriate user (for example, the HDFS user and MapReduce user) since multiple users can access any given cluster and start any service (e.g., Hadoop services).

FIG. 3 depicts an example of a distributed computing cluster 308 that is configured and monitored by a host server 300 using agents 350 distributed among the host machines 348 in the computing cluster 308.

To use the console for centralized configuration and monitoring of the cluster 308, a database application can be installed on the host server 300 or on one of the machines 348 in the cluster 308 that the server 300 can access. In addition, Hadoop or other distributed application frameworks and the agents 350 are installed on the other host machines 348 in the cluster 308.

FIG. 4 depicts an example of how the console/user environment can be used to configure the host machines 448 in the computing cluster 408 for the various instances of services and roles.

During installation, the first run of a wizard is used to add and configure the services (e.g., Hadoop services) to be run on the hosts 448 in the cluster 408. After the first run of the wizard, the console can be used and accessed to reconfigure the existing services, and/or to add and configure more hosts and services. In general, when a services is added or configured, an instance of that service is running in the cluster 408 and that the services can be uniquely configured and that multiple instances of the services can be run in the cluster 408.

After a service has been configured, each host machine 448 in the cluster 408 can then be configured with one or more functions (e.g., a "role") for it to perform under that service. The role typically determines which daemons (e.g., Hadoop daemons) are run on which host machines 448 in the cluster 408, which is what defines the role the host machine performs in the Hadoop cluster. For example, after an HDFS service instance called hdfs1 is configured, one host machine 448a can be configured or selected to run as a NameNode, another host 448b to run as a Secondary NameNode, another host to run as a Balancer, and the remaining hosts as DataNodes (e.g., 448d and 448e).

This configuration process adds role instances by selecting or assigning instances of each type of role (NameNode, DataNode, and so on) to hosts machines 448 in the cluster 408. In this example, these roles instances run under the hdfs1 service instance. In another example, a Map/Reduce service instance called mapreduce1 can be configured. To run under mapreduce1, one host 448c to run as a JobTracker role instance, other hosts (e.g., 448d and 448e) to run as TaskTracker role instances.

As shown in the example of FIG. 4, hdfs1 is the name of an HDFS service instance. The associated role instances in this example are called NAMENODE-1, SECONDARYNAMENODE-1, DATANODE-1, and DATANODE-<n>, which run under the hdfs1 service instance on those same hosts. Note that although the illustration only shows two DataNode hosts, the cluster 408 can include any number of DataNode hosts. Similarly, mapreduce1, zookeeper1, and hbase1 are examples of service instances that have associated role instances running on hosts 448 in the cluster 408 (for example, JOBTRACKER-1, zookeeper-1-SERVER-1, and hbase1-MASTER-1).

Furthermore, additional tasks to manage, configure and supervise daemons (e.g., Hadoop daemons) on host machines 448 can be performed. For example, the first time the console is used or started, a wizard can be launched to install a distributed application management framework (e.g., any Hadoop distribution) and JDK on the host machines 448 and to configure and start services.

In general, after the first run, the console/user environment can further used to configure the distributed application framework (e.g., Hadoop) using or referencing suggested ranges of values for parameters and identified illegal values, start and stop Hadoop daemons on the host machines 448, monitor the health of the commuting cluster 408, view the daemons that are currently running, add and reconfigure services and role instances.

The console can further, for example, display metrics about jobs, such as the number of currently running tasks and their CPU and memory usage, display metrics about the services (e.g., Hadoop services) such as the average HDFS I/O latency and the number of jobs running concurrently, display metrics about the cluster 408, such as the average CPU load across all machines 448.

In one embodiment, the console can be used to specify dependencies between services such that configuration changes for a service can be propagated to its dependent service. In one embodiment, the host server 400 can automatically detect or determine dependences between different services that are run in the cluster 408.

Furthermore, configuration settings can be imported and exported to and from clusters 408 by the host server 400 can controlled via the console at device 402. The server can also generate configurations (e.g., Hadoop configurations) for clients to use to connect to the cluster 408, and/or manage rack locality configuration. For example, to allow Hadoop client users to work with the HDFS, MapReduce, and HBase services, a zip file that contains the relevant configuration files with the settings for services can be generated and distributed to other users of a given service. In one embodiment, the host server 400 is able to collapse several levels of Hadoop configuration abstraction into one. For example, Java heap usage can be managed in the same place as Hadoop-specific parameters.

Note that one of the aspects of Hadoop configuration is what machines are physically located on what rack. This is an approximation for network bandwidth: there is more network bandwidth within a rack than across racks. It is also an approximation for failure zones, for example, if there is one switch per rack, and if that switch has a failure, then the entire rack is out. Hadoop places files in such a way that a switch failure can typically be tolerated. Rack locality configuration services tells which hosts are in what racks and allows the system to tolerate single switch failures.

Figure 5:
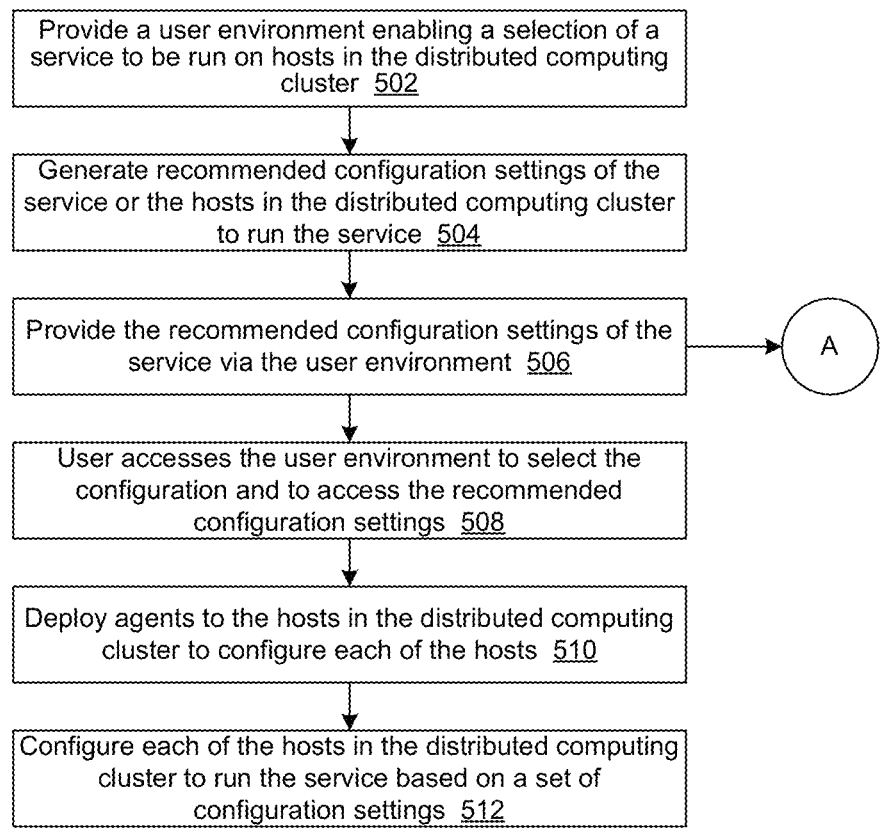
FIG. 5 depicts a flowchart of an example process for centralized configuration of a distributed computing cluster.

FIG. 5 depicts a flowchart of an example process for centralized configuration of a distributed computing cluster.

In process 502, a user environment enabling a selection of a service to be run on hosts in the distributed computing cluster is provided. In one embodiment, the user environment is accessed via a web browser on any user device by a user, system admin, or other operator, for example. The service includes one or more Hadoop services including by way of example but not limitation, Hbase, Hue, ZooKeeper and Oozie, Hadoop Common, Avro, Cassandra, Chukwa, Hive, Mahout, and Pig.

In process 504, recommended configuration settings of the service or the hosts in the distributed computing cluster to run the service are generated. In process 506, the recommended configuration settings of the service are provided via the user environment. The recommended configuration settings can include, for example, suggested ranges for parameters and invalid values for the parameters.

In one embodiment, the user environment further enables configuration of the service or hosts in the distributed computer cluster. Additional features/functions provided via the user environment are further illustrated at Flow 'A' in FIG. 6. In process 508, a user accesses the user environment to select the configuration and/or to access the recommended configuration settings. In process 510, agents are deployed to the hosts in the distributed computing cluster to configure each of the hosts. In process 512, each of the hosts in the distributed computing cluster is configured to run the service based on a set of configuration settings.

Figure 6:
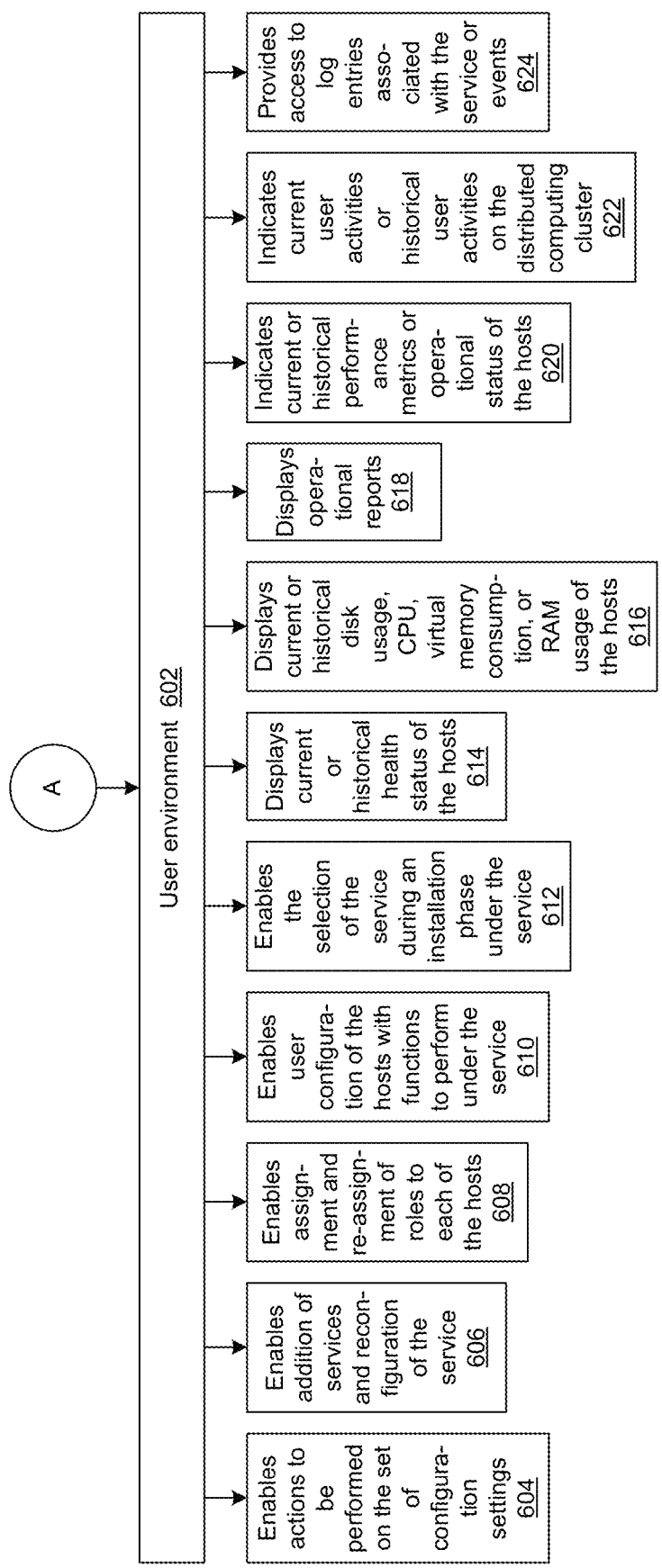
FIG. 6 graphically depicts a list of configuration, management, monitoring, and troubleshooting functions of a computing cluster provided via console or administrative console.

FIG. 6 graphically depicts a list of configuration, management, monitoring, and troubleshooting functions of a computing cluster provided via console or administrative console depicted in user environment 602.

The console enables actions to be performed on the set of configuration settings 604, the actions can include, for example, one or more of, reading, validating, updating, and deleting the configuration settings. Such actions can typically be performed at any time before installation, during installation, during maintenance/downtown, during run time/operation of the services or Hadoop-based services in a computing cluster. The Hadoop services include one or more of, MapReduce, HDFS, Hue, ZooKeeper and Oozie.

The console enables addition of services and reconfiguration of the service 606, including selection of services during installation or subsequent reconfiguration. The console enables assignment and re-assignment of roles to each of the hosts 608, as illustrated in the example screenshots of FIG. 14-FIG. 15. The console enables user configuration of the hosts with functions to perform under the service 610, as illustrated in the example screenshots of FIG. 16A-16B.

Figure 14:
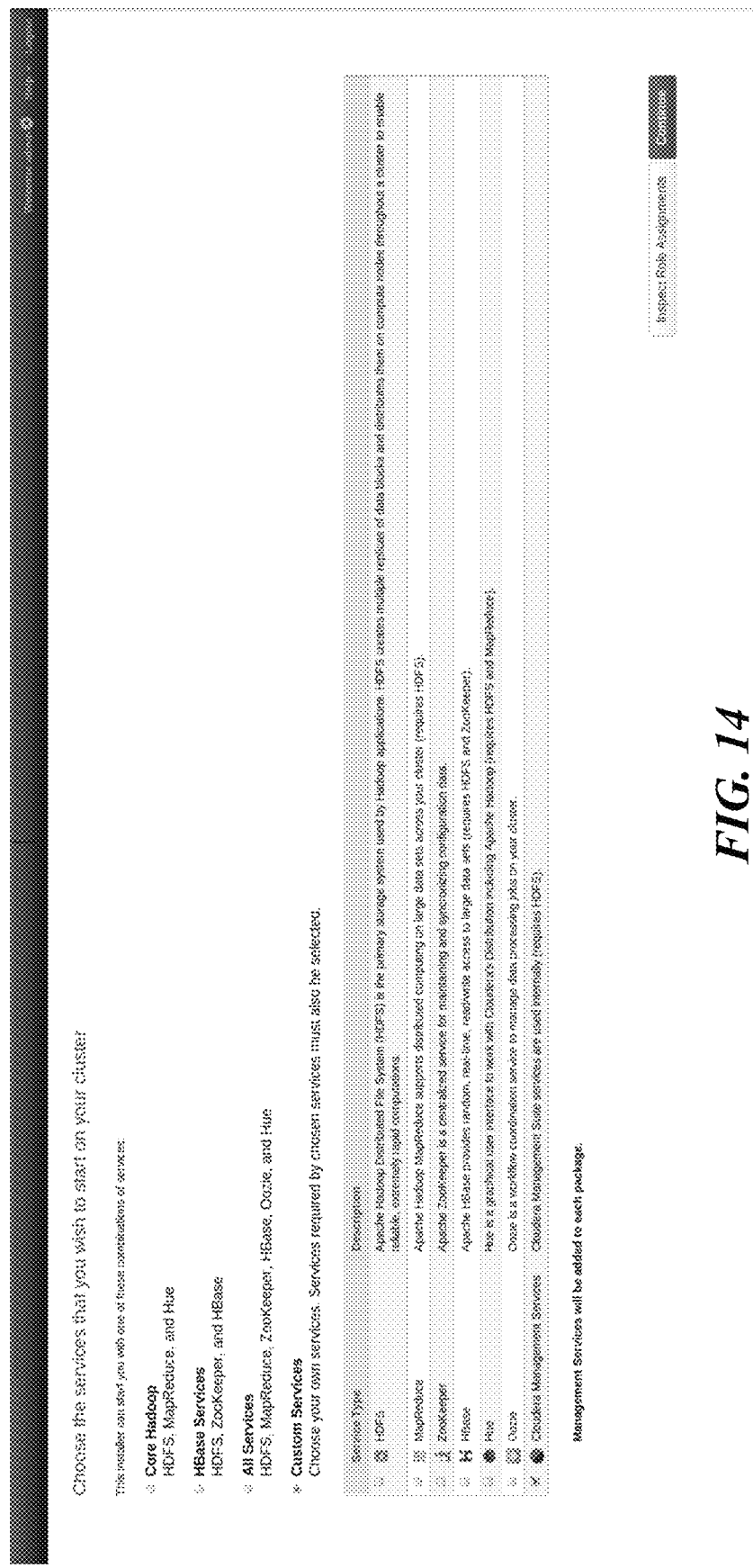

The console enables the selection of the service during an installation phase under the service 612, as illustrated in the example screenshots of FIG. 14. The console displays current or historical health status of the hosts 614, and can further indicate, one or more of, current or historical performance metrics of the service, a history of actions performed on the service, or a log of configuration changes of the service.

Figure 50A:
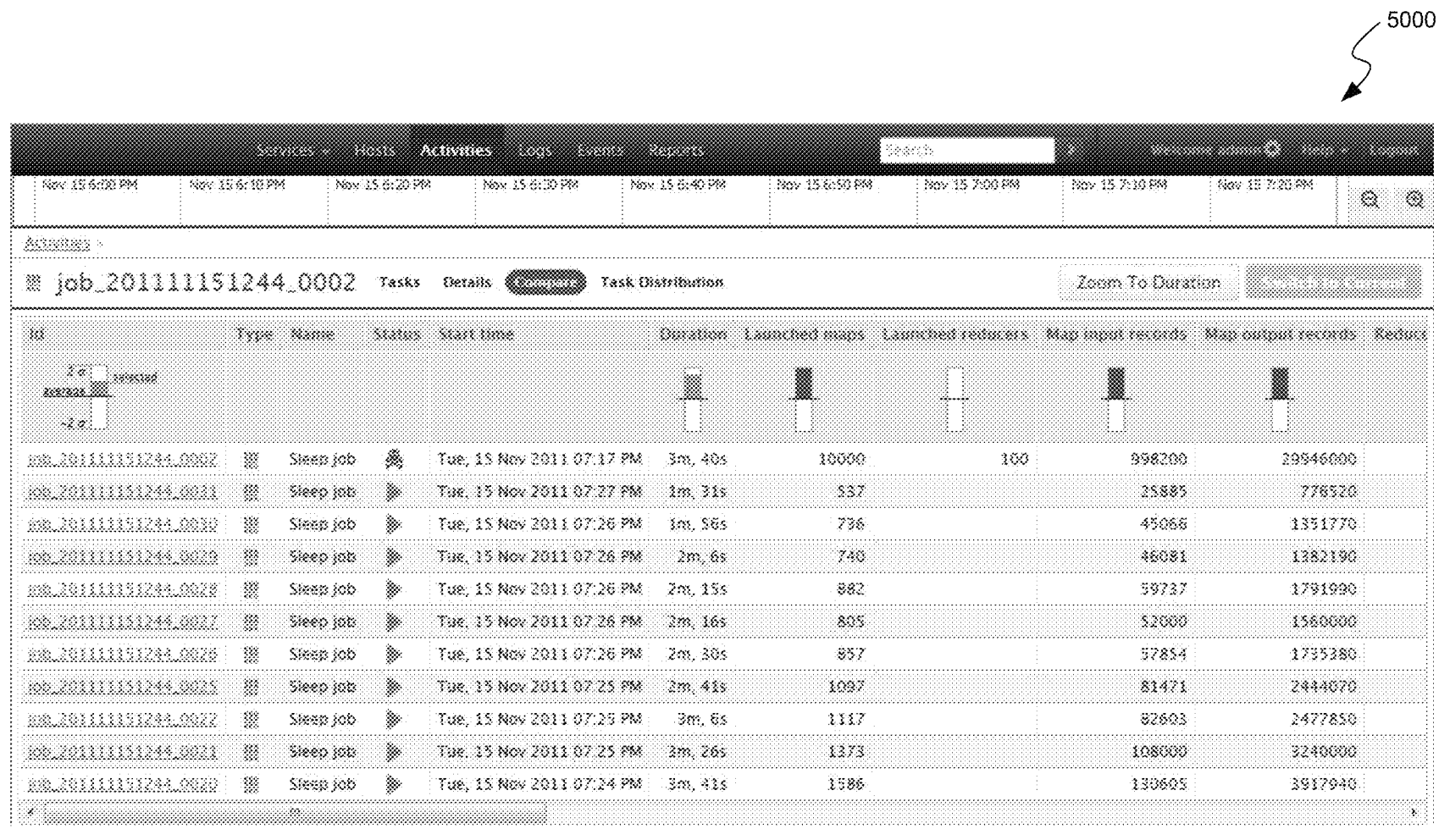

In one embodiment, the user environment further displays performance metrics of a job or comparison or performance of similar jobs, as illustrated in the example screenshot of FIG. 50A. The console displays current or historical disk usage, CPU, virtual memory consumption, or RAM usage of the hosts 616, as illustrated in the example screenshot of FIG. 31.

The console displays operational reports 618. The operational reports can include one or more of, disk use by user, user group, or directory, cluster job activity by user, group or job ID. The console indicates current or historical performance metrics or operational status of the hosts 620, as illustrated in the example screenshot of FIG. 37. The console can also indicate current user activities or historical user activities on the distributed computing cluster 622, and can further display a history of activity monitoring data and configuration changes of the hosts in the distributed computing cluster.

The console provides access to log entries associated with the service or events 624, as illustrated in the example screenshot of FIG. 28. Events can include any record that something of interest has occurred—a service's health has changed state, a log message (of the appropriate severity) has been logged, and so on. The system can aggregates Hadoop events and makes them available for alerting and for searching.

Thus, a history of all relevant events that occur cluster-wide can be generated and provided. The events can include, for example, a record of change of state of health of the server, a message has been logged, a service has been added or reconfigured, a new job has been setup, an error, a change in operational or on/off state of a given host. The events can further, one or more of, a health check event, a log message event, an audit event, and an activity event.

Health check events can include, occurrence of certain health check activities, or that health check results have met specific conditions (thresholds). Log message events can include events generated for certain types of log messages from HDFS, MapReduce, or HBase services and roles. Log events are created when a log entry matches a set of rules for messages of interest. In general, audit events are generated by actions taken by the management system, such as creating, deleting, starting, or stopping services or roles. Activity events can include events generated for jobs that fail, or that run slowly (as determined by comparison with duration limits)

In one embodiment, the events are searchable via the user environment. The user environment further enables search or filtering of the log entries by one or more of, time range, service, host, keyword, and user.

Figure 7:
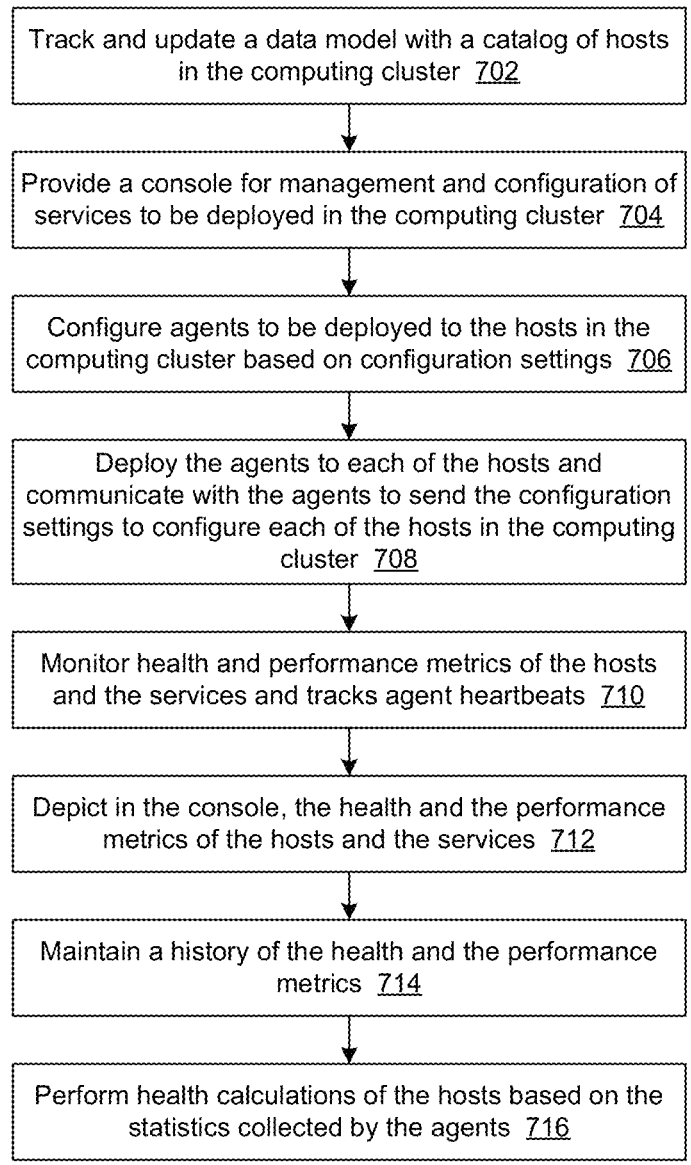
FIG. 7 depicts a flowchart of an example process of a server to utilize agents to configure and monitor host machines in a computing cluster.

The user environment can further depict alerts triggered by certain events or actions in the distributed computing cluster. In one embodiment, the user environment further enables configuration of delivery of alerts. For any given service or role instance, summary level alerts and/or individual health check alerts can be enabled or disabled. Summary alerts can be sent when the overall health for a role or service becomes unhealthy. Individual alerts occur when individual health checks for the role or service fail or become critical. For example, service instances of type HDFS, MapReduce, and HBase can generate alerts if so configured FIG. 7 depicts a flowchart of an example process of a server to utilize agents to configure and monitor host machines in a computing cluster.

In process 702, a data model with a catalog of hosts in the computing cluster is tracked and updated. In one embodiment, the data model is stored in a repository coupled to the server. The data model can specify, one or more of, services, roles, and configurations assigned to each of the hosts. The data model can further store configuration or monitoring information regarding the daemons on each of the hosts.

In process 704, a console for management and configuration of services to be deployed in the computing cluster is provided. In process 706, agents to be deployed to the hosts in the computing cluster are configured based on configuration settings.

In process 708, the agents are deployed to each of the hosts and communicate with the agents to send the configuration settings to configure each of the hosts in the computing cluster. The processes performed by the agents are further illustrated in the example flow chart of FIG. 8.

In process 710, health and performance metrics of the hosts and the services are monitored and agent heartbeats are tracked. In process 712, the health and the performance metrics of the hosts and the services are depicted in the console. In process 714, a history of the health and the performance metrics is maintained. In process 716, health calculations of the hosts are performed based on the statistics collected by the agents.

Figure 8:
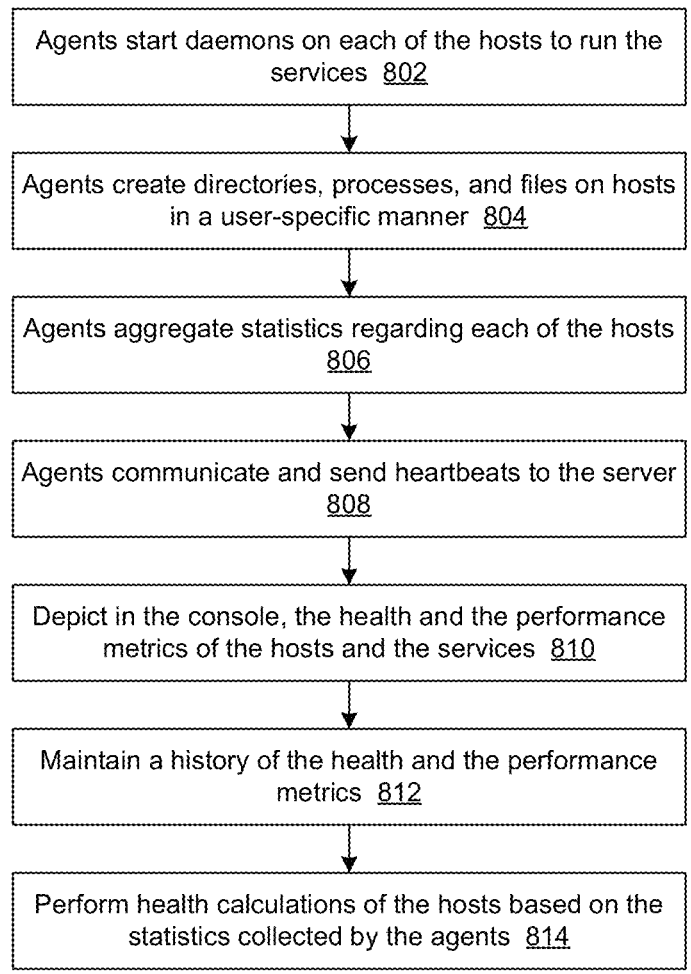
FIG. 8 depicts a flowchart showing example functions performed by agents at host machines in a computing cluster for service configuration and to enable a host to compute health and performance metrics.

FIG. 8 depicts a flowchart showing example functions performed by agents at host machines in a computing cluster for service configuration and to enable a host to compute health and performance metrics.

In process 802, agents start daemons on each of the hosts to run the services. In process 804, directories, processes, and files are created on hosts in a user-specific manner. In process 806, the agents aggregate statistics regarding each of the hosts. In process 808, the agents communicate and send heartbeats to the server.

Agent heartbeat interval and timeouts to trigger changes in agent health status can be configured. For example, The interval between each heartbeat that is sent from agents to the host server can be set. If an agent fails to send this number of heartbeats fail x number of consecutive heartbeats to the Server, a concerning health status is assigned to that agent. Similarly, if an Agent fails to send a certain number of expected consecutive heartbeats to the Server, a bad health status can be assigned to that agent.

In process 810, the health and the performance metrics of the hosts and the services are depicted in a console. In process 812, a history of the health and the performance metrics are maintained. In process 814, health calculations of the hosts are performed based on the statistics collected by the agents.

Figure 9:
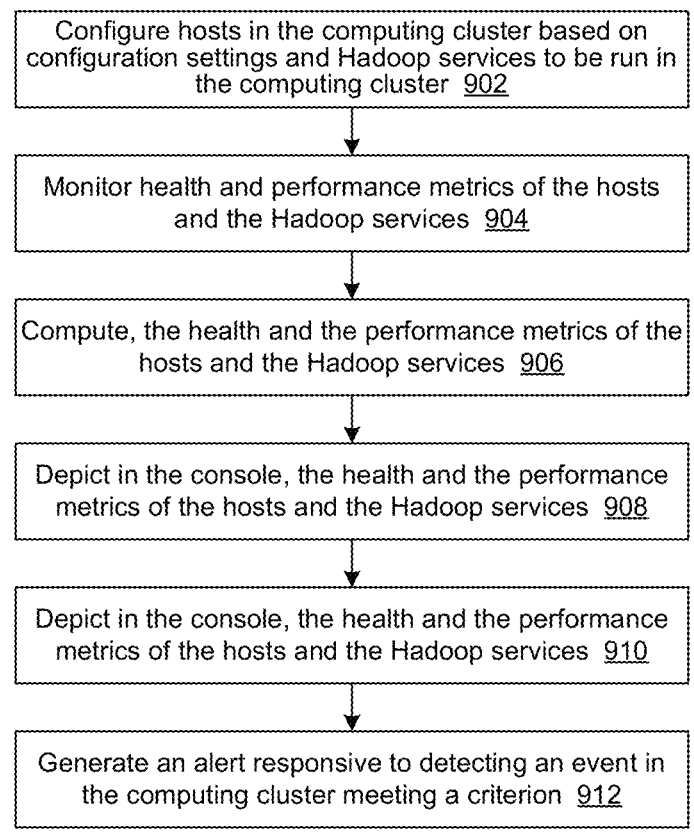
FIG. 9 depicts a flowchart of an example process for centralized configuration, health, performance monitoring, and event alerting of a distributed computing cluster.

FIG. 9 depicts a flowchart of an example process for centralized configuration, health, performance monitoring, and event alerting of a distributed computing cluster.

In process 902, hosts in the computing cluster are configured based on configuration settings and Hadoop services to be run in the computing cluster. The configuration settings can be specified via a console accessible via a web interface. In one embodiment, enablement of selection of a service during installation to be run on hosts in the distributed computing cluster is provided via the console. In addition, recommended configuration settings of the Hadoop service or the hosts in the computing cluster to run the service can be provided via the console.

In process 904, health and performance metrics of the hosts and the Hadoop services are monitored. In process 906, the health and the performance metrics of the hosts and the Hadoop services are computed. In process 908, the health and the performance metrics of the hosts and the Hadoop services are depicted in the console. In general, the health and the performance metrics include current information regarding the computing cluster in real time or near real time. The health and the performance metrics can also include historical information regarding the computing cluster.

In process 910, an event in the computing cluster meeting a criterion or threshold is detected. In process 912, an alert is generated. Alerts can be delivered via any number of electronic means including, but not limited to, email, SMS, instant messages, etc. The system can be configured to generate alerts from a variety of events. In addition, thresholds can be specified or configured for certain types of events, enabled/disabled, and configured for push delivery of on critical events.

Figure 10:
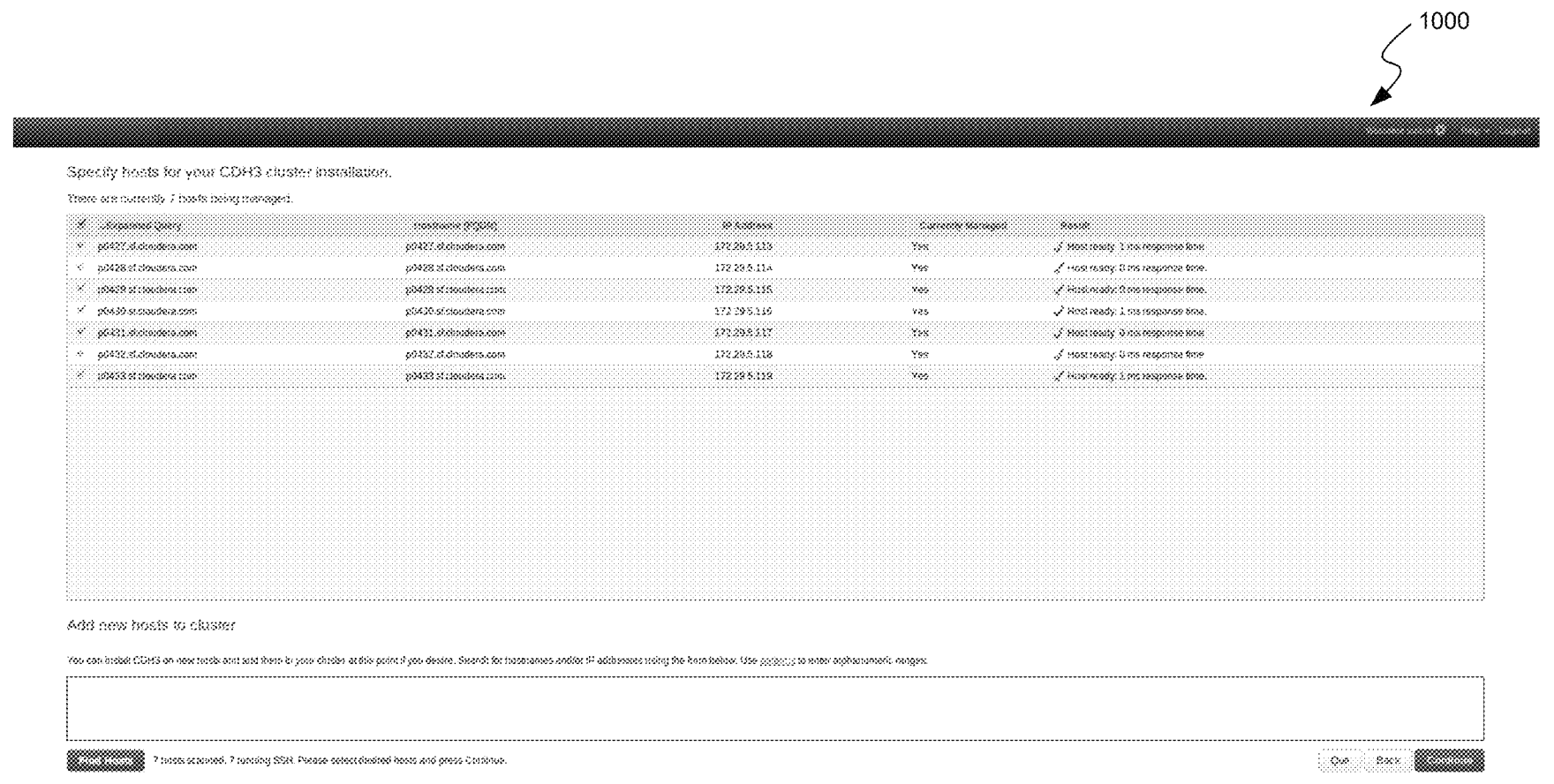
Figure 11:
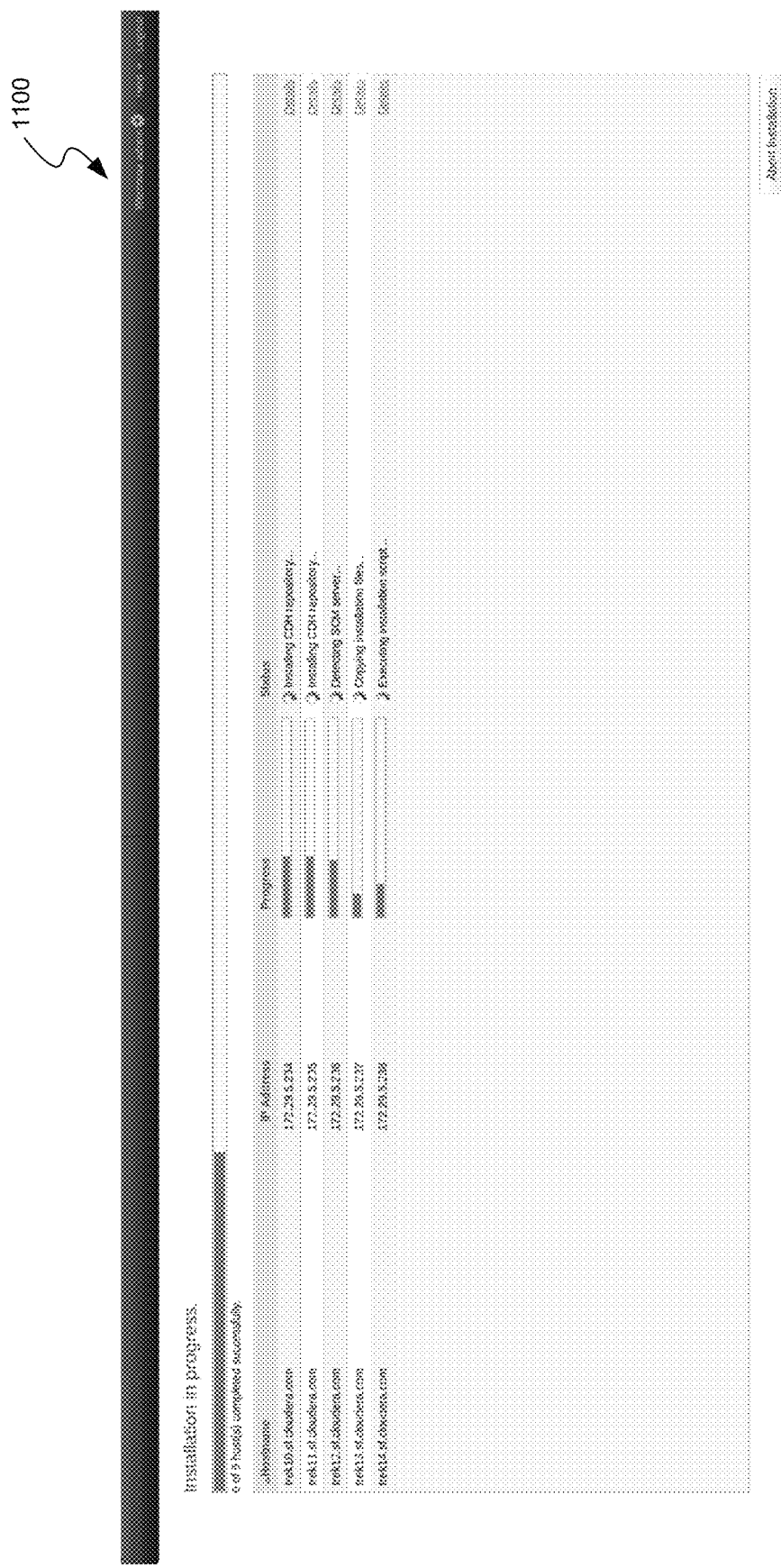

FIG. 10-11 depict example screenshots showing the installation process where hosts are selected 1000 and added for the computing cluster setup and installation of packages 1100.

Figure 12:
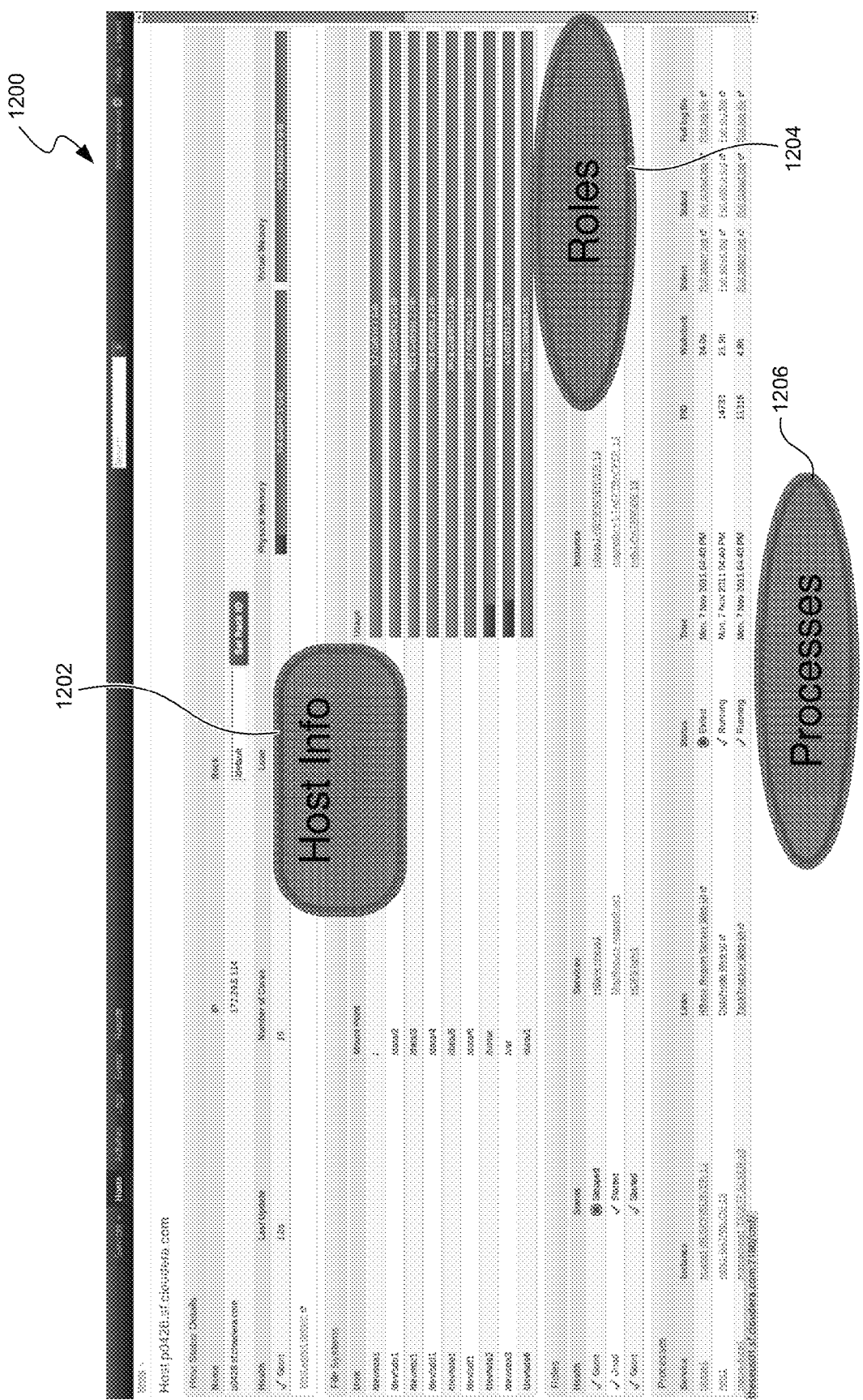
FIG. 12 depicts an example screenshot for inspecting host details for hosts in a computing cluster.
Figure 13:
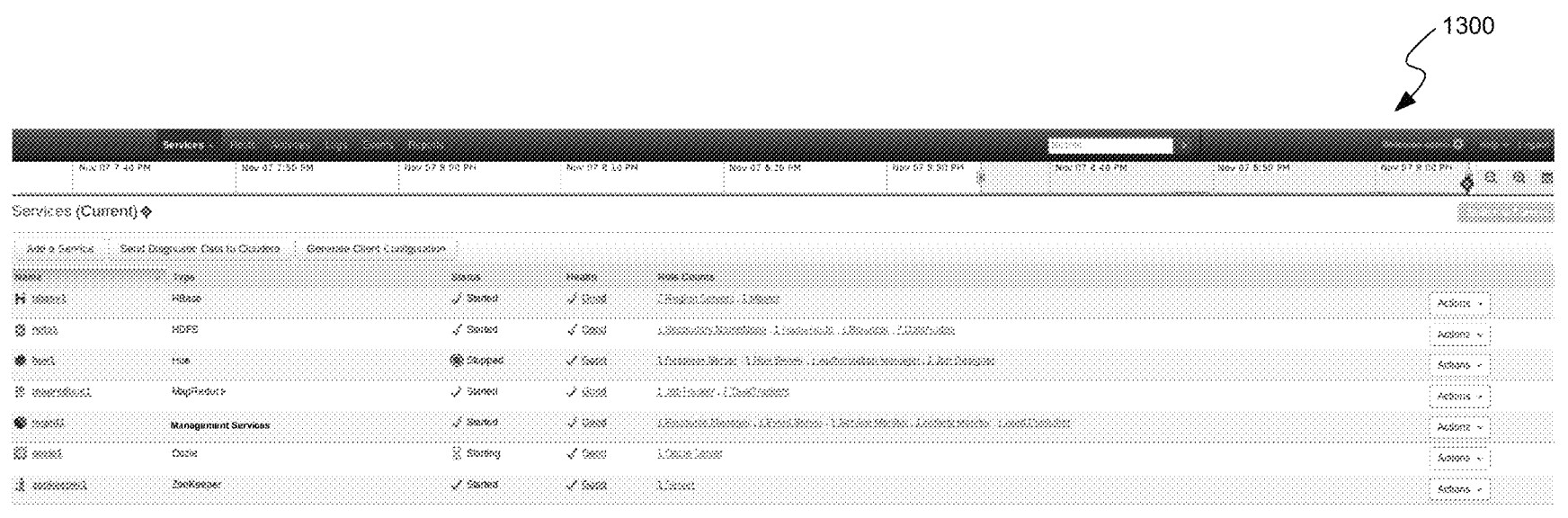

FIG. 12 depicts an example screenshot 1200 for inspecting host details for hosts in a computing cluster. Host details including host information 1202, processes 1206 and roles 1204 that can be shown. The processes panel 1206 can show the processes that run as part of this service role, with a variety of metrics about those processes FIG. 13 depicts an example screenshot 1300 for monitoring the services that are running in a computing cluster.

Figure 15:
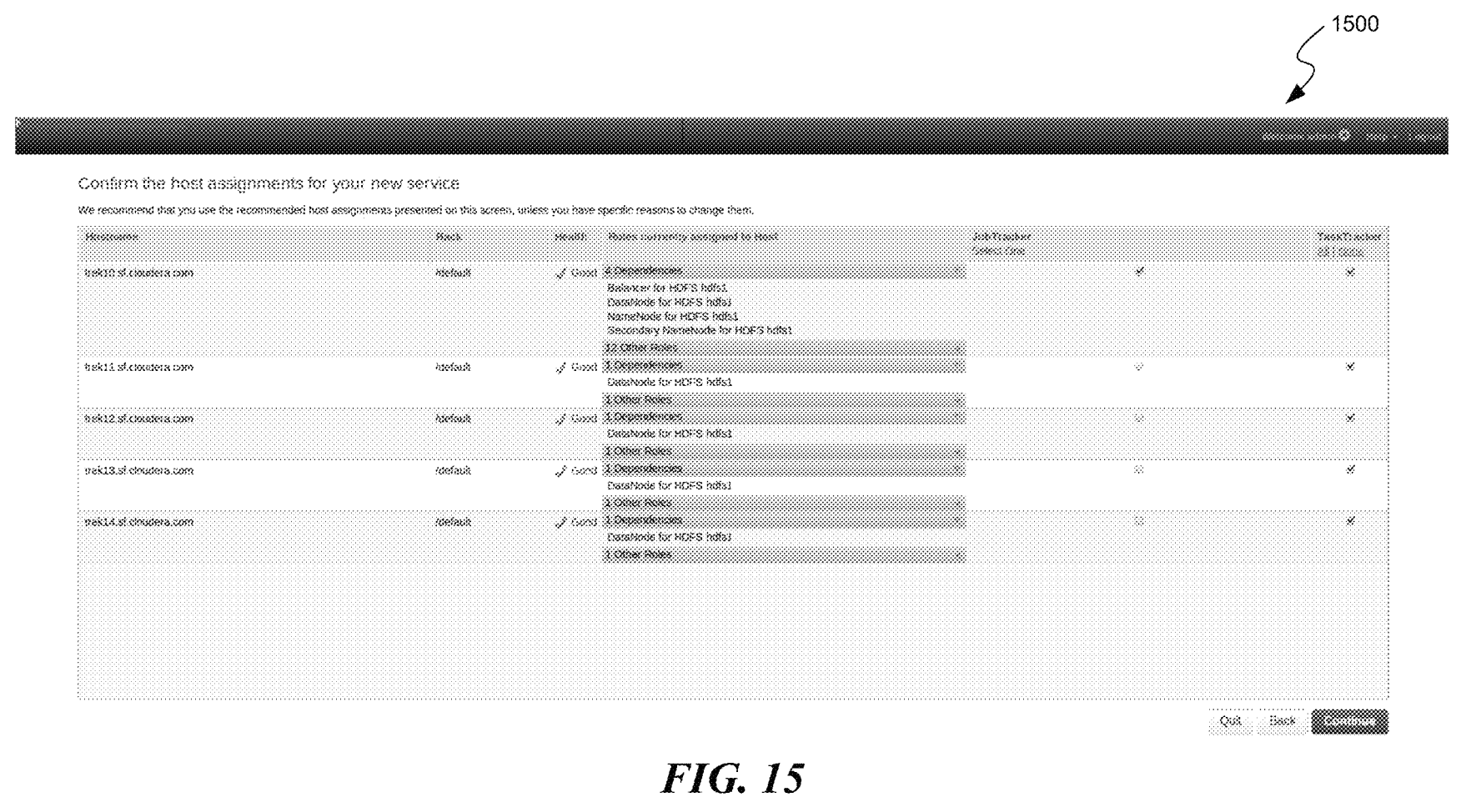

FIG. 14-15 depict example screenshots showing the configuration process of hosts in a computing cluster including selection of services 1400, selecting host assignments/roles to the services 1500, and showing service configuration recommendations 1500.

Figure 16A:
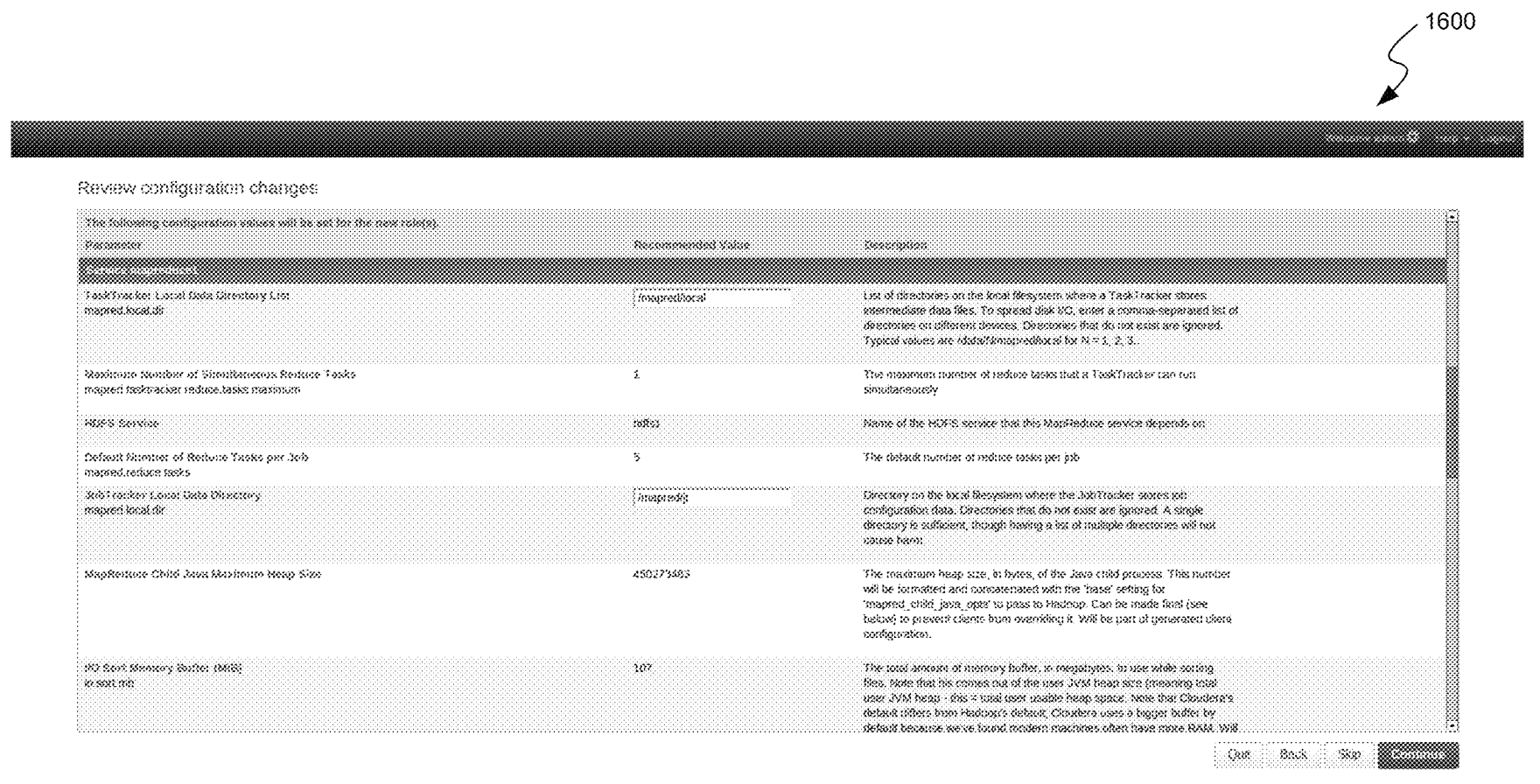
Figure 16B:
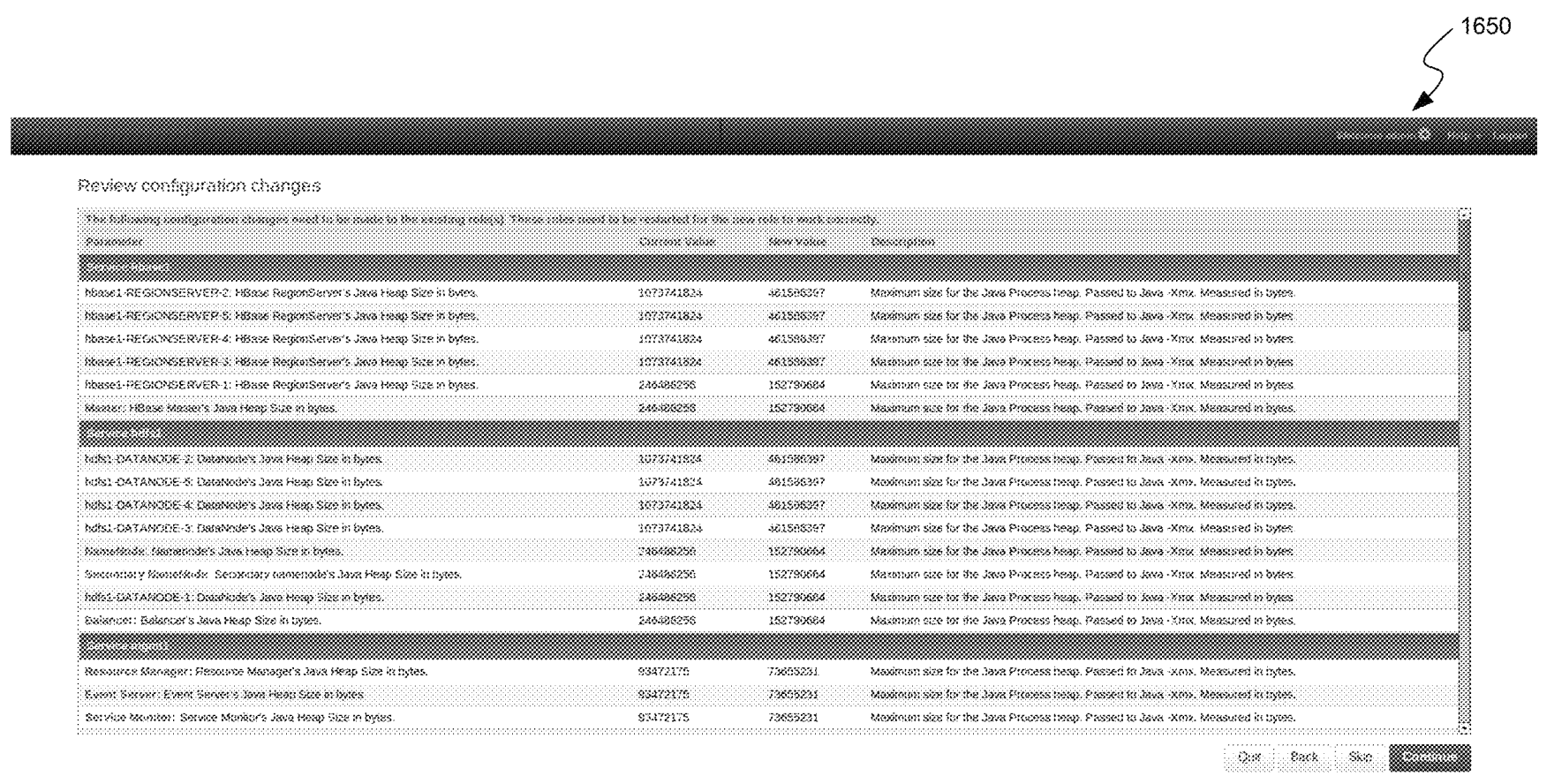

FIG. 16A-B depicts example screenshots 1600 and 1650 showing user environments for reviewing configuration changes.

Figure 17:
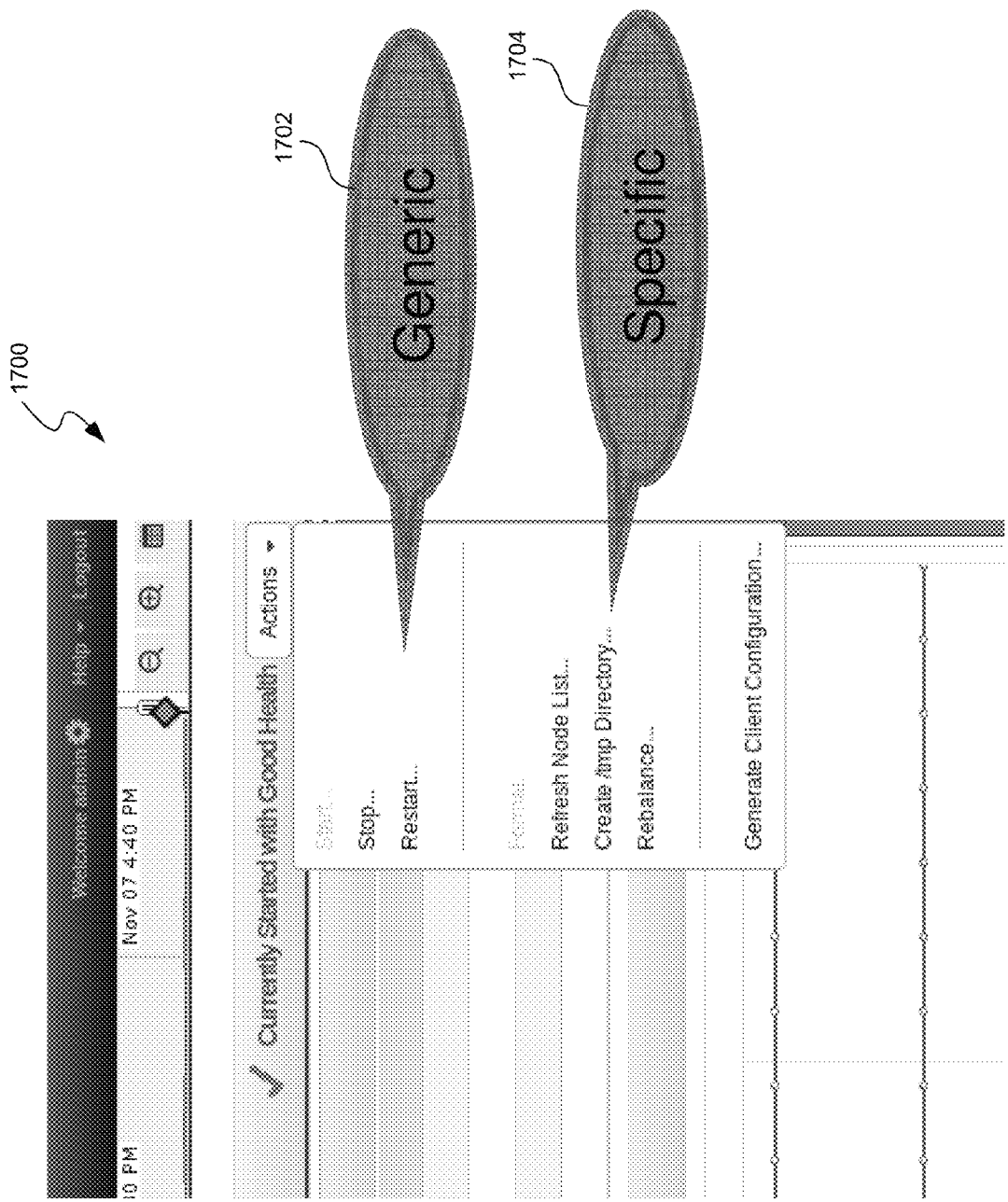
FIG. 17 depicts example actions that can be performed on the services.

FIG. 17 depicts user interface features 1700 showing example actions that can be performed on the services. The actions that can be performed include generic actions 1702 and service-specific actions 1704. The actions menu can be accessed from the service status page. The commands function at the Service level—for example, restart selected from this page will restart all the roles within this service.

Figure 18:
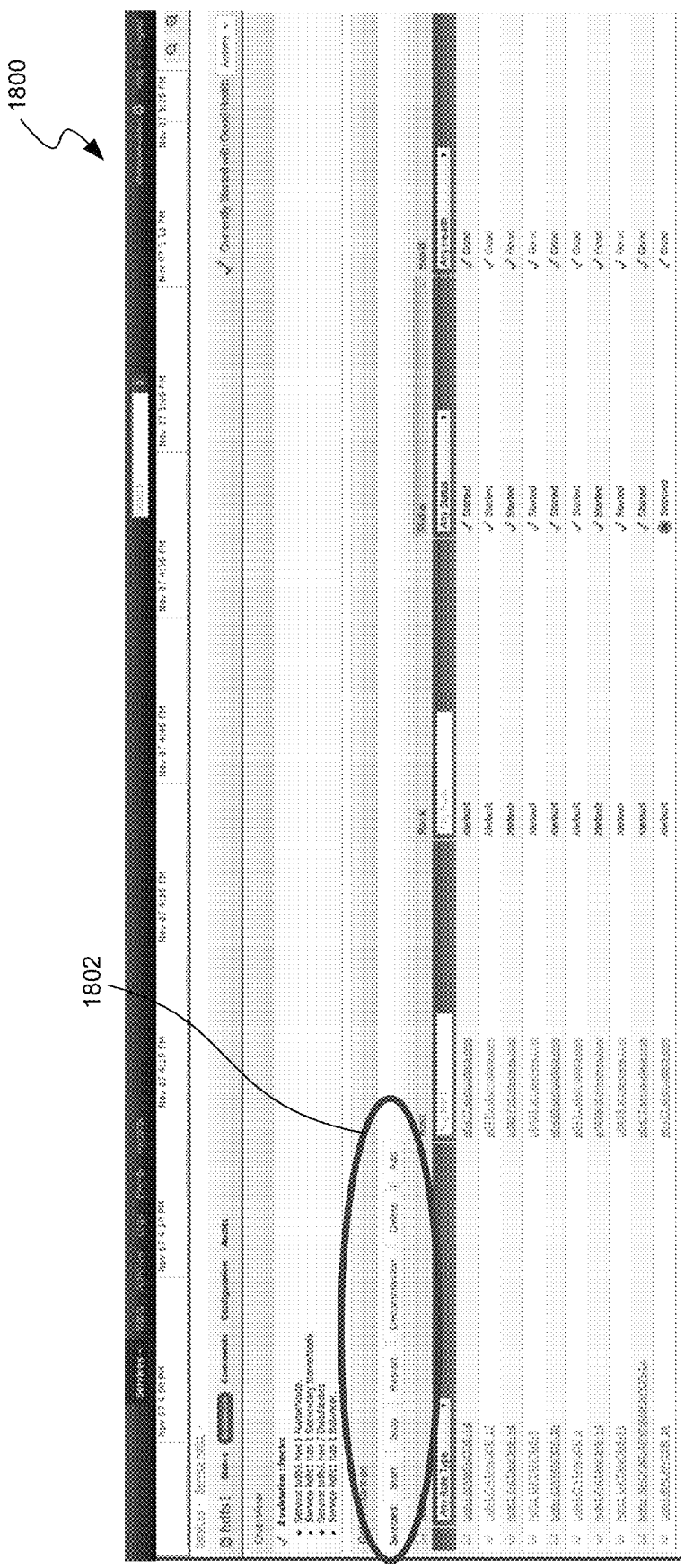
FIG. 18 depicts example screenshot showing a user environment for viewing actions that can be performed on role instances in the computing cluster.

FIG. 18 depicts example screenshot showing a user environment 1800 for viewing actions 1802 that can be performed on role instances in the computing cluster.

The instances page shown in 1800 displays the results of the configuration validation checks it performs for all the role instances for this service. The information on this page can include: Each role instance by name, The host on which it is running, the rack assignment, the role instance's status and/or the role instance's health. In addition, the instances list can be sorted and filtered by criteria in any of the displayed columns.

Figure 19:
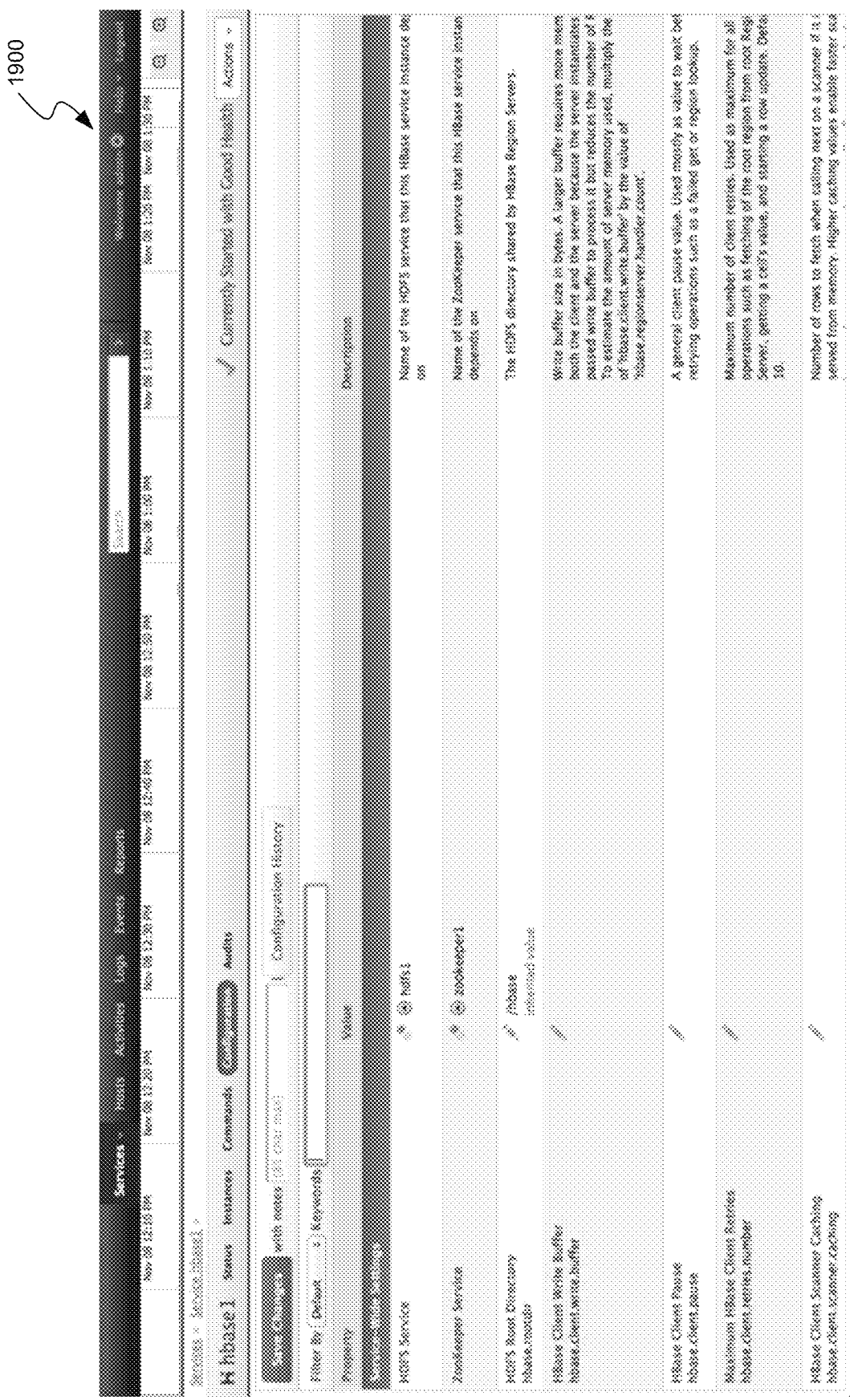
FIG. 19 depicts an example screenshot showing user environment for configuration management.

FIG. 19 depicts an example screenshot showing user environment 1900 for configuration management.

Services configuration enables the management of the deployment and configuration of the computing cluster. The operator or user can add new services and roles if needed, gracefully start, stop and restart services or roles, and decommission and delete roles or services if necessary. Further, the user can modify the configuration properties for services or for individual role instances, with an audit trail that allows configuration roll back if necessary. Client configuration files can also be generated. After initial installation, the 'add a service' wizard can be used to add and configure new service instances. The new service can be verified to have started property by navigating to Services>Status and checking the health status for the new service. After creating a service using one of the wizards, the user can add a role instance to that service. For example, after initial installation in which HDFS service was added, the user or operator can also specify a DataNode to a host machine in the cluster where one was not previously running Similarly a role instance can be removed, for example, a role instance such as a DataNode can be removed from a cluster while it is running by decommissioning the role instance. When a role instance is decommissioned, system can perform a procedure to safely retire the node on a schedule to avoid data loss.

Figure 20:
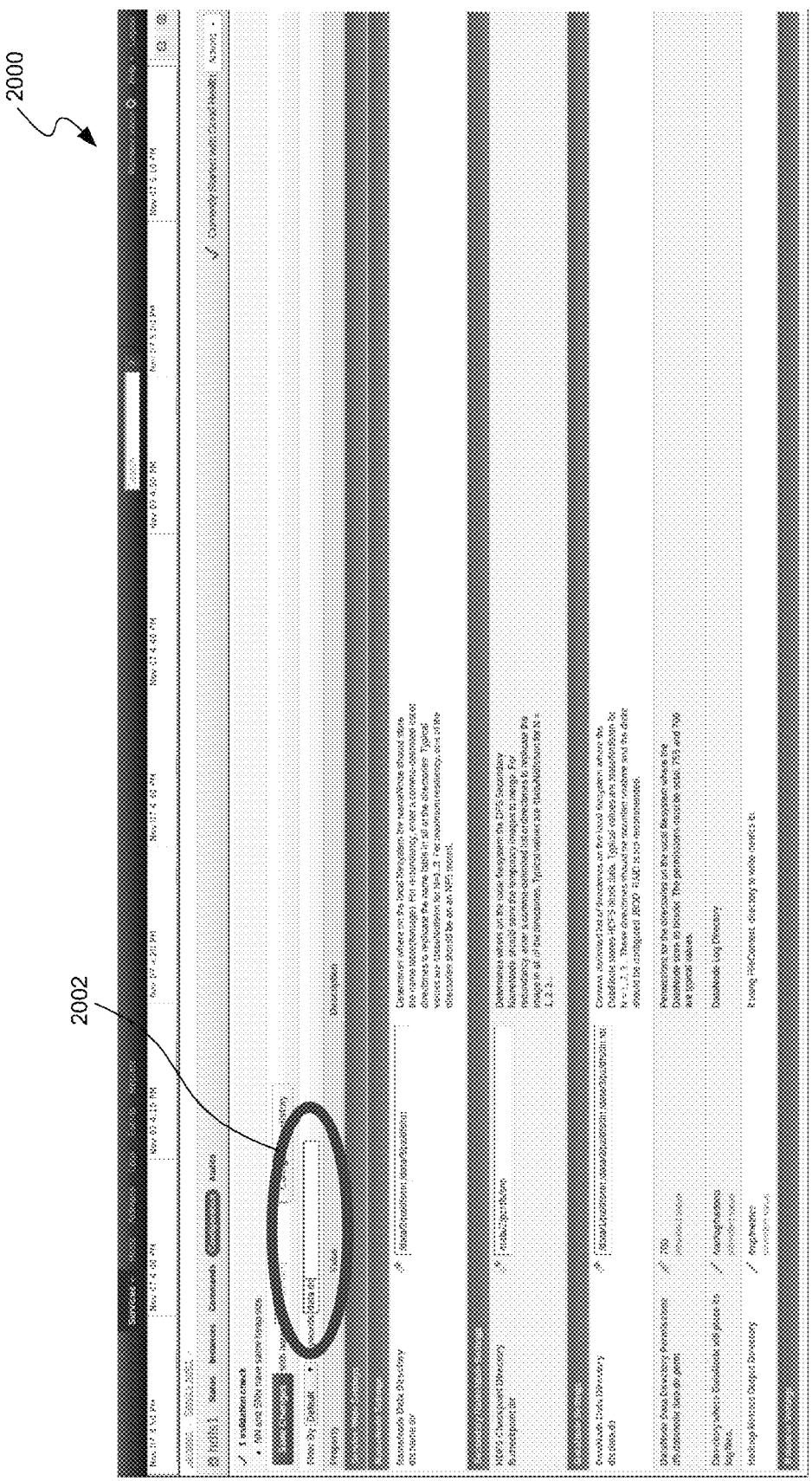
FIG. 20 depicts an example screenshot showing user environment for searching among configuration settings.

FIG. 20 depicts an example screenshot showing user environment 2000 for searching among configuration settings in the search field 2002.

Figure 21:
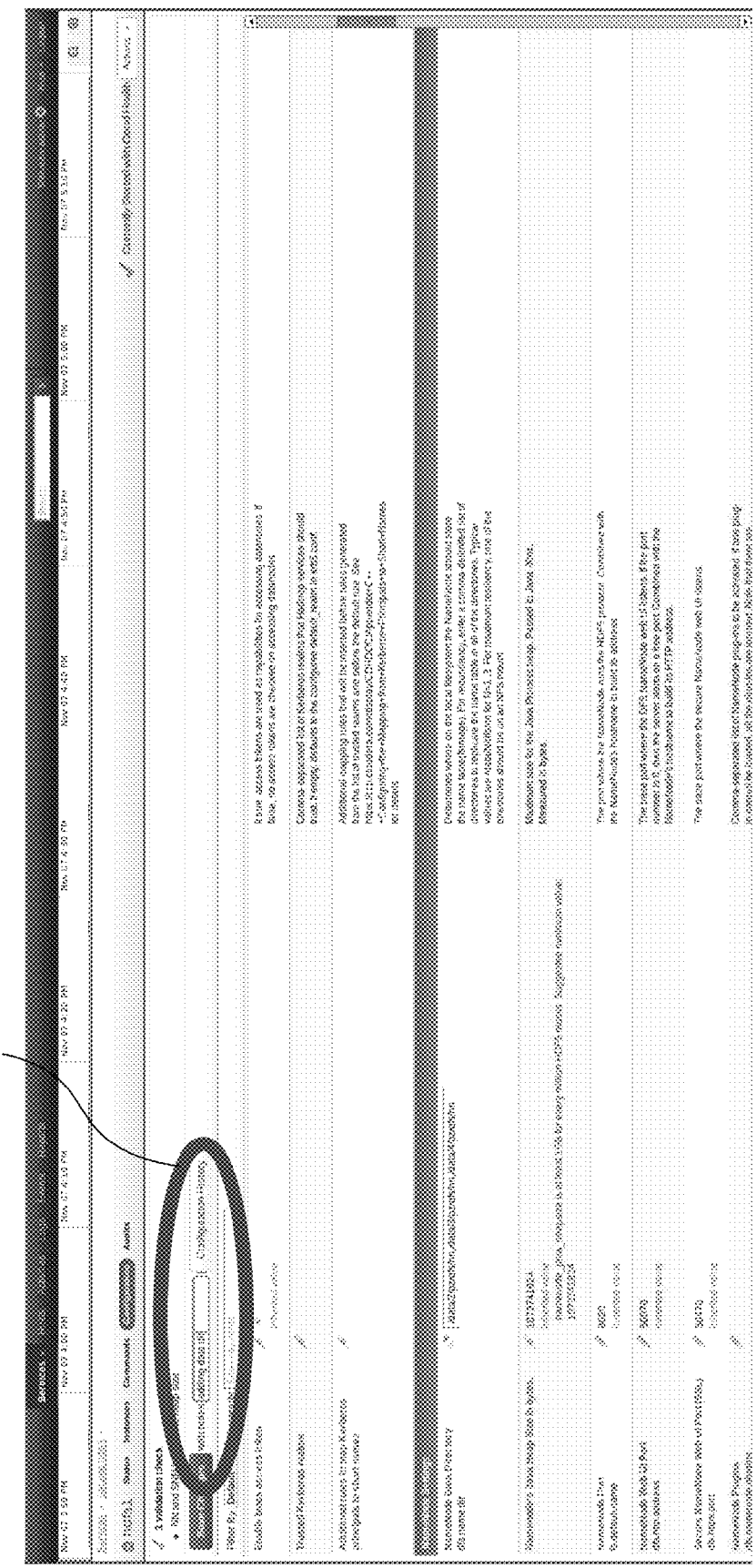
FIG. 21 depicts an example screenshot showing user environment for annotating configuration changes or settings.

FIG. 21 depicts an example screenshot showing user environment 2100 for annotating configuration changes or settings in field 2102.

Figure 22:
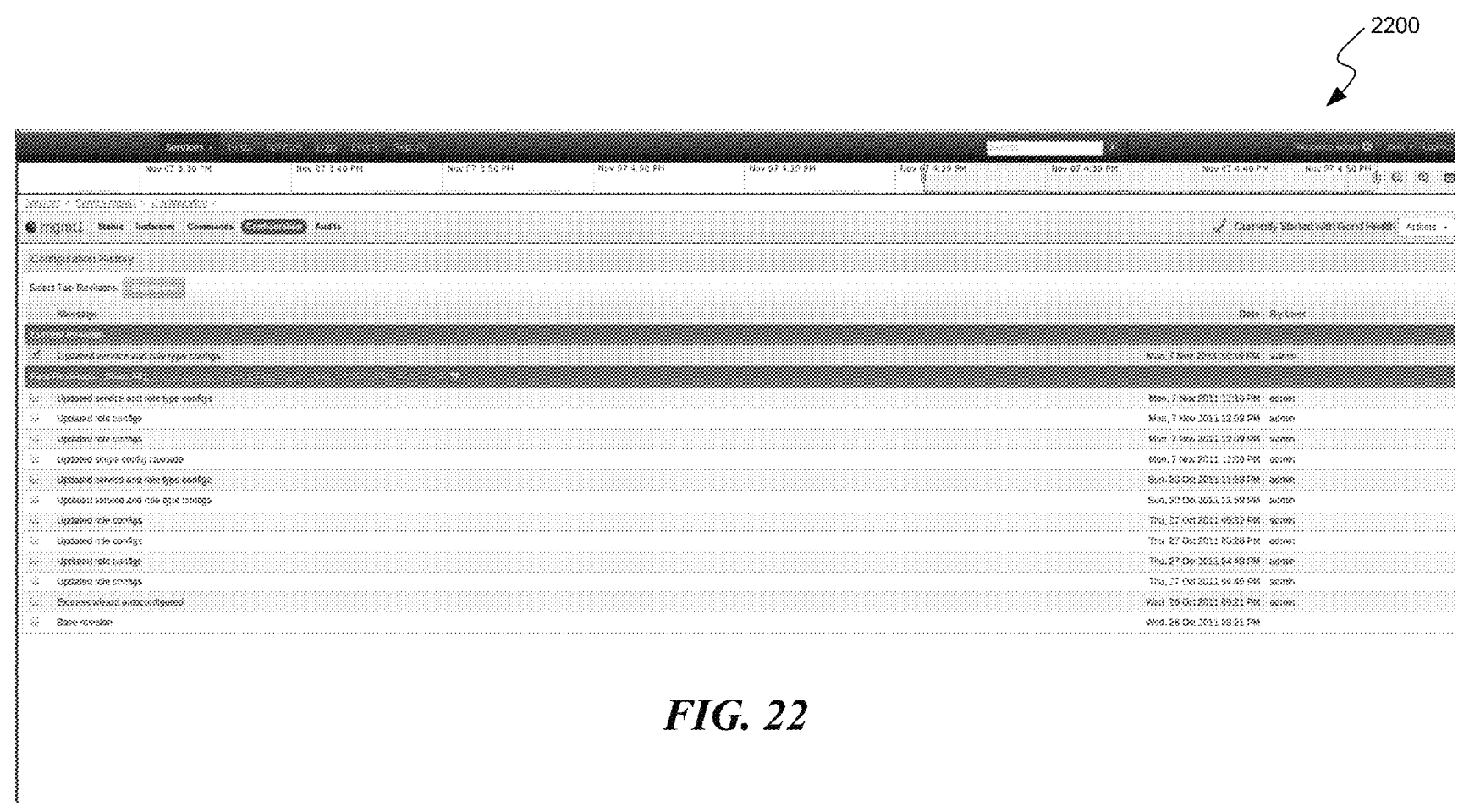

FIG. 22 depicts an example screenshot showing user environment 2200 for viewing the configuration history for a service.

Figure 23:
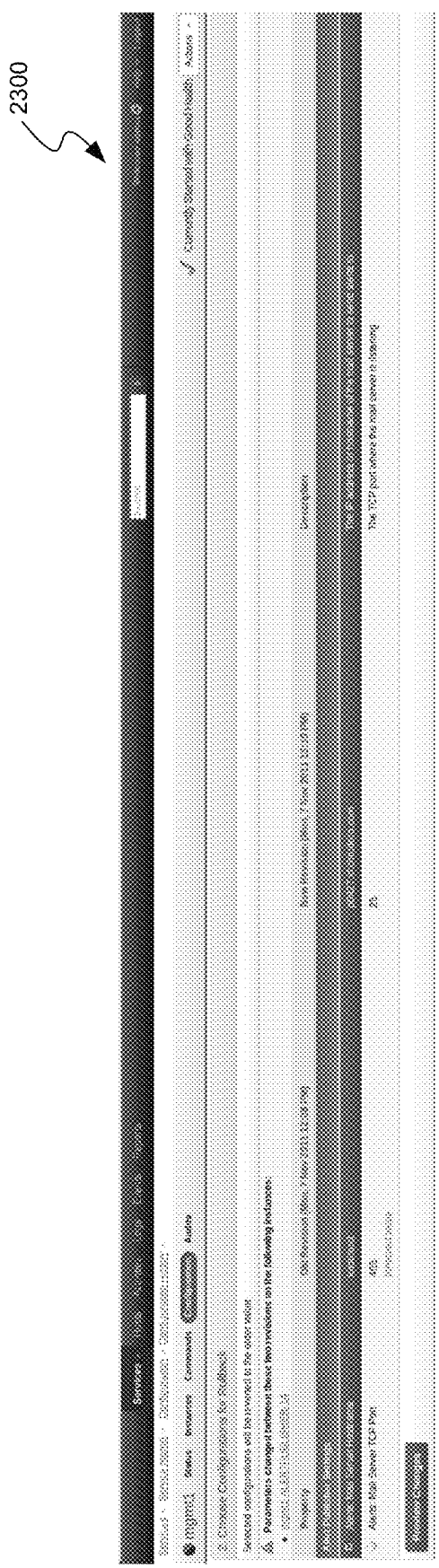
FIG. 23 depicts an example screenshot showing user environment for configuration review and rollback.

FIG. 23 depicts an example screenshot showing user environment 2300 for configuration review and rollback.

Figure 24:
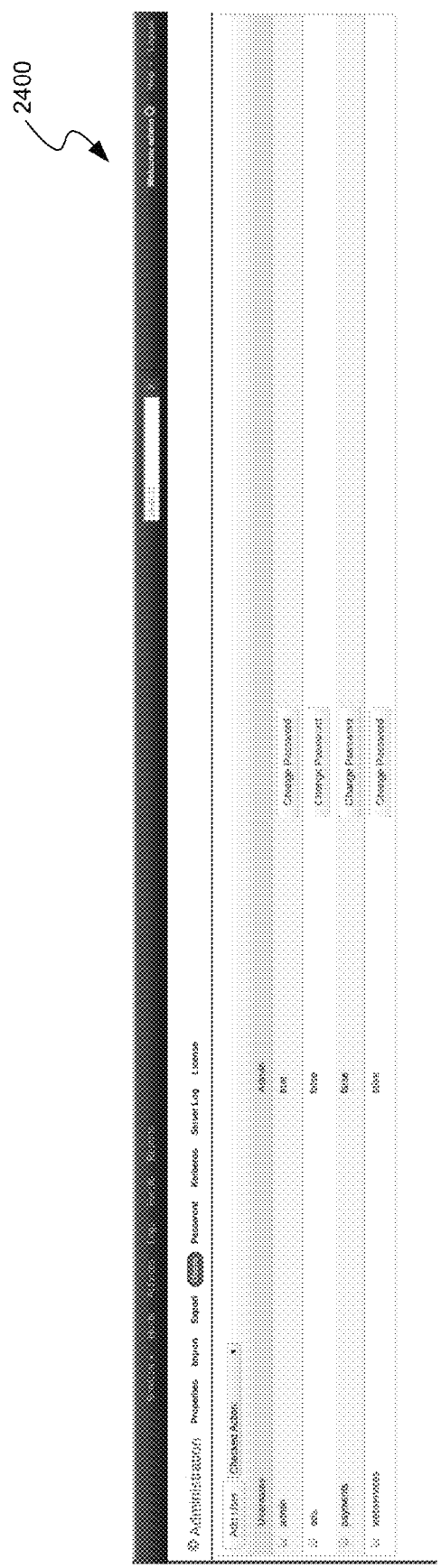
FIG. 24 depicts an example screenshot showing user environment for managing the users and managing the associated permissions.

Whenever a set of configuration settings are changed and saved for a service or role instance, the system saves a revision of the previous settings and the name of the user who made the changes. The past revisions of the configuration settings can be viewed, and, if desired, roll back the settings to a previous state. FIG. 24 depicts an example screenshot showing user environment 2400 for managing users and managing their permissions.

Figure 25:
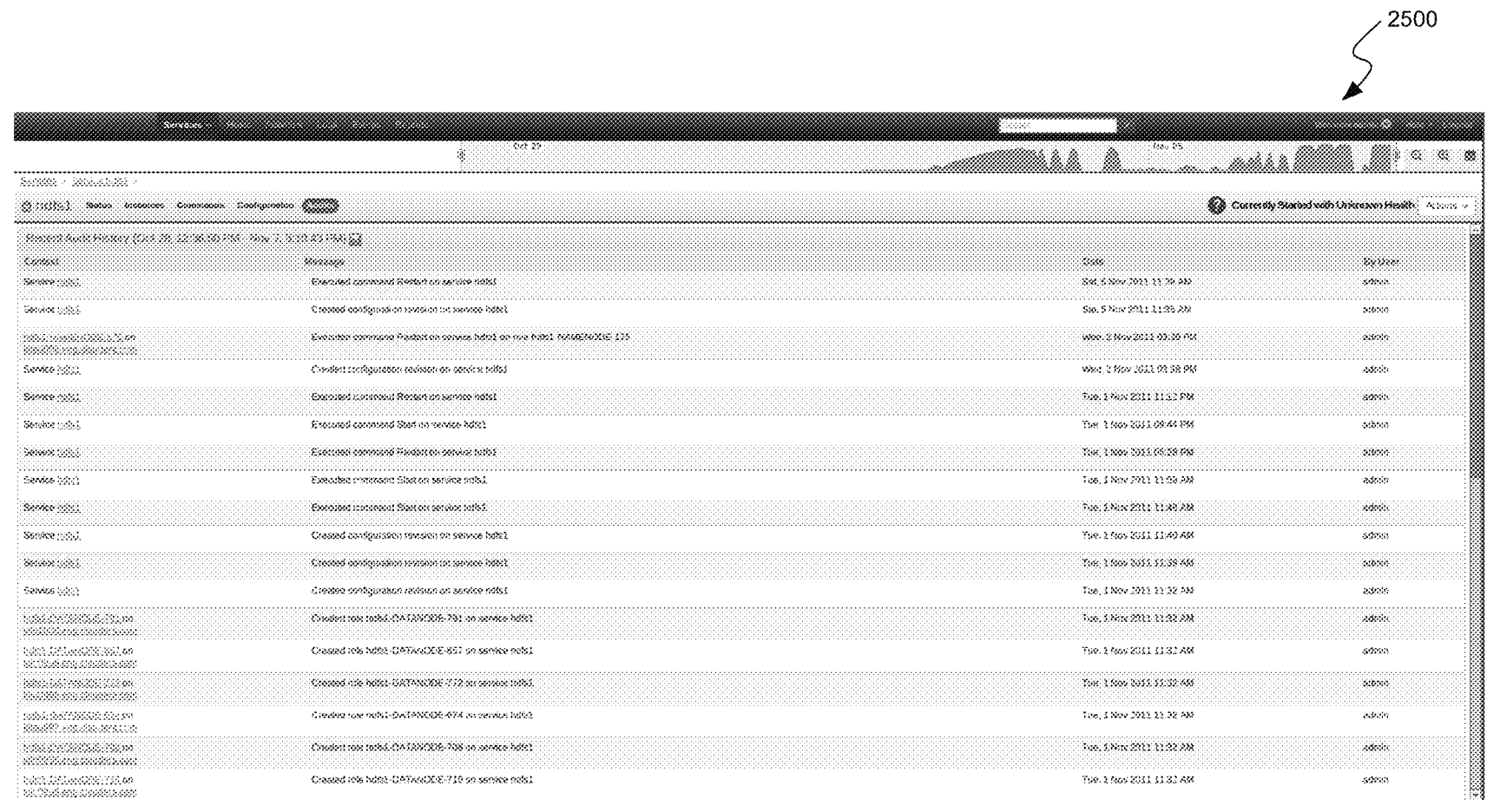

FIG. 25 depicts an example screenshot showing user environment 2500 for accessing an audit history of a computing cluster and its services.

The user environment 2500 accessed via the audit table depicts the actions that have been taken for a service or role instance, and what user performed them. The audit history can include actions such as creating a role or service, making configuration revisions for a role or service, and running commands. In general, the audit history can include the following information: Context: the service or role and host affected by the action, message: What action was taken, date: date and time that the action was taken, user: the user name of the user that performed the action.

Figure 26:
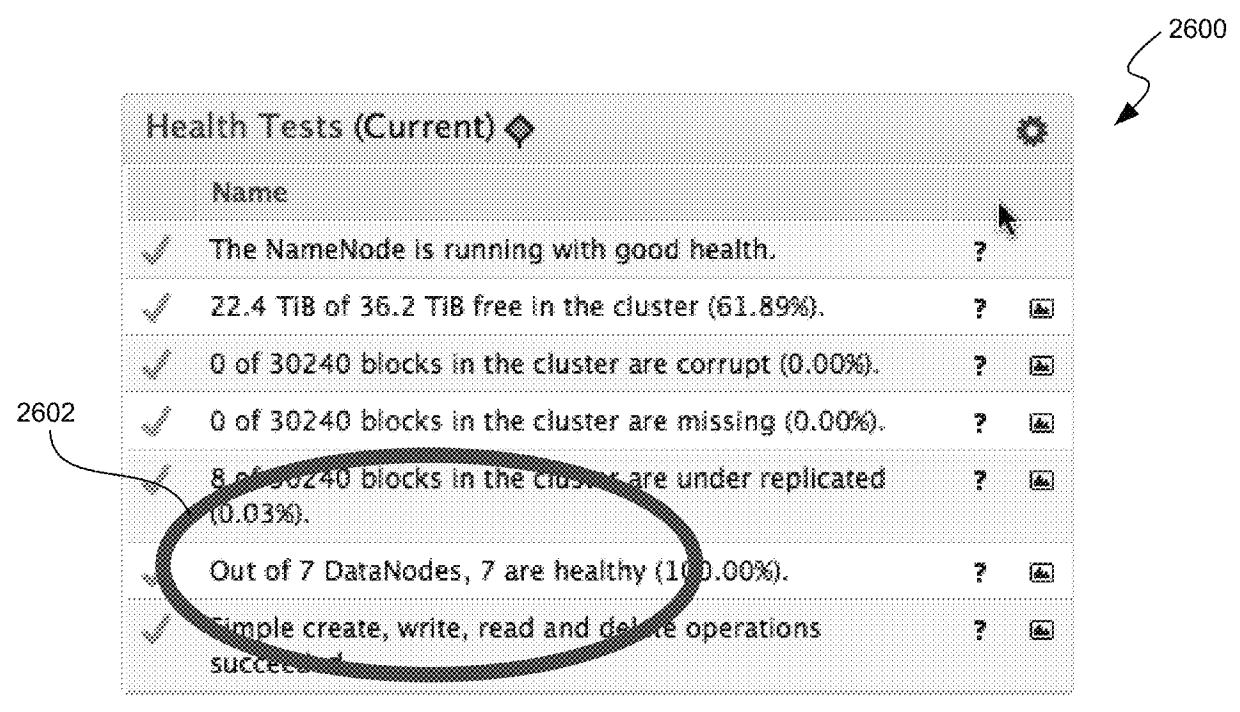
Figure 27:
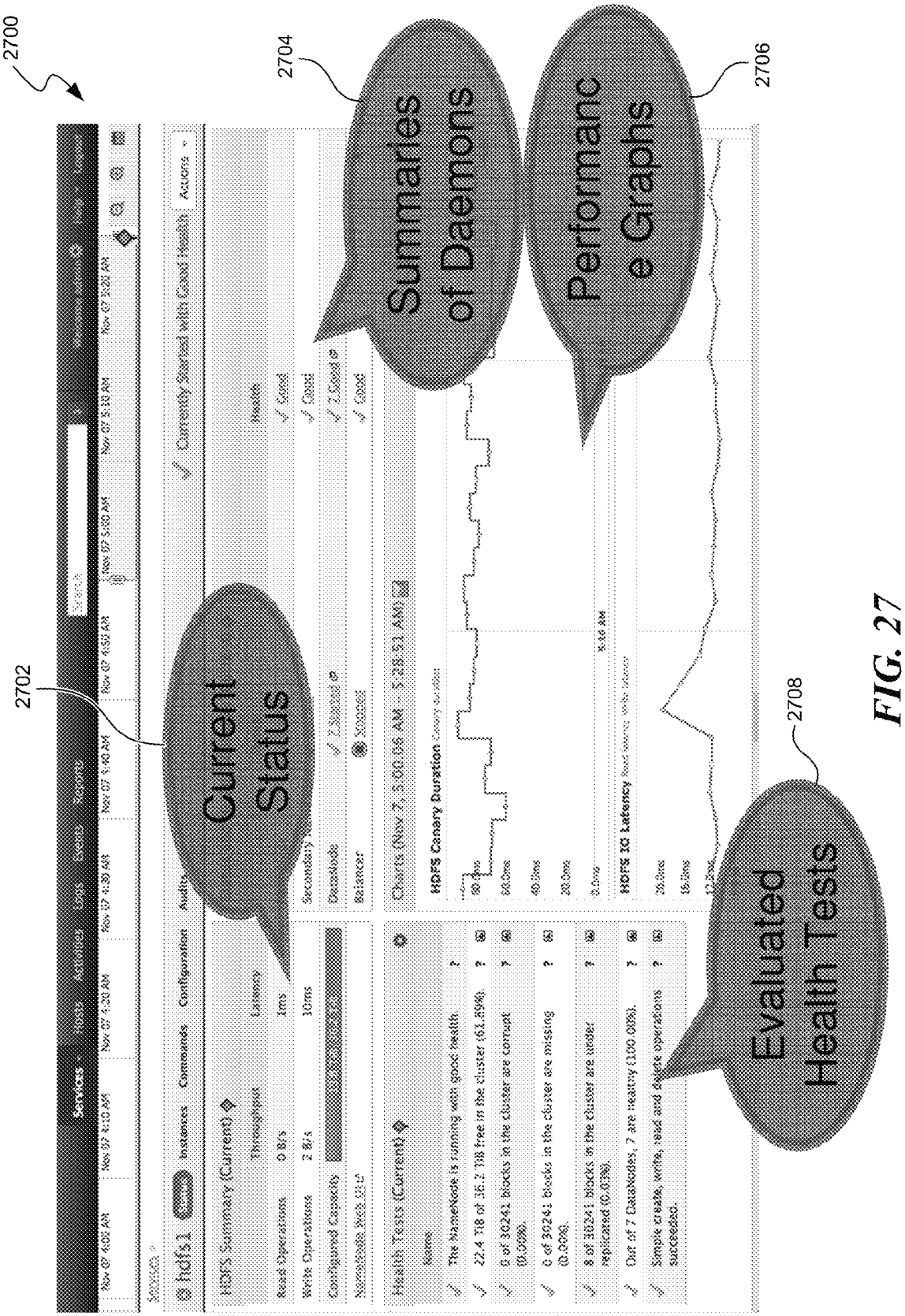

FIG. 26-27 depicts example screenshots showing user environment 2600 and 2700 for viewing system status, usage statistics, and health information. For example, current service status 2702, results of health tests 2708, summary of daemon health status 2704, and/or graphs of performance with respect to time 2706 can be generated and displayed.

The services page opens and shows an overview of the service instances currently installed on the cluster. In one embodiment, for each service instance, this can show, for example: The type of service; the service status (for example, started); the overall health of the service; the type and number of the roles that have been configured for that service instance.

For all service types there is a Status and Health Summary that shows, for each configured role, the overall status and health of the role instance(s). In general, most service types can provide tabs at the bottom of the page to view event and log entries related to the service and role instances shown on the page. Note that HDFS, MapReduce, and HBase services also provide additional information including, for example: a snapshot of service-specific metrics, health test results, and a set of charts that provide a historical view of metrics of interest. FIG. 28 depicts an example screenshot showing user environment 2800 for accessing or searching log files.

Figure 29:
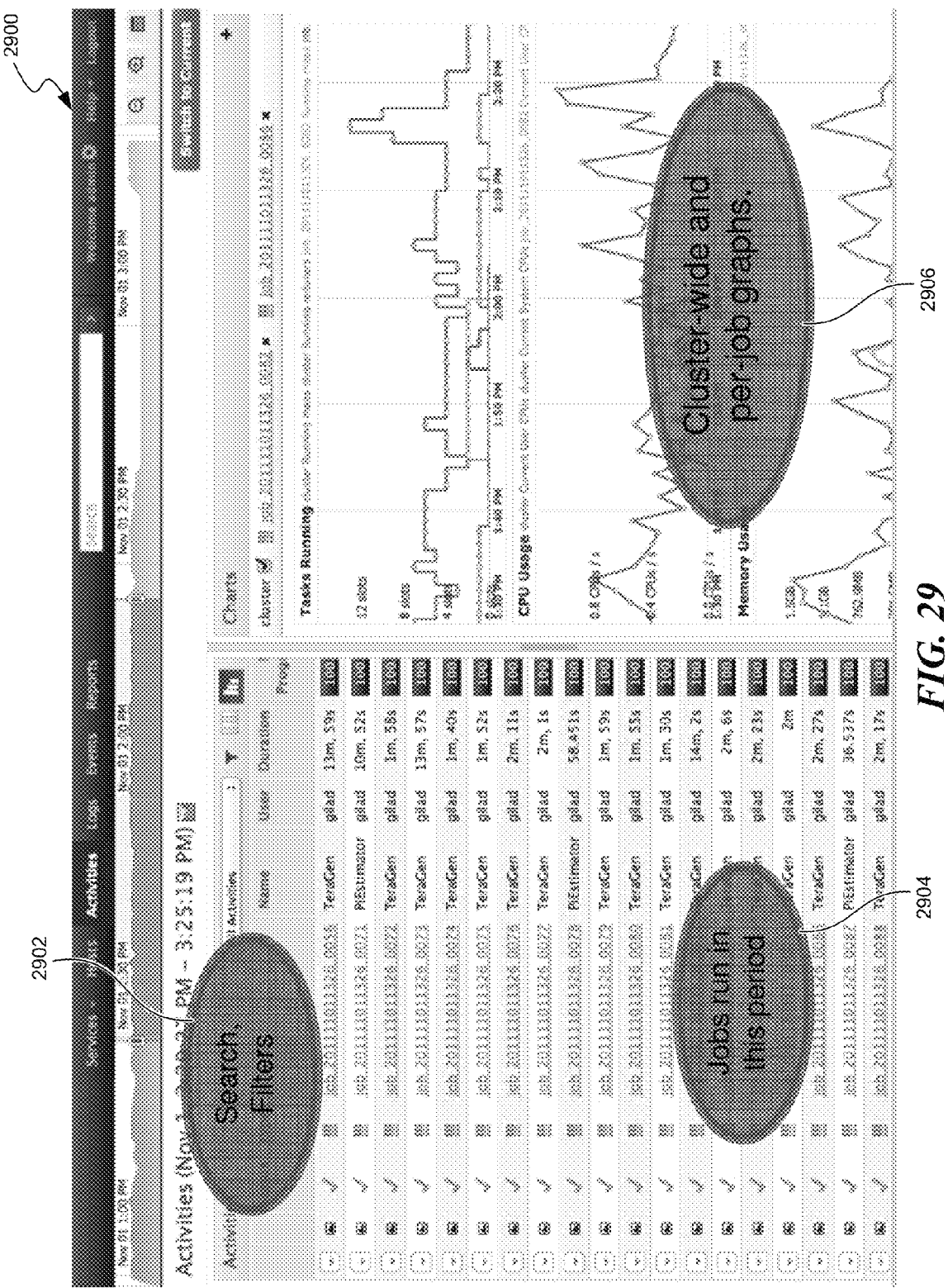
FIG. 29 depicts an example screenshot showing user environment for monitoring activities in the computing cluster.

FIG. 29 depicts an example screenshot showing user environment 2900 for monitoring activities in the computing cluster. For example, user environment 2900 can include search filters 2902, show the jobs that are run in a given time period 2904, and/or cluster wide and/or per-job graphs 2906.

Figure 30:
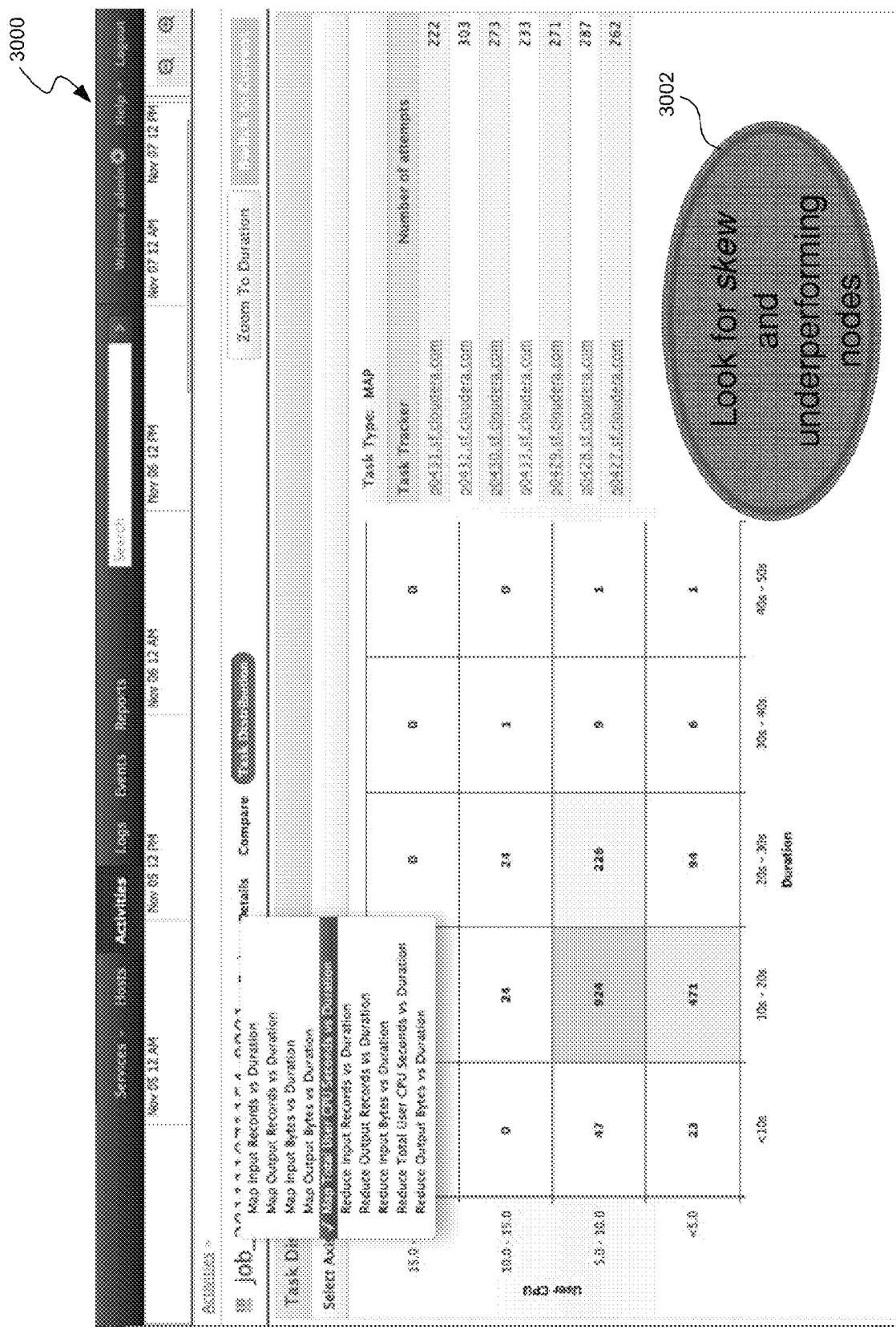
FIG. 30 depicts an example screenshot showing user environment showing task distribution.

FIG. 30 depicts an example screenshot showing user environment 3000 showing task distribution.

The task distribution chart of 3000 can create a map of the performance of task attempts based on a number of different measures (on the Y-axis) and the length of time taken to complete the task on the X-axis. The chart 3000 shows the distribution of tasks in cells that represent the relationship of task duration to values of the Y-axis metric. The number in each cell shows the number of tasks whose performance statistics fall within the parameters of the cell.

The task distribution chart of 3000 is useful for detecting tasks that are outliers in the jobs, either because of skew, or because of faulty TaskTrackers. The chart can show if some tasks deviate significantly from the majority of task attempts. Normally, the distribution of tasks will be fairly concentrated. If, for example, some Reducers receive much more data than others, that will be represented by having two discrete sections of density on the graph. That suggests that there may be a problem with the user code, or that there's skew in the underlying data. Alternately, if the input sizes of various Map or Reduce tasks are the same, but the time it takes to process them varies widely, it might mean that certain TaskTrackers are performing more poorly than others.

In one embodiment, each cell is accessible to see a list of the TaskTrackers that correspond to the tasks whose performance falls within the cell. The Y-axis can show Input or Output records or bytes for Map or Reduce tasks, or the amount of CPU seconds for the user who ran the job, while the X-axis shows the task duration in seconds.

In addition, the distribution of the following can also be charted: Map Input Records vs. Duration, Map Output Records vs. Duration, Map Input Bytes vs. Duration, Map Output Bytes vs. Duration, Current User CPUs (CPU seconds) vs. Duration, Reduce Input Records vs. Duration, Reduce Output Records vs. Duration, Reduce Input Bytes vs. Duration, Reduce Output Bytes vs. Duration, TaskTracker Nodes.

To the right of the chart is a table that shows the TaskTracker hosts that processed the tasks in the selected cell, along with the number of task attempts each host executed. Cells in the table can be selected to view the TaskTracker hosts that correspond to the tasks in the cell. The area above the TaskTracker table shows the type of task and range of data volume (or User CPUs) and duration times for the task attempts that fall within the cell. The table depicts the TaskTracker nodes that executed the tasks that are represented within the cell, and the number of task attempts run on that node.

Figure 31:
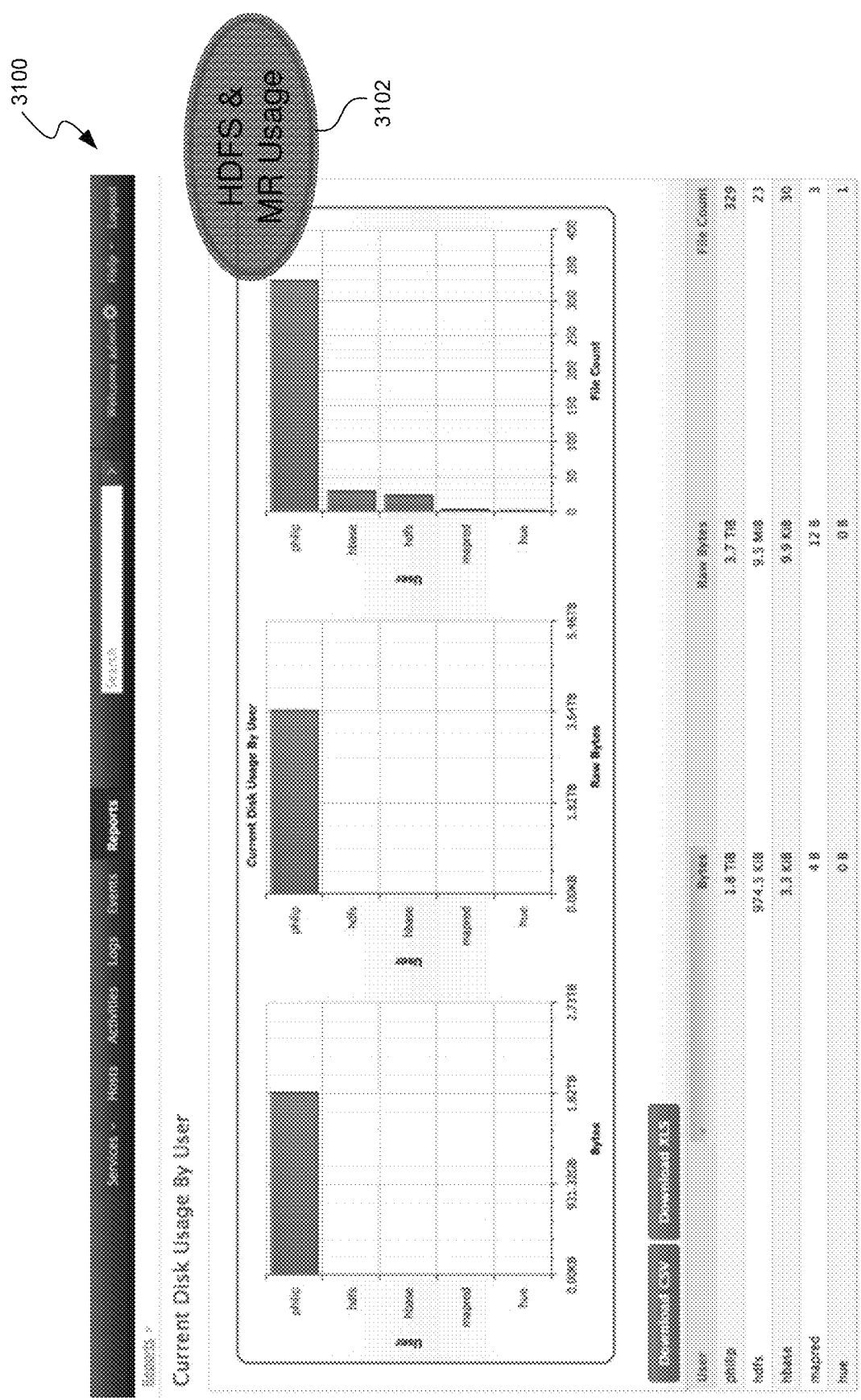
FIG. 31 depicts an example screenshot showing user environment showing reports of resource consumption and usage statistics in the computing cluster.

FIG. 31 depicts an example screenshot showing user environment 3100 showing reports of resource consumption and usage statistics in the computing cluster. Reports of use by user and by service can be generated and illustrated.

Figure 32:
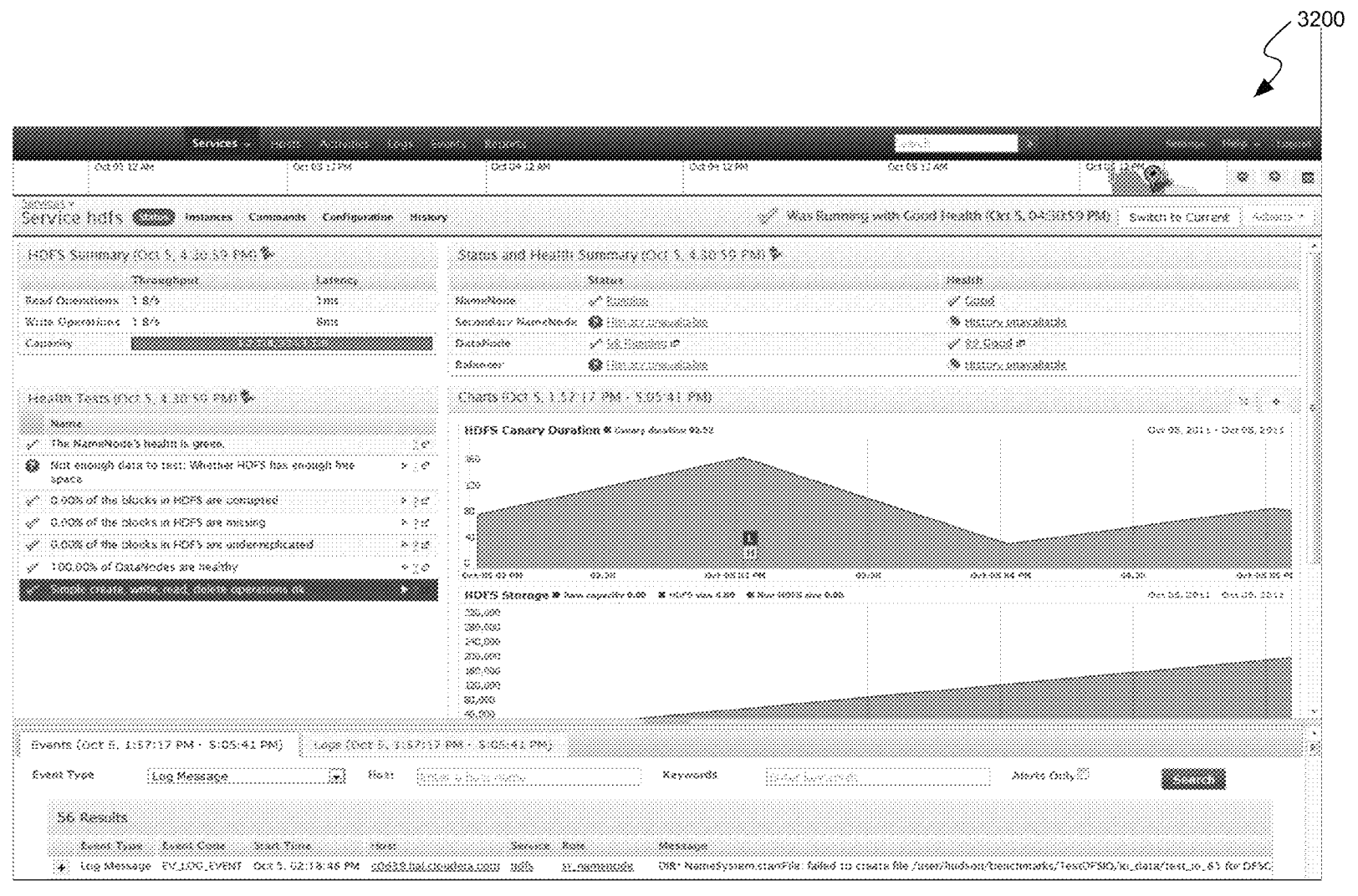

FIG. 32 depicts an example screenshot showing user environment 3200 for viewing health and performance data of an HDFS service.

Figure 33:
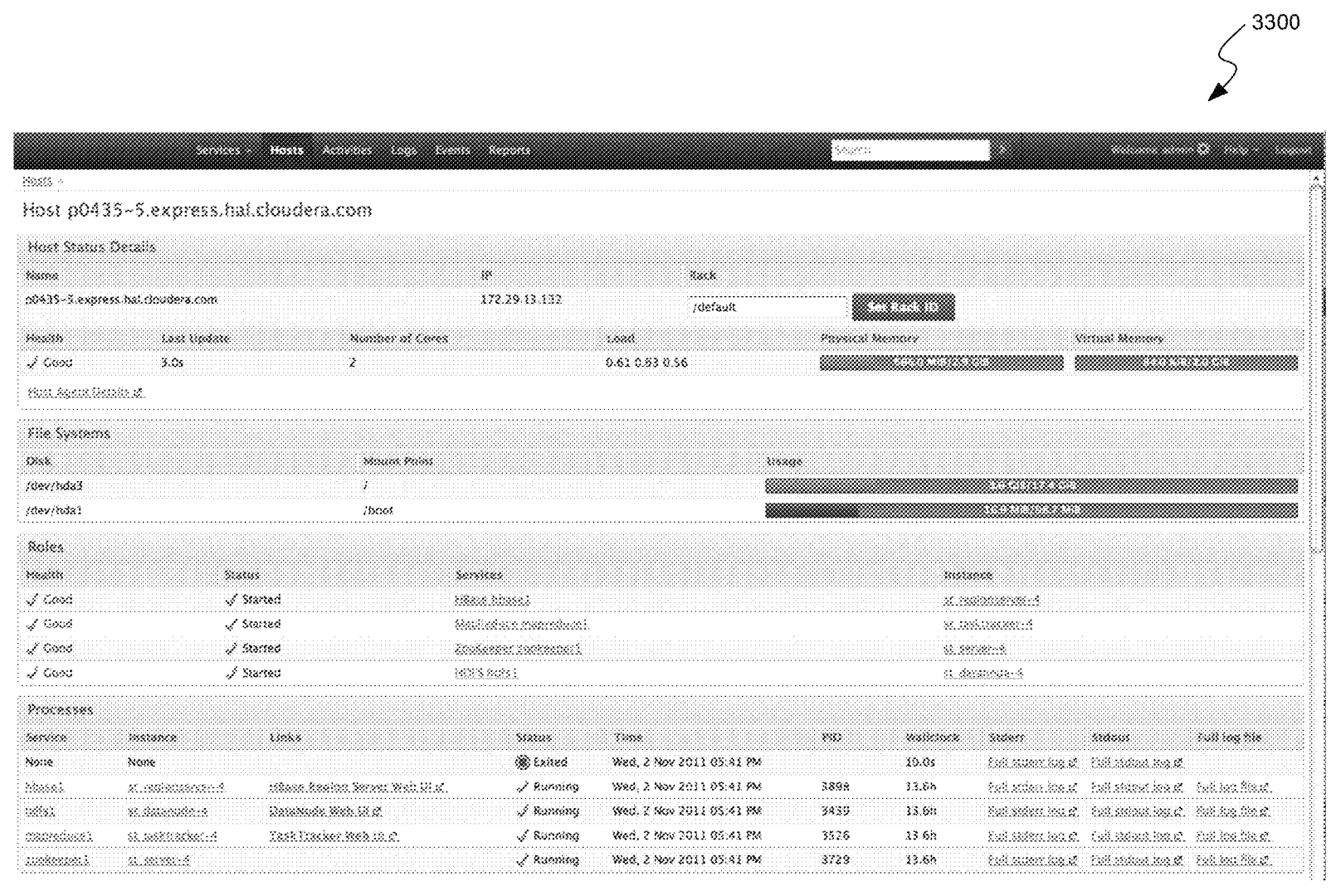

FIG. 33 depicts an example screenshot showing user environment 3300 for viewing a snapshot of system status at the host machine level of the computing Some pages, such as the services summary and service status pages, show status information from a single point in time (a snapshot of the status). By default, this status and health information is for the current time. By moving the time marker to an earlier point on the time range graph, the status as it was at the selected point in the past can be shown.

Figure 34:
FIG. 34 depicts an example screenshot showing user environment for viewing and diagnosing cluster workloads.

In one embodiment, when displayed data is from a single point in time (a snapshot) the panel or column will display a small version of the time marker icon in the panel. This indicates that the data corresponds to the time at the location of the time marker on the time range selector. Under the activities tab with an individual activity selected, a zoom to duration button is available to allow users to zoom the time selection to include just the time range that corresponds to the duration of the selected activity. FIG. 34 depicts an example screenshot showing user environment 3400 for viewing and diagnosing cluster workloads.

Figure 35:
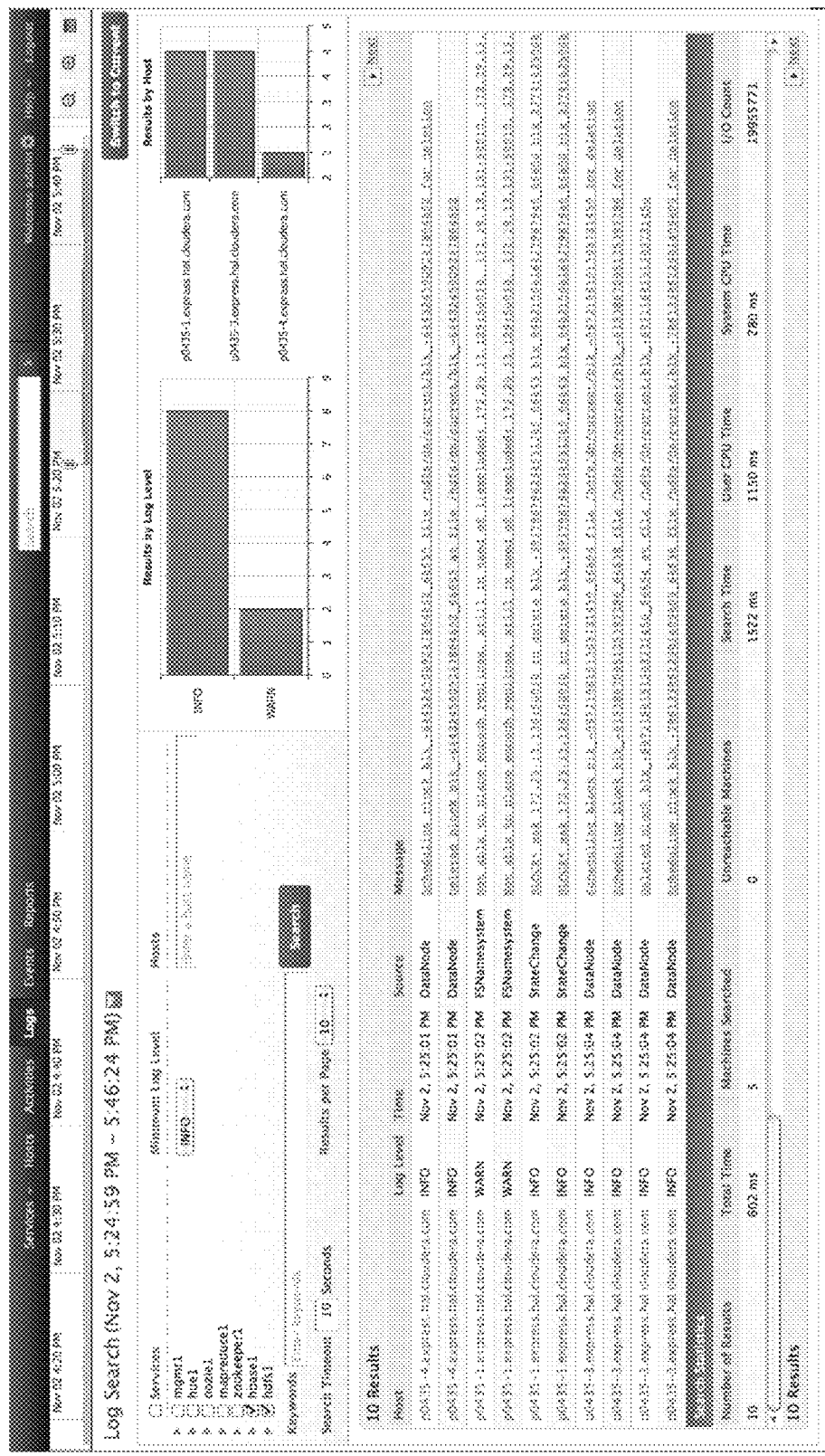
FIG. 35 depicts an example screenshot showing user environment for gathering, viewing, and searching logs.

FIG. 35 depicts an example screenshot showing user environment 3500 for gathering, viewing, and searching logs.

The logs page presents log information for Hadoop services, which can be filtered by service, role, host, and/or search phrase as well log level (severity). The log search associated with a service can be within a selected time range. The search can be limited by role (only the roles relevant to this service instance will be available), by minimum log level, host, and/or keywords. From the logs list can provide a link to a host status page, or to the full logs where a given log entry occurred.

The search results can be displayed in a list with the following columns:

Host: The host where this log entry appeared. Clicking this link will retrieve the Host Status page Log Level: The log level (severity) associated with this log entry.

Time: The date and time this log entry was created.

Source: The class that generated the message.

Message: The message portion of the log entry. Clicking a message enables access to the Log Details page, which presents a display of the full log, showing the selected message and the 100 messages before and after it in the log.

These two charts show the distribution of log entries by log level, and the distribution of log entries by host, for the subset of log entries displayed on the current page.

Figure 36:
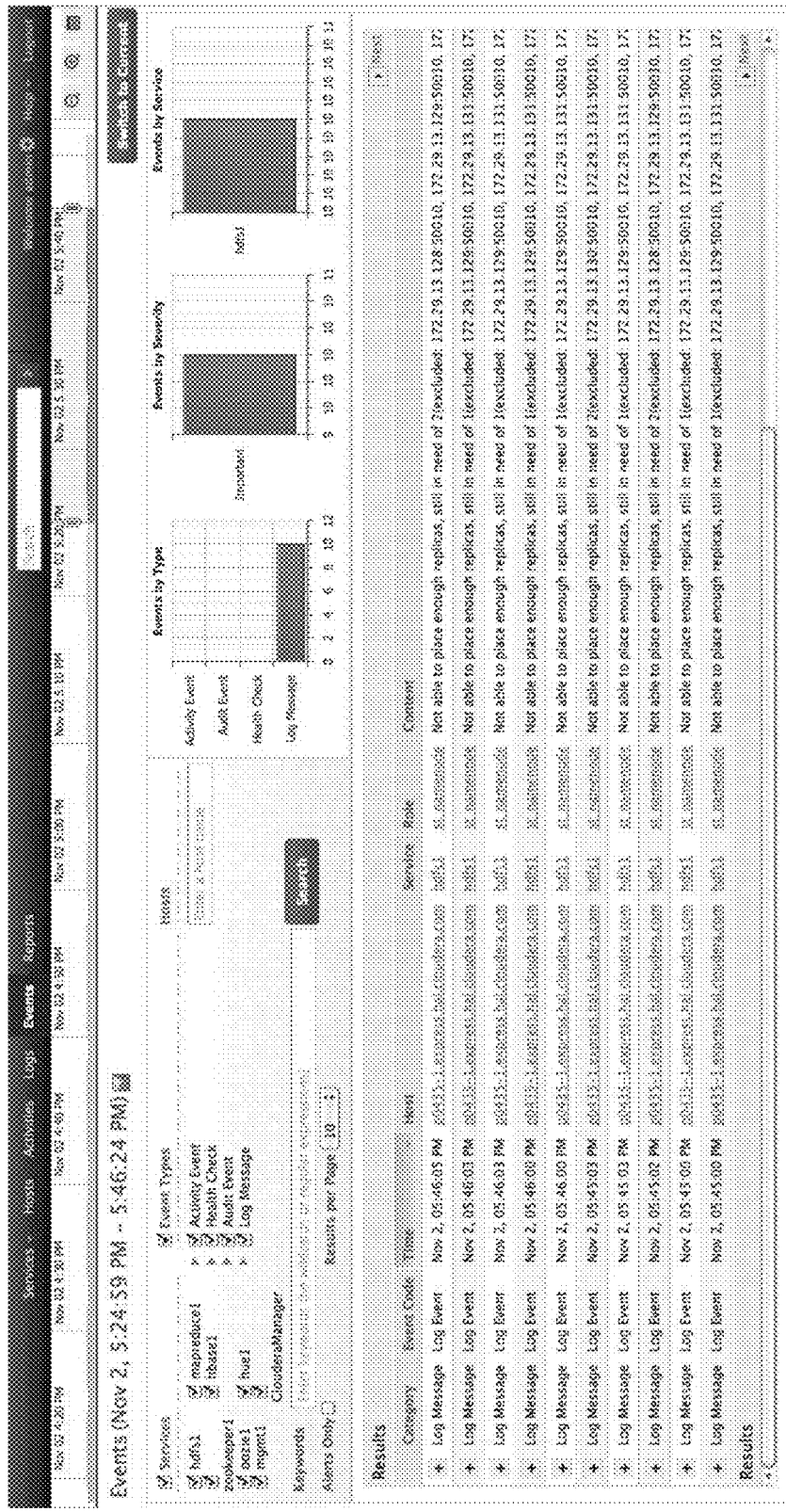
FIG. 36 depicts an example screenshot showing user environment for tracking and viewing events across a computing cluster.

FIG. 36 depicts an example screenshot showing user environment 3600 for tracking and viewing events across a computing cluster.

In general, the events can be searched within a selected time range—which can be indicated on the tab itself. The search can be for events of a specific type, for events that occurred on a specific host (for services—for a role, only the host for the role is searched), for events whose description includes selected keywords, or a combination of those criteria. In addition, it can be specified that only events that generated alerts should be included. In one embodiment, the list of events provides a link back to the service instance status page, the role instance status, or the host status page.

In one embodiment, the search criteria include all event types, all services, and all hosts, with no keywords included. Modifying the search criteria can be optional In addition, it can be specified that only events that generated alerts should be included.

Figure 37:
FIG. 37 depicts an example screenshot showing user environment for running and viewing reports on system performance and usage.

The charts above the results list show the distribution of events by the type of event, severity, and service. Note that these charts show the distribution of events shown on the current page of the results list (where the number on the page is determined by the value in the Results per Page field). If there are multiple pages of results, these charts are updated each time new sets of results are displayed. The chart can be saved as a single image (a .PNG file) or a PDF file FIG. 37 depicts an example screenshot showing user environment 3700 for running and viewing reports on system performance and usage.

The reports page enables users to create reports about the usage of HDFS in a computing cluster—data size and file count by user, group, or directory. It also generates reports on the MapReduce activity in a cluster, by user. These reports can be used to view disk usage over a selected time range. The usage statistics can be reported per hour, day, week, month, or year. In one embodiment, for weekly or monthly reports, the date can indicate the date on which disk usage was measured.

The directories shown in the Historical Disk Usage by Directory report include the HDFS directories that are set as watched directories.

Figure 38:
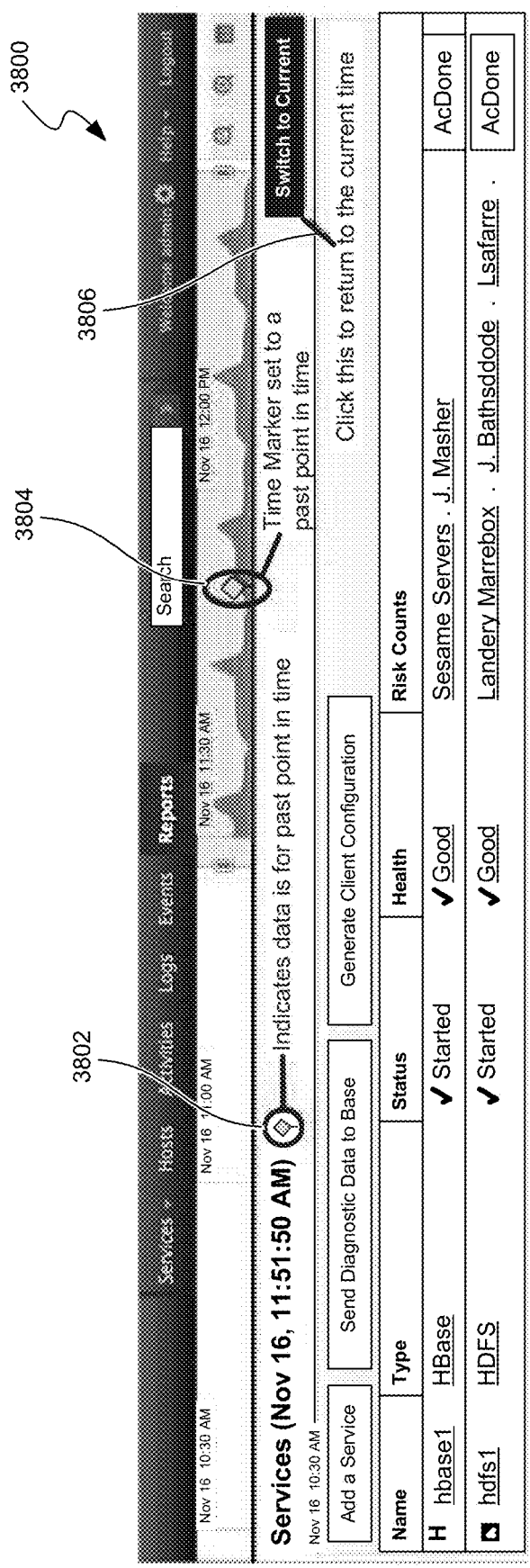
FIG. 38-39 depicts example screenshots showing time interval selectors for selecting a time frame within which to view service information.
Figure 39:
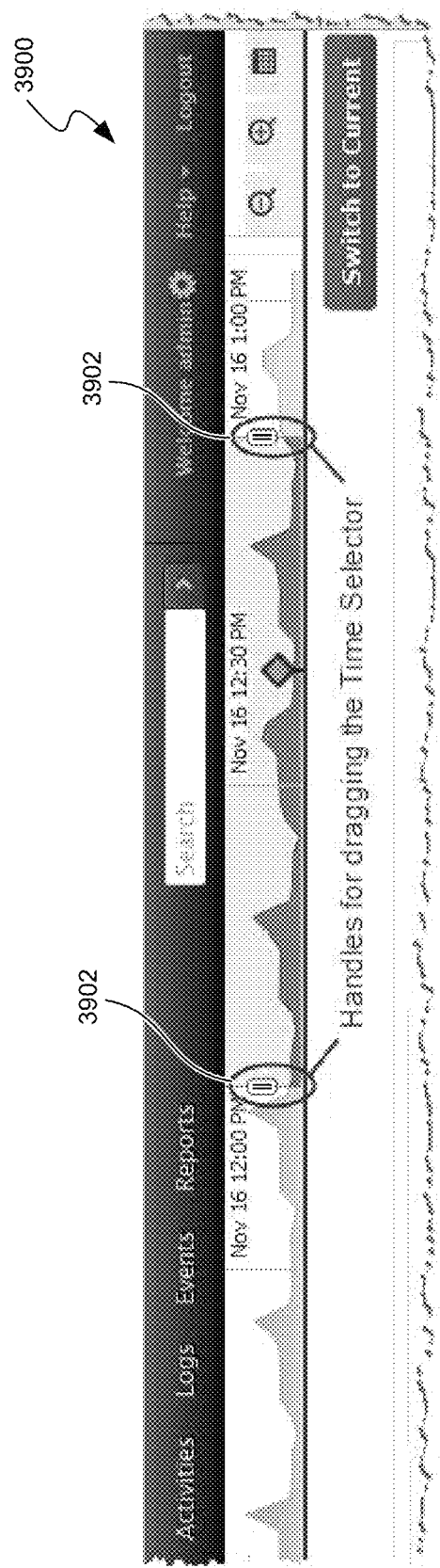

FIG. 38-39 depicts example screenshots 3800 and 3900 showing time interval selectors 3804 for selecting a time frame within which to view service information. Feature 3804 can be used to switch back to monitoring system status in current time or real time.

In one embodiment, the time selector appears as a bar when in the view for the services, activities, logs, and events tabs. In general, the hosts tab shows the current status, and the historical reports available under the reports tab also include time range selection mechanisms. The background chart in the time Selector bar can show the percentage of CPU utilization on all machines in the cluster which can be updated at approximately one-minute intervals, depending on the total visible time range. This graph can be used to identify periods of activity that may be of interest.

FIG. 40 depicts a table showing examples of different levels of health metrics and statuses.

The health check results are presented in the table, and some can also be charted. Other metrics are illustrated as charts over a time range. The summary results of health can be accessed under the Status tab, where various health results determine an overall health assessment of the service or role. In addition, the health of a variety of individual metrics for HDFS, MapReduce and HBase service and role instances is monitored. Such results can be accessed in the Health Tests panel under the Status tab when an HDFS, MapReduce or HBase service or role instance are selected.

The overall health of a role or service is a roll-up of the health checks. In general, if any health check is bad, the service's or role's health will be bad. If any health check is concerning (but none are bad) the role's or service's health will be concerning.

Figure 41:
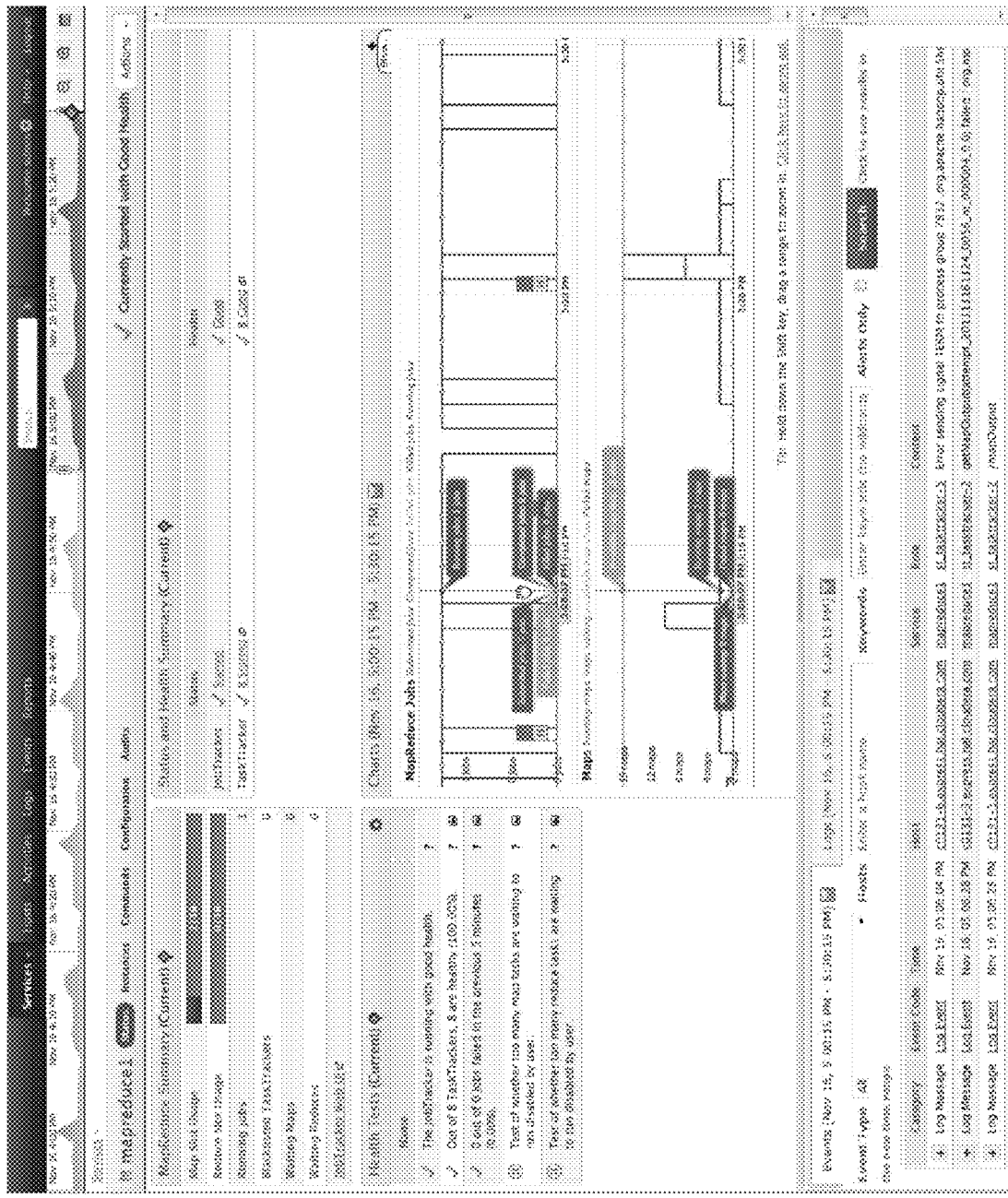
FIG. 41 depicts another screenshot showing the user environment for monitoring health and status information for MapReduce service running on a computing cluster.

FIG. 41 depicts another screenshot showing the user environment 4100 for monitoring health and status information for MapReduce service running on a computing cluster.

There are several types of health checks that are performed for an HDFS, HBase or MapReduce service or role instance including, for example:

Pass/fail checks, such as a service or role started as expected, a DataNode is connected to its NameNode, or a TaskTracker is (or is not) blacklisted. These checks result in the health of that metric being either good or bad.

Metric-type tests, such as the number of file descriptors in use, the amount of disk space used or free, how much time spent in garbage collection, or how many pages were swapped to disk in the previous 15 minutes. The results of these types of checks can be compared to threshold values that determine whether everything is OK (e.g. plenty of disk space available), whether it is "Concerning" (disk space getting low), or is "bad" (a critically low amount of disk space).

In one embodiment, HDFS (NameNode) and HBase also run a health test known as the "canary" test; it periodically does a set of simple create, write, read, and delete operations to determine the service is indeed functioning. In general, most health checks are enabled by default and (if appropriate) configured with reasonable thresholds. The threshold values can be modified by editing the monitoring properties (e.g., under Configuration tab for HDFS, MapReduce or HBase). In addition, individual or summary health checks can be enabled or disabled, and in some cases specify what should be included in the calculation of overall health for the service or role.

HDFS, MapReduce, and HBase services provide additional statistics about its operation and performance, for example, the HDFS summary can include read and write latency statistics and disk space usage, the MapReduce Summary can include statistics on slot usage, jobs, and the HBase Summary can include statistics about get and put operations and other similar metrics.

FIG. 42 depicts a table showing examples of different service or role configuration statuses. The role summary provides basic information about the role instance, where it resides, and the health of its host. Each role types provide Role Summary and Processes panels, as well as the Events and Logs tabs. Some role instances related to HDFS, MapReduce, and HBase also provide a Health Tests panel and associated charts.

Figure 43:
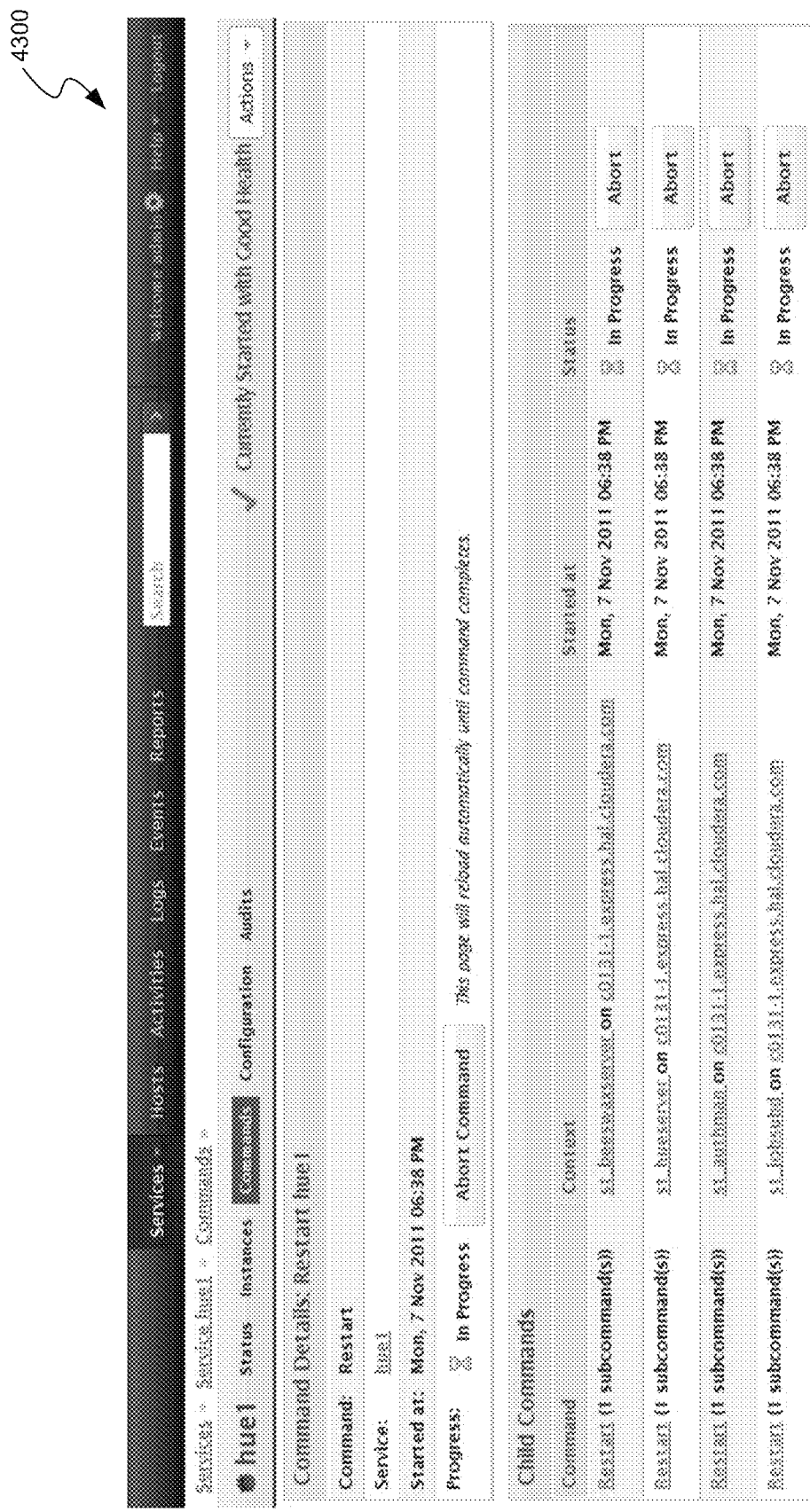
FIG. 43-44 depicts example screenshots showing the user environment for accessing a history of commands issued for a service (e.g., HUE) in the computing cluster.
Figure 44:
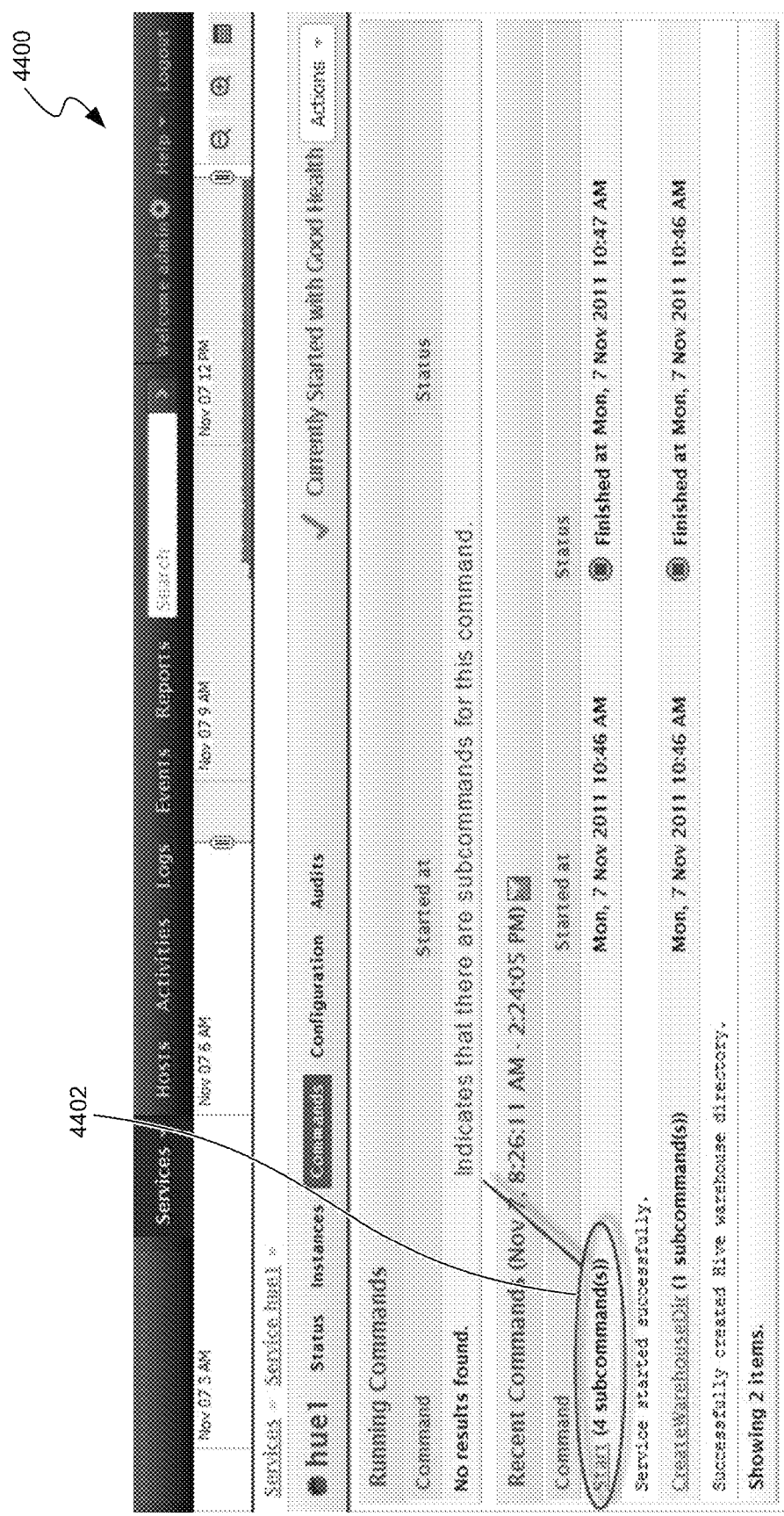
Figure 45:
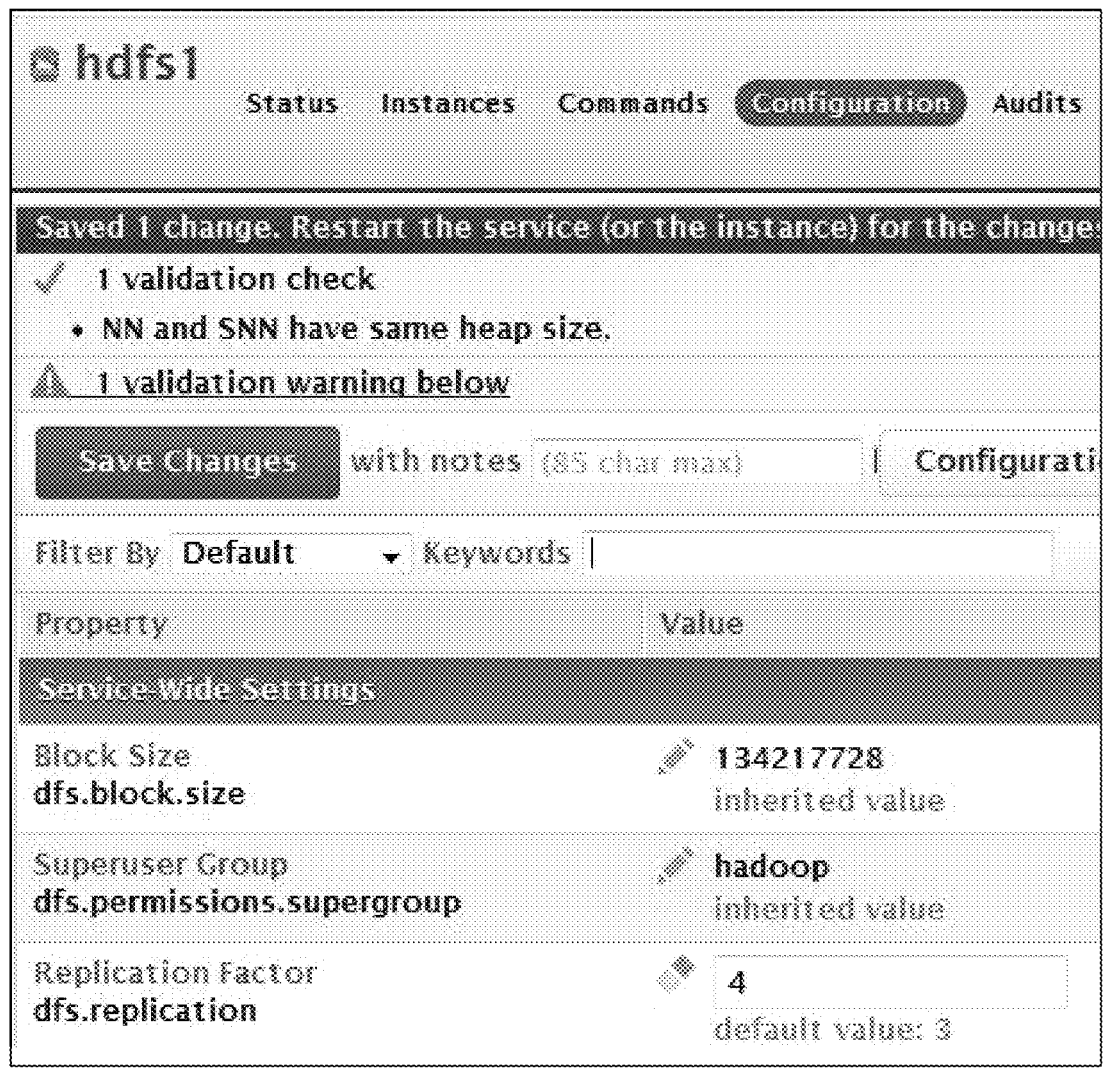
FIG. 45-49 depict example screenshots showing example user interfaces for managing configuration changes and viewing configuration history.
Figure 46:
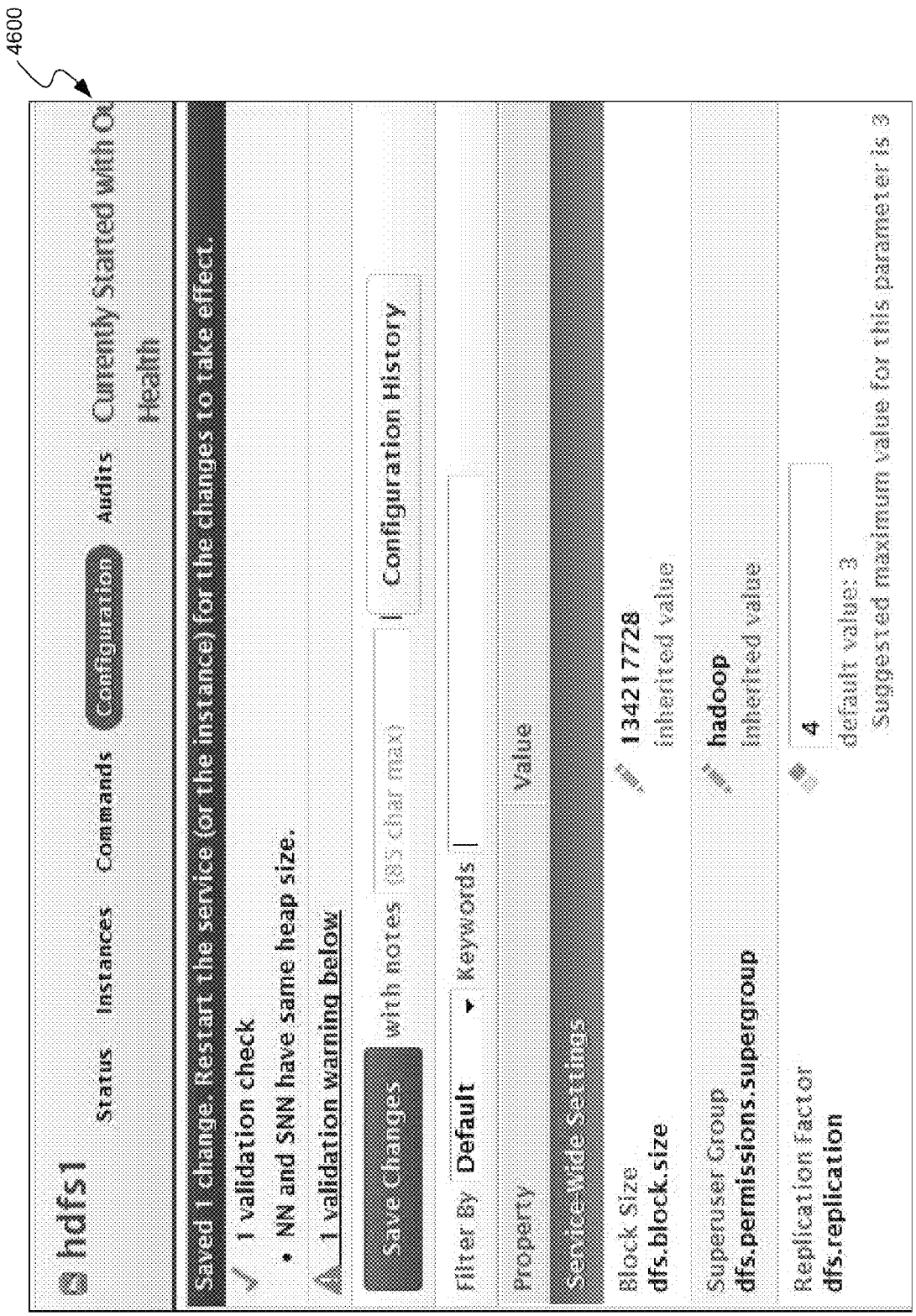
Figure 47:
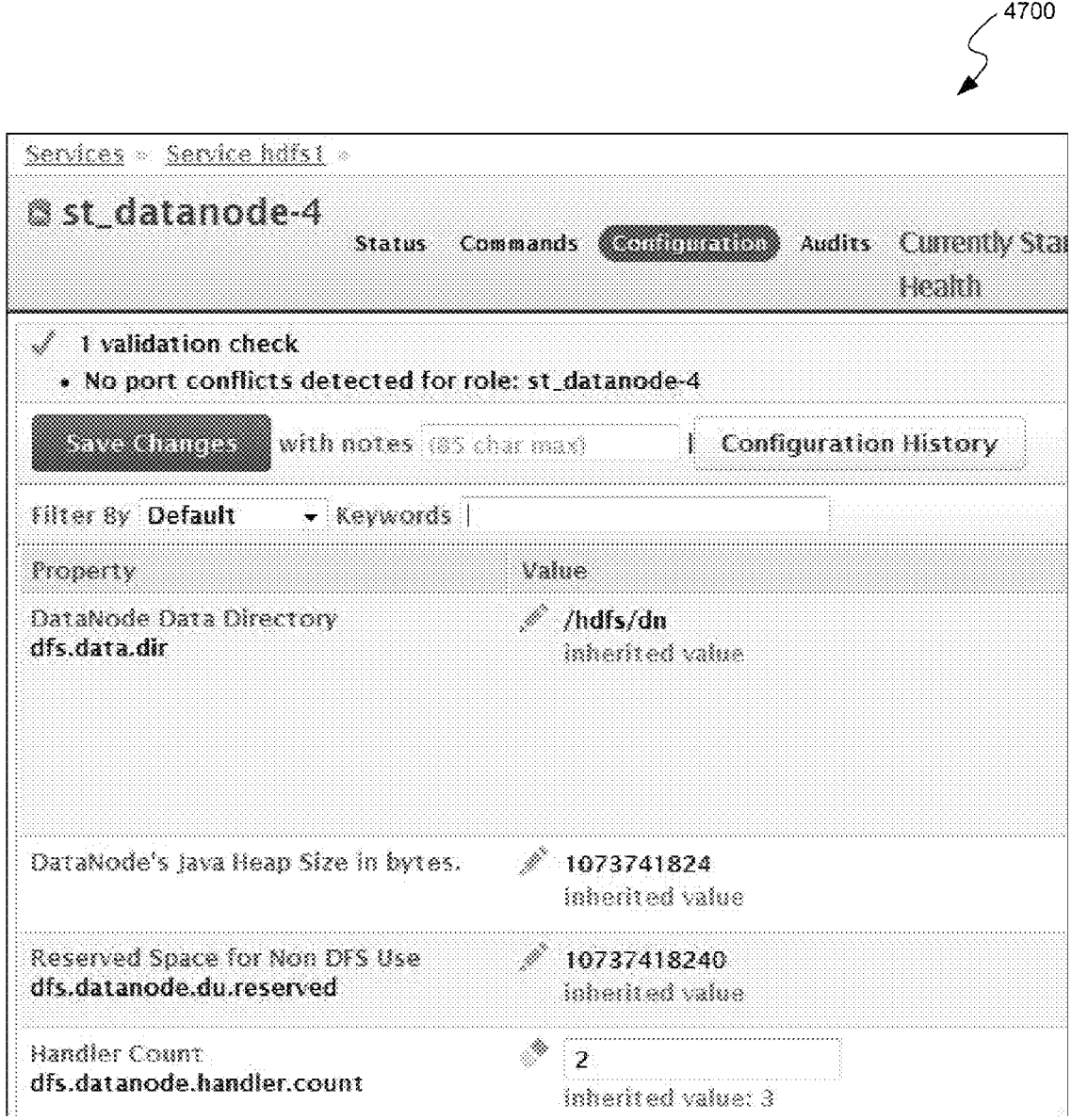
Figure 48:
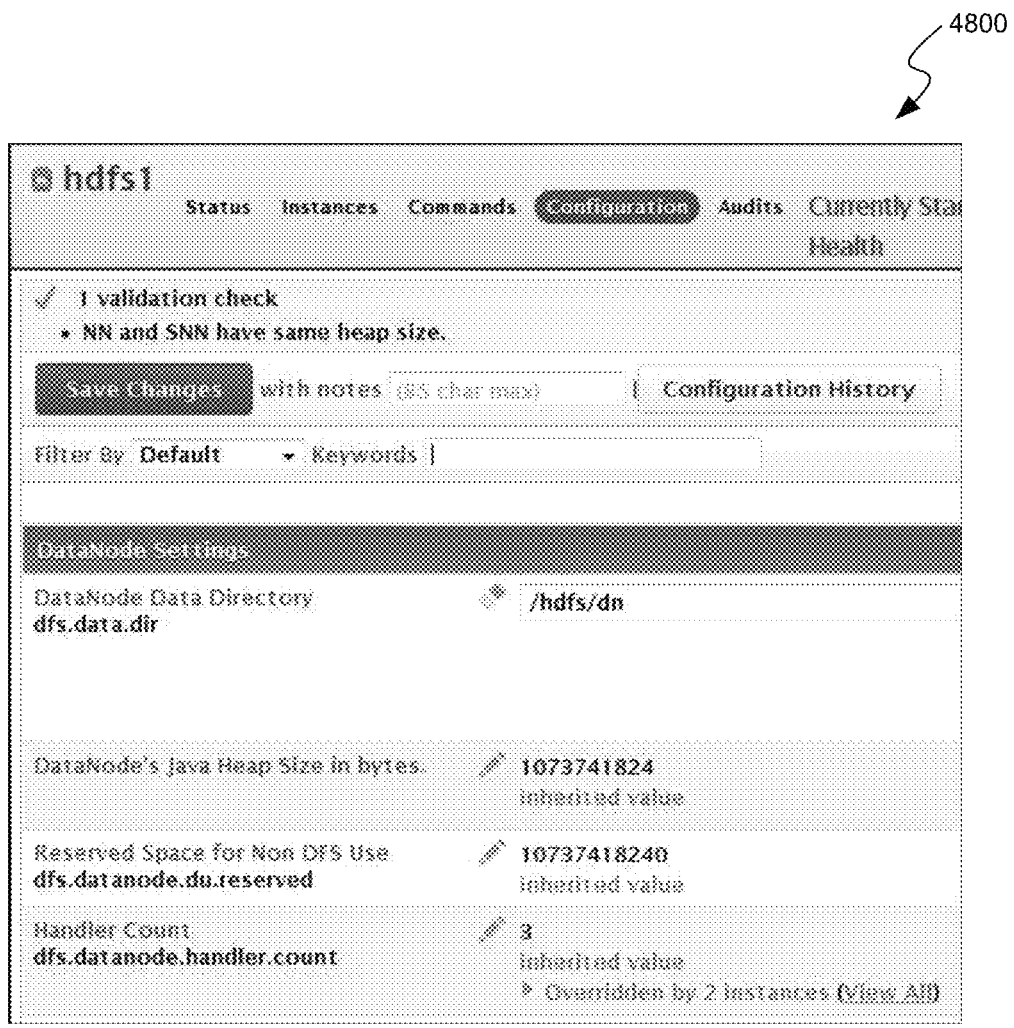
Figure 49:
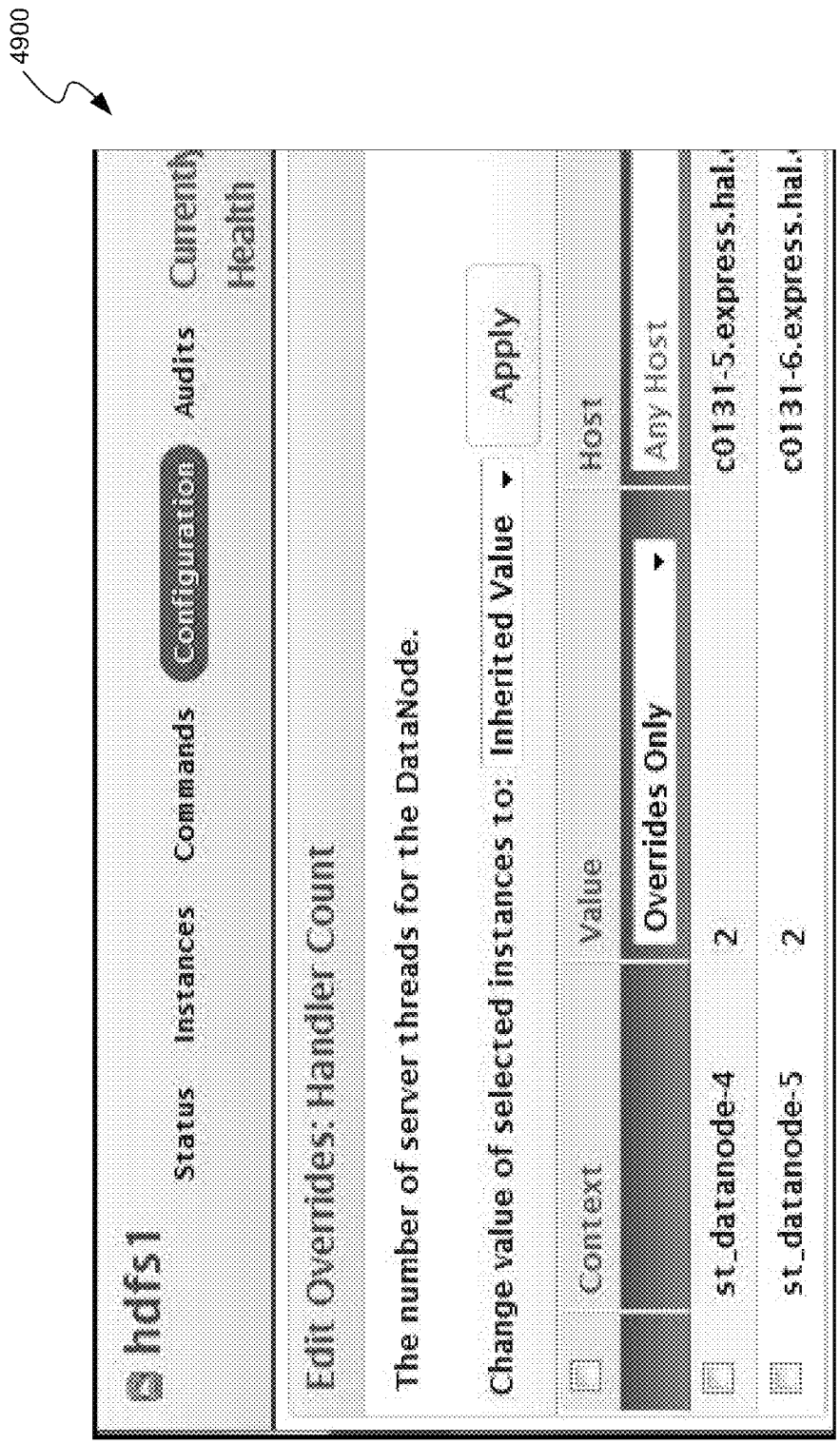

FIG. 43-44 depicts example screenshots showing the user environment 4300 and 4400 for accessing a history of commands 4402 issued for a service (e.g., HUE) in the computing cluster.

FIG. 45-49 depict example screenshots showing example user interfaces for managing configuration changes and viewing configuration history.

FIG. 50A depicts an example screenshot showing the user environment 5000 for viewing jobs and running job comparisons with similar jobs.

The system's activity monitoring capability monitors the jobs that are running on the cluster. Through this feature, operators can view which users are running jobs, both at the current time and through views of historical activity, and it provides many statistics about the performance of and resources used by those jobs. When the individual jobs are part of larger workflows (via Oozie, Hive, or Pig), these jobs can be aggregated into 'activities' that can be monitored as a whole as well as by the component jobs. From the activities tab information about the activities (jobs and tasks) that have run in the cluster during a selected time span can be viewed.

The list of activities provides specific metrics about the activities activity that were submitted, were running, or finished within a selected time frame. Charts that show a variety of metrics of interest, either for the cluster as a whole or for individual jobs can be depicted. Individual activities can be selected and drilled down to look at the jobs and tasks spawned by the activity. For example, view the children of a Pig, Hive or Oozie activity—the MapReduce jobs it spawns, view the task attempts generated by a MapReduce job, view the activity or job statistics in a report format, compare the selected activity to a set of other similar activities, to determine if the selected activity showed anomalous behavior, and/or display the distribution of task attempts that made up a job, by amount of input or output data or CPU usage compared to task duration.

This can be used to determine if tasks running on a certain host are performing slower than average. The compare tab can be used to view the performance of the selected job compared with the performance of other similar jobs. In one embodiment, the system identifies jobs that are similar to each other (jobs that are basically running the same code—the same Map and Reduce classes, for example). For example, the activity comparison feature compares performance and resource statistics of the selected job to the mean value of those statistics across a set of the most recent similar jobs. The table can provide indicators of how the selected job deviates from the mean calculated for the sample set of jobs, and provides the actual statistics for the selected job and the set of the similar jobs used to calculate the mean. FIG. 50B depicts a table showing the functions provided via the user environment of FIG. 50A. FIG. 50C-D depict example legends for types of jobs and different job statuses shown in the user environment of FIG. 50A.

Figure 51:
FIG. 51-52 depict example screenshots depicting user interfaces which show resource and service usage by user.
Figure 52:

FIG. 51-52 depict example screenshots 5100 and 5200 depicting user interfaces which show resource and service usage by user.

A tabular report can be queried or generated to view aggregate job activity per hour, day, week, month, or year. In the Report Period field, the user can select the period over which the metrics are aggregated. For example, it the user elects to aggregate by User, Hourly, the report will provide a row for each user for each hour.

For weekly reports, the date can indicate the year and week number (e.g. 2011-01 through 2011-52). For monthly reports, the date typically indicates the year and month by number (2011-01 through 2011-12). The activity data in these reports comes from the activity monitor and can include the data currently in the Activity Monitor database.

FIG. 53-57 depict example screenshots showing user interfaces for managing user accounts.

The manager accounts allow users to log into the console. In one embodiment, the user accounts can either have administrator privileges or no administrator privileges: For example, admin privileges can allow the user to add, change, delete, and configure services or administer user accounts and user accounts that without administrator privileges can view services and monitoring information but cannot add services or take any actions that affect the state of the cluster.

Figure 53:
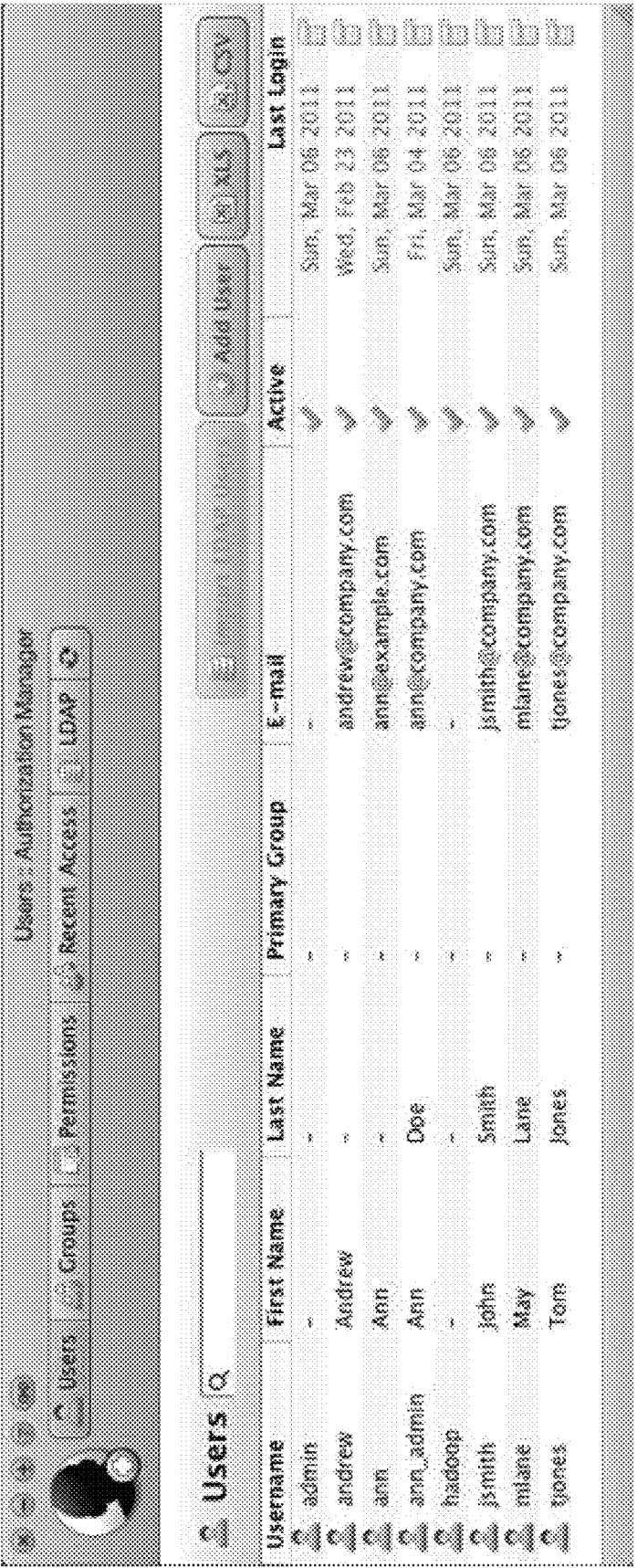
Figure 55:
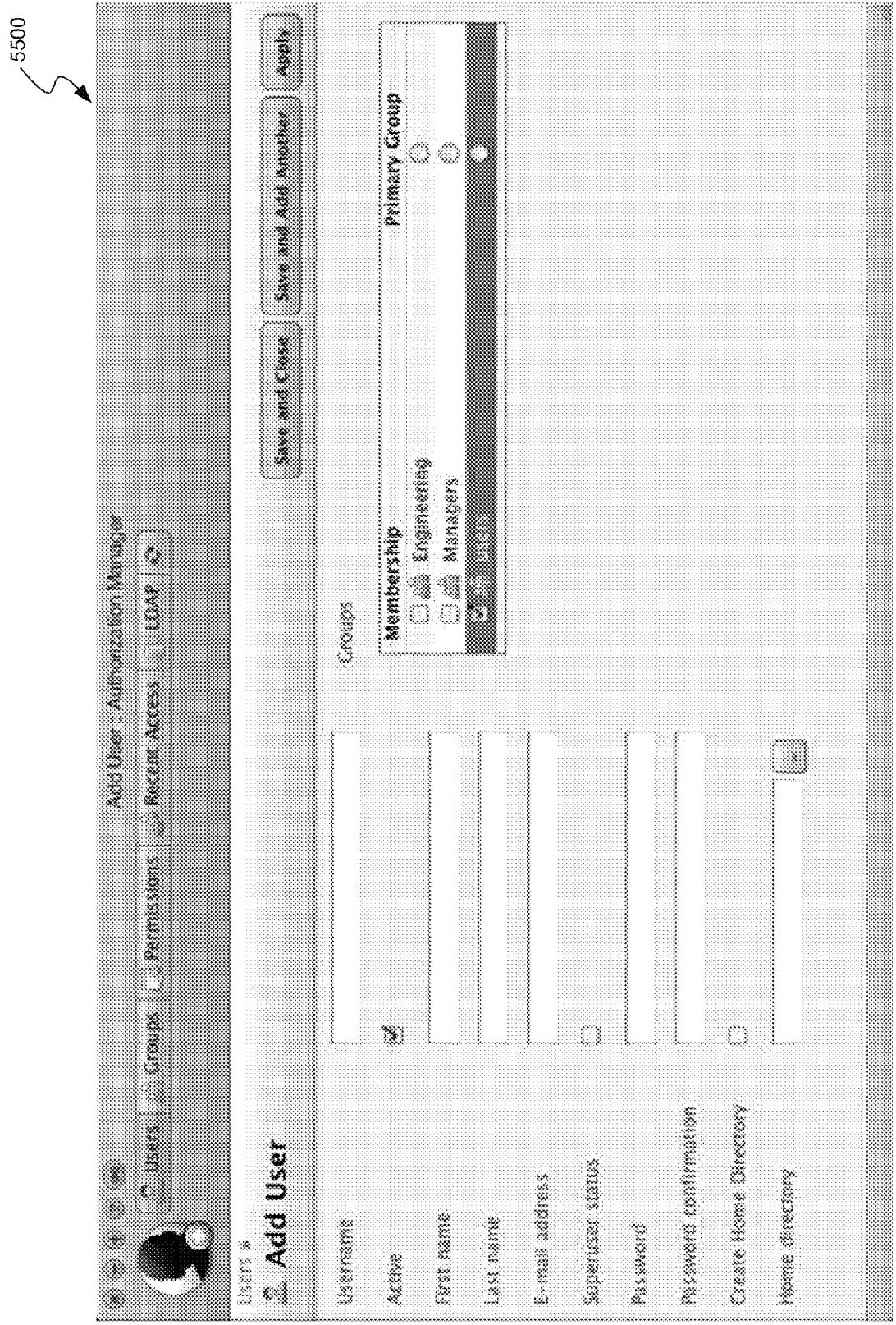

This list shown in the example of FIG. 53 shows the user accounts. In addition to the user's identifying information, the list can also include the following information:

The user's Primary Group, if one has been assigned; whether the account has been enabled: A check appears in the active column for an enabled account. The date and time of the user's last login into Hue.

Three example levels of user privileges include:

Superusers—have all permissions to perform any administrative function. A superuser can create more superusers and user accounts, and can also change any existing user account into a superuser. Superusers add the groups, add users to each group, and add the group permissions that specify which applications group members are allowed to launch and the features they can use. Superusers can modify MapReduce queue access control lists (ACLs). A superuser can also import users and groups from an LDAP server. In some instances, the first user who logs into after its initial installation automatically becomes the superuser.

Users—have the permissions specified by the union of their group memberships to launch and use Hue applications. Users may also have access privileges to Hadoop services. Imported users are those that have been imported from an LDAP server, such as Active Directory. There are restrictions on the degree to which, a supervisor, for example, can manage imported users.

Figure 58:
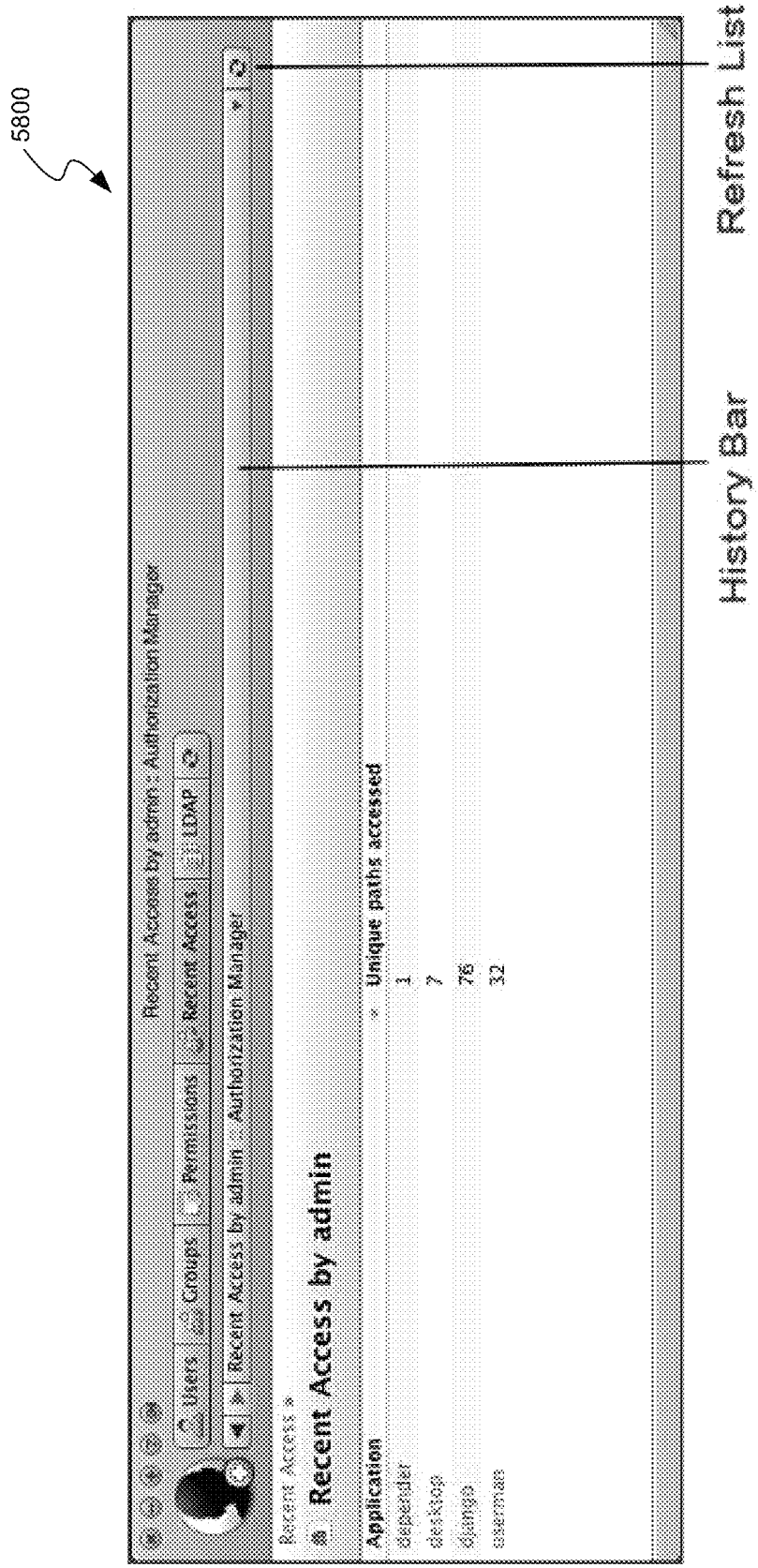
FIG. 58-59 depict example screenshots showing user interfaces for viewing applications recently accessed by users.
Figure 59:
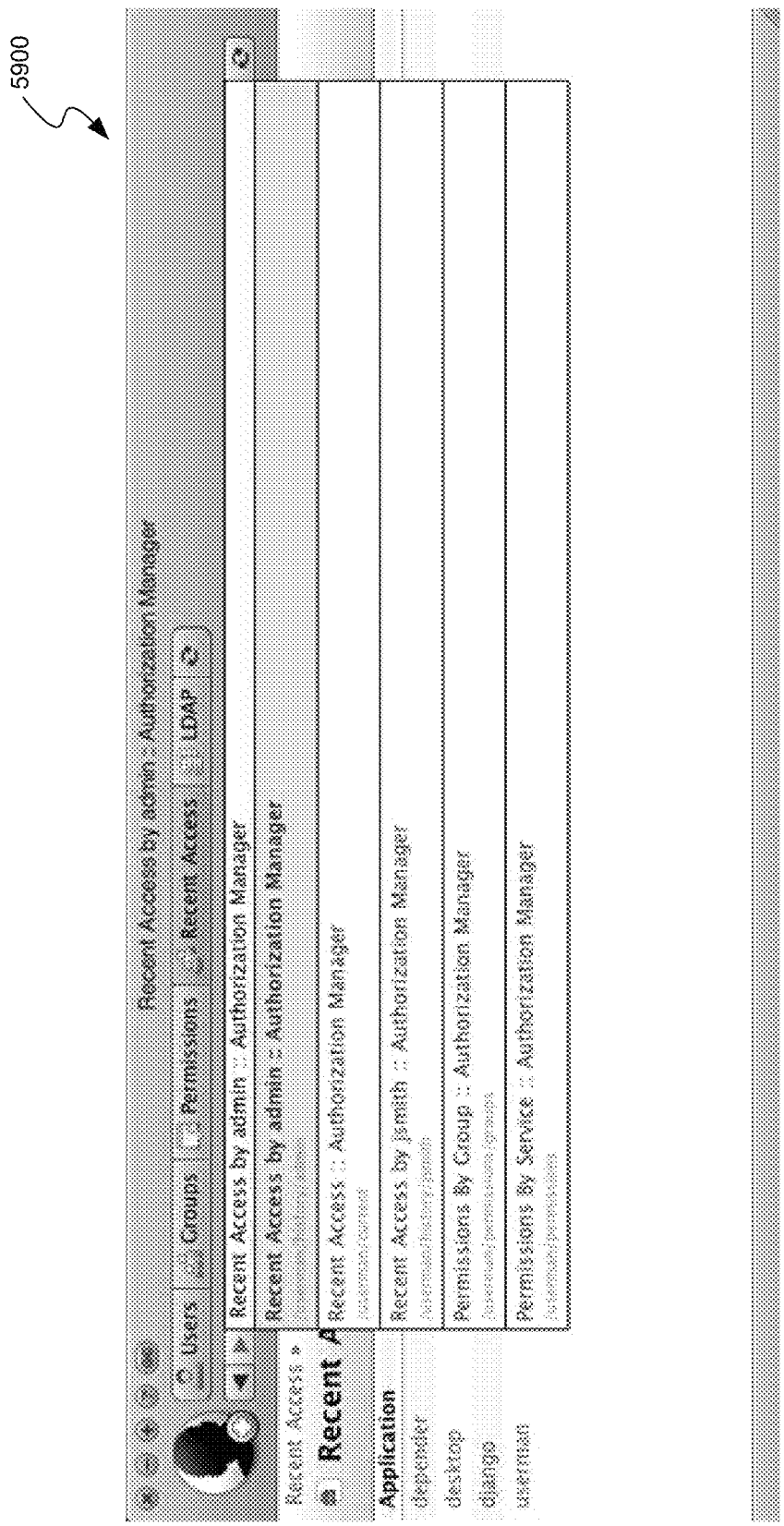

Group administrators—have administration rights for selected groups of which they are members. They can add and remove users, create subgroups, and set and remove permissions for the groups they administer, and any subgroups of those groups. In other respects, they can behave like regular users. The table shown in the example of FIG. 54 summarizes the authorization manager permissions for superusers, group administrators, and users. The table of FIG. 56 describes the options in the add user dialog box shown in the example of FIG. 55. FIG. 58-59 depict example screenshots showing user interfaces for viewing applications recently accessed by users.

Figure 60:
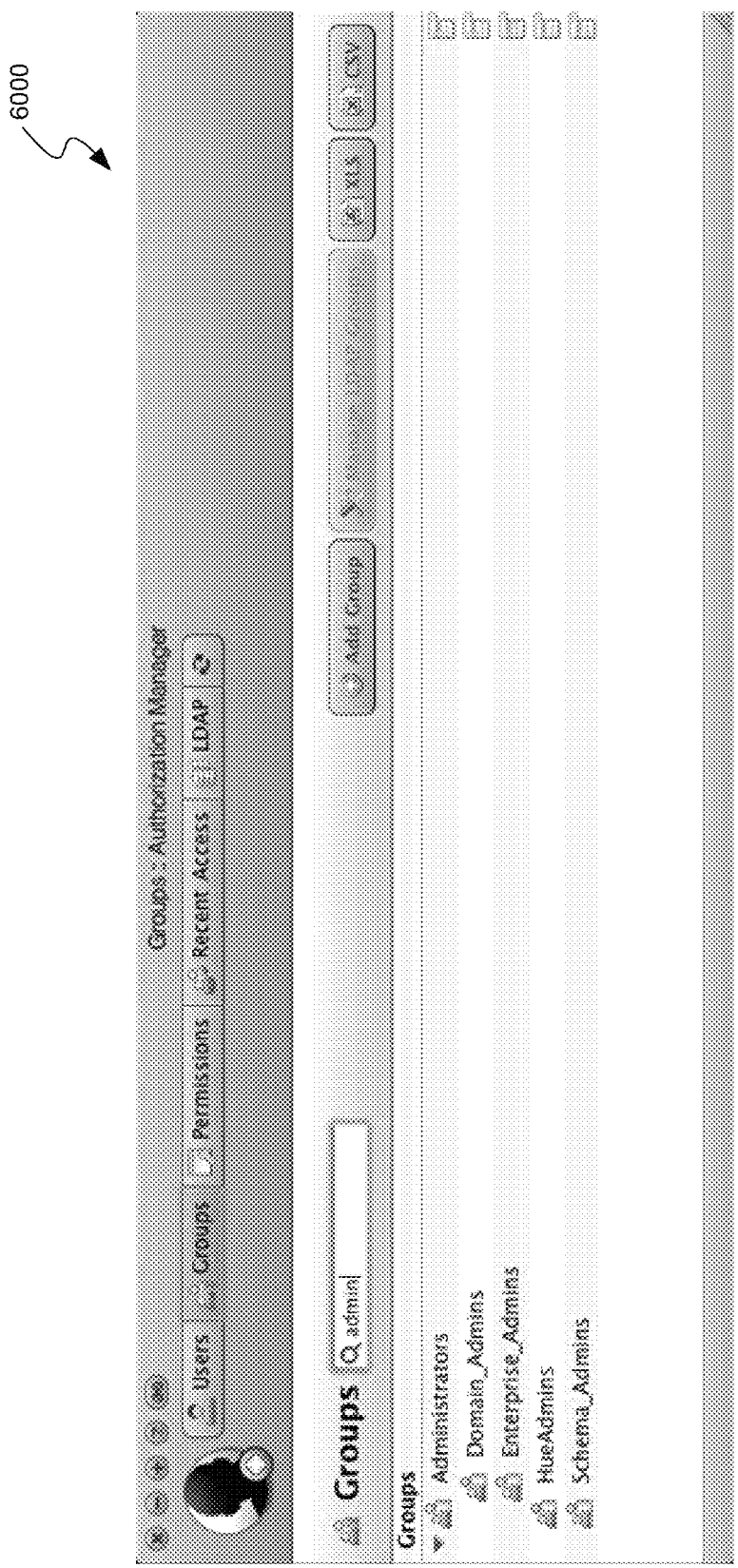
FIG. 60-62 depict example screenshots showing user interfaces for managing user groups.
Figure 61:
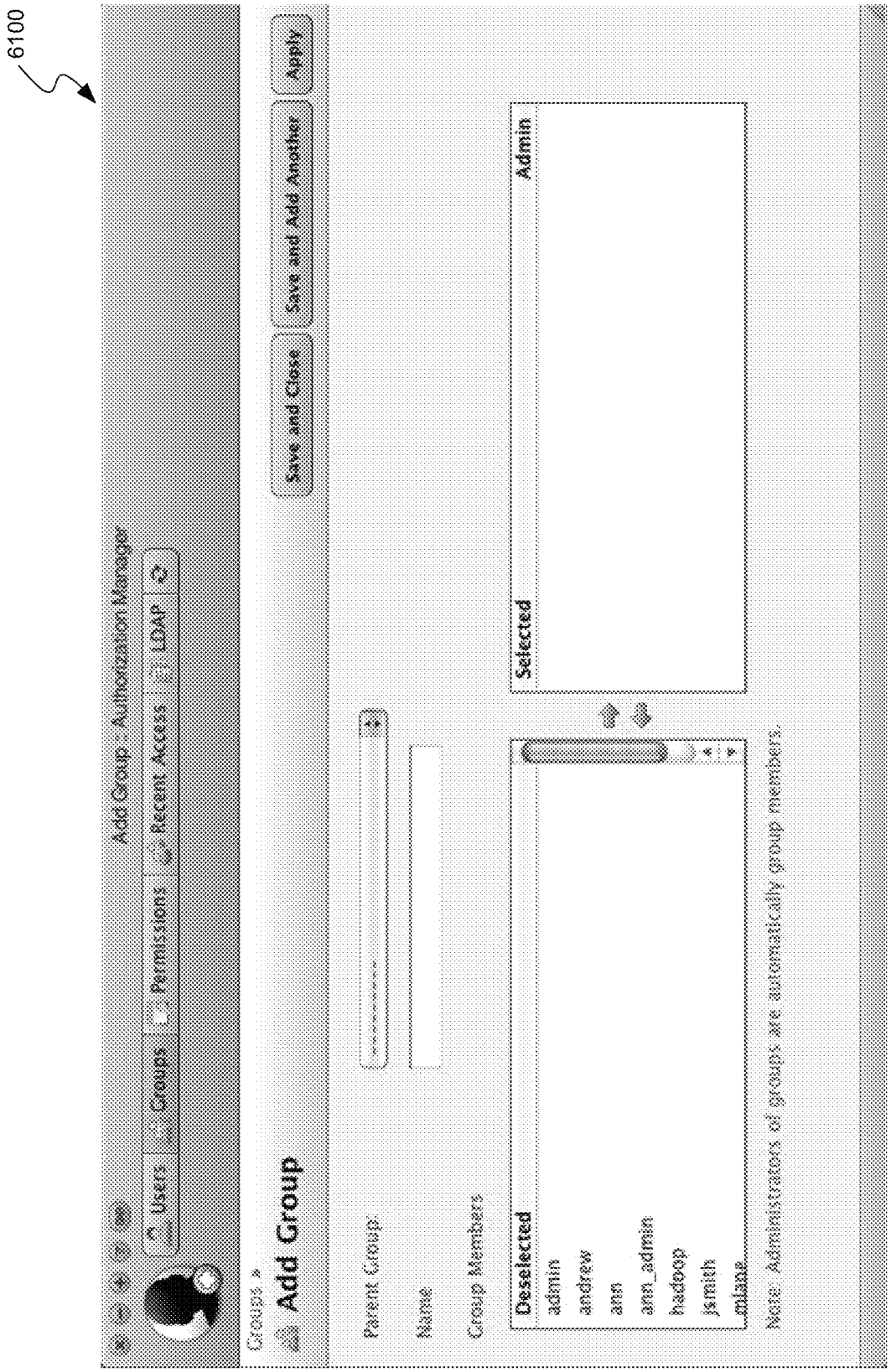
Figure 62:
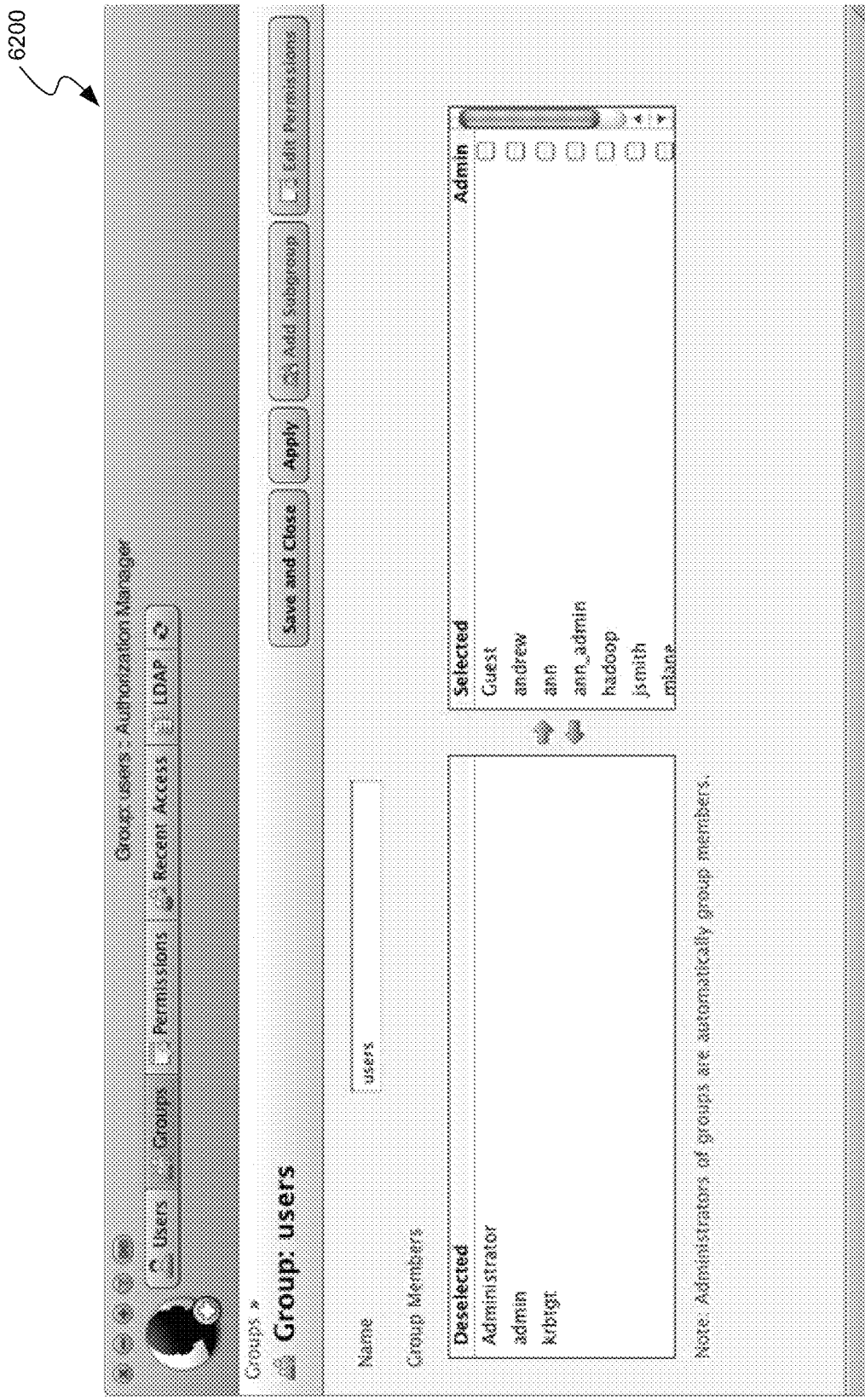

FIG. 60-62 depict example screenshots showing user interfaces for managing user groups.

Superusers and Group Administrators can typically add groups, delete the groups they have created, configure group permissions, and assign users to group memberships, as shown in th example of FIG. 60-FIG. 61. In general, a group administrator can perform these functions for the groups that he administers, and their subgroups. A Superuser can typically perform these functions for all groups. Users can add and remove users, and create subgroups for groups created manually in Authorization Manager.

Figure 63:
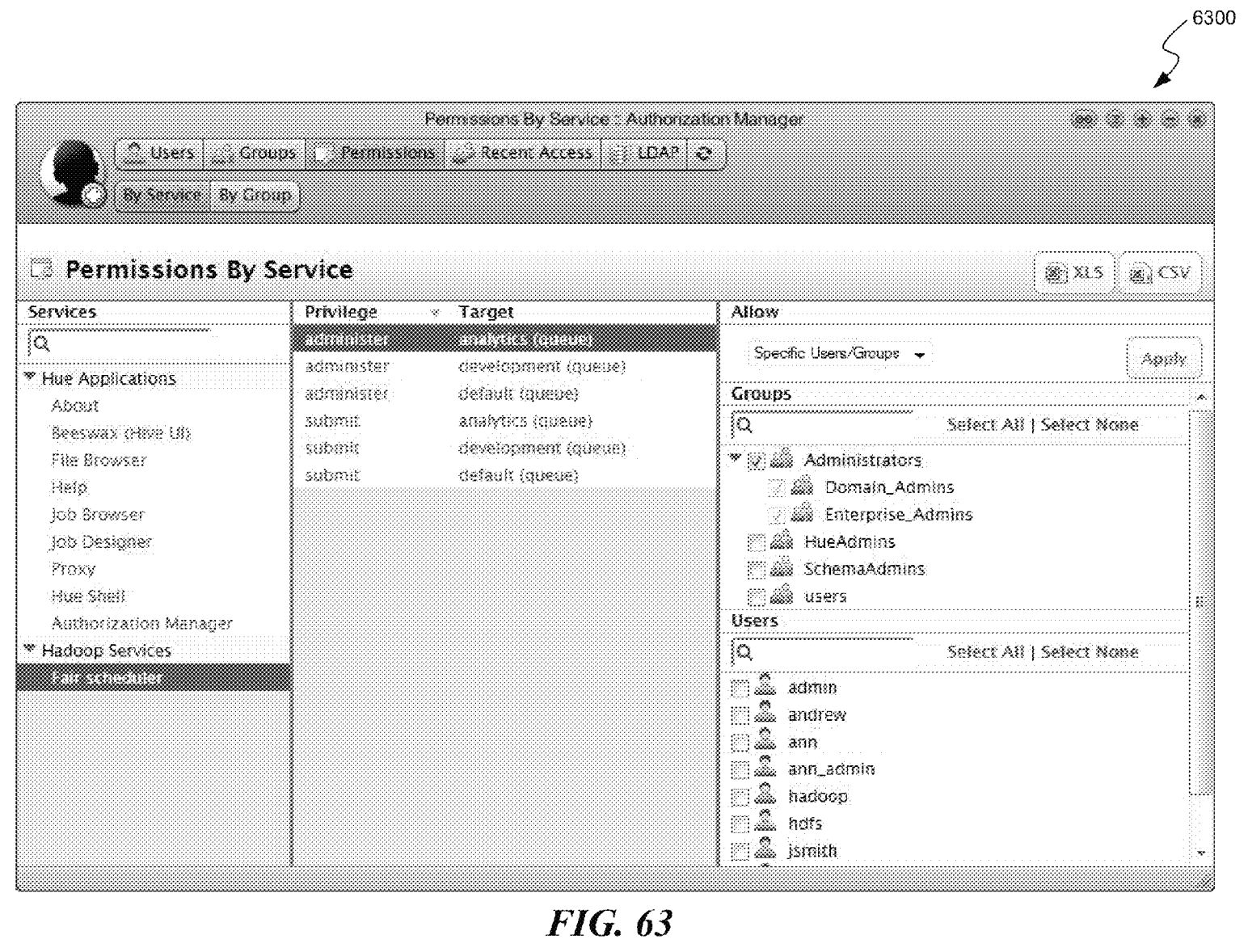
Figure 64:
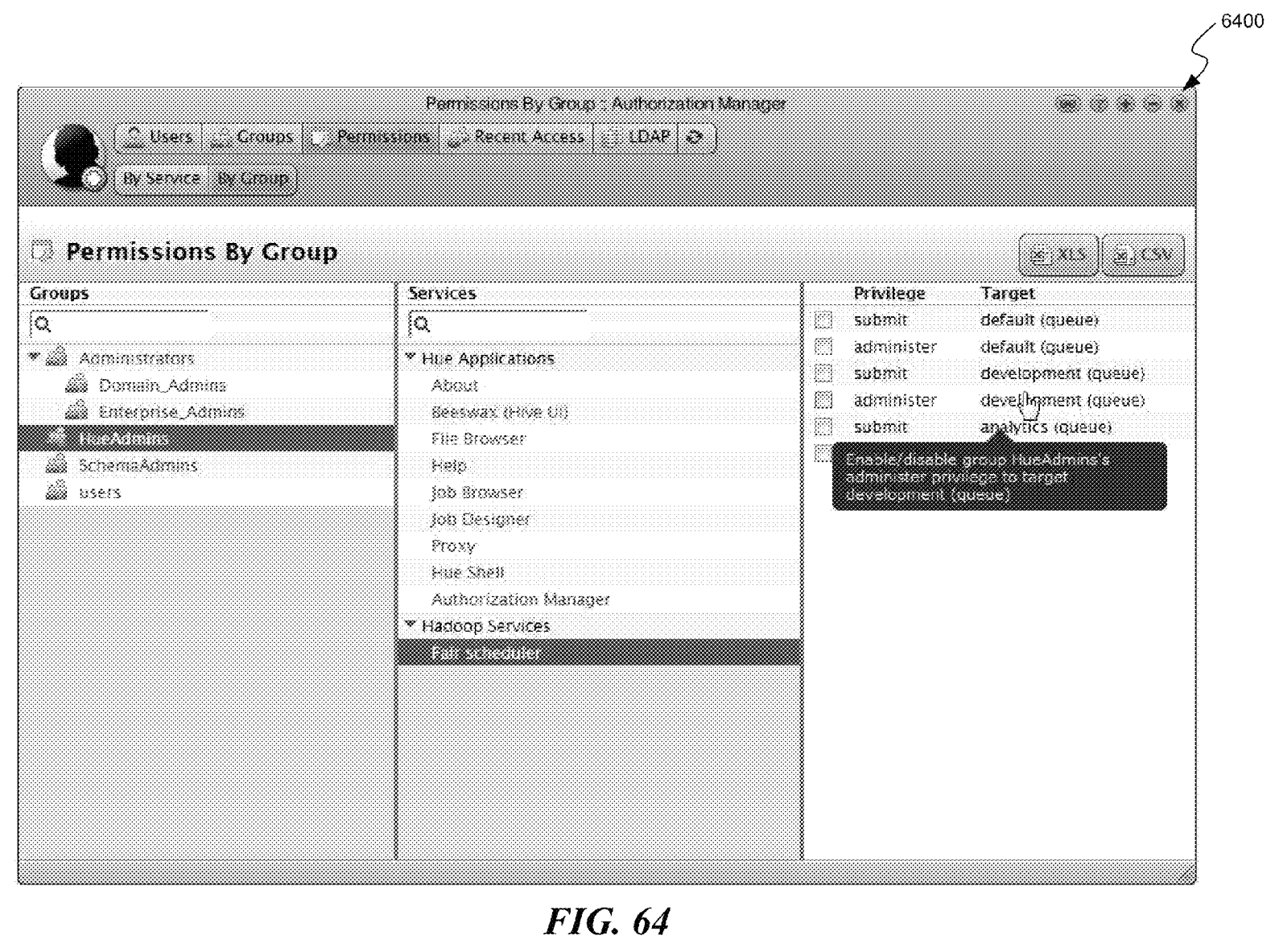

FIG. 63-64 depict example screenshots showing user interfaces for managing permissions for applications by service or by user groups.

Permissions for applications can be granted to groups, with users gaining permissions based on their group membership, for example. In one embodiment, superusers and group administrators can assign or remove permissions from groups, including groups imported from LDAP. Permissions can be set by a group administrator for the groups she administers. In one embodiment, a superuser can set permissions for any group.

Permissions for Hadoop services, such as Fair Scheduler access, can be set for groups or for individual users. Group permissions can define the applications that group members are allowed to launch, and the features they can use. In general, subgroups inherit the permissions of their parent group. A superuser or group administrator can turn off inherited permissions for a subgroup, thereby further restricting access for subgroup members, and can re-enable those permissions (as long as they remain enabled for the parent group). However, if permission is disabled for the parent, it cannot be enabled for the subgroups of that parent.

Permissions can be assigned by service or by group. Assigning permissions by group means that the assignment process starts with the group, and then application or service privileges to assign to that group can be selected. Assigning permissions By Service means the assignment process starts with an application or service and a privilege, and then the groups that should have access to that service can be selected.

In one embodiment, superuser or a group administrators can specify the users and groups that have access privileges when access control is enabled. Service permissions can be granted both to groups and to individual users. Granting permissions to a group automatically grants those permissions to all its members, and to all members of its subgroups.

Figure 65:
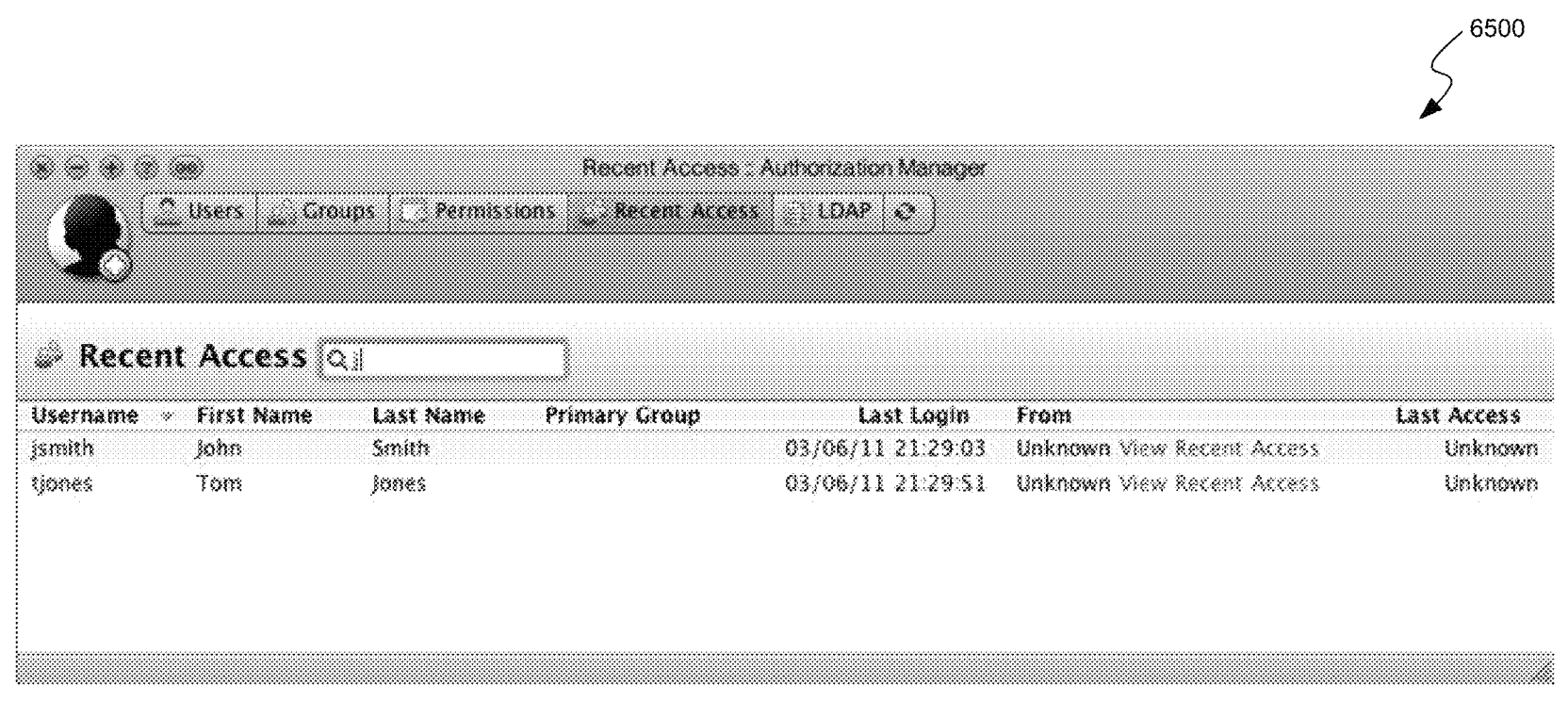

FIG. 65 depicts an example screenshot showing the user environment 6500 for viewing recent access information for users.

Figure 66:
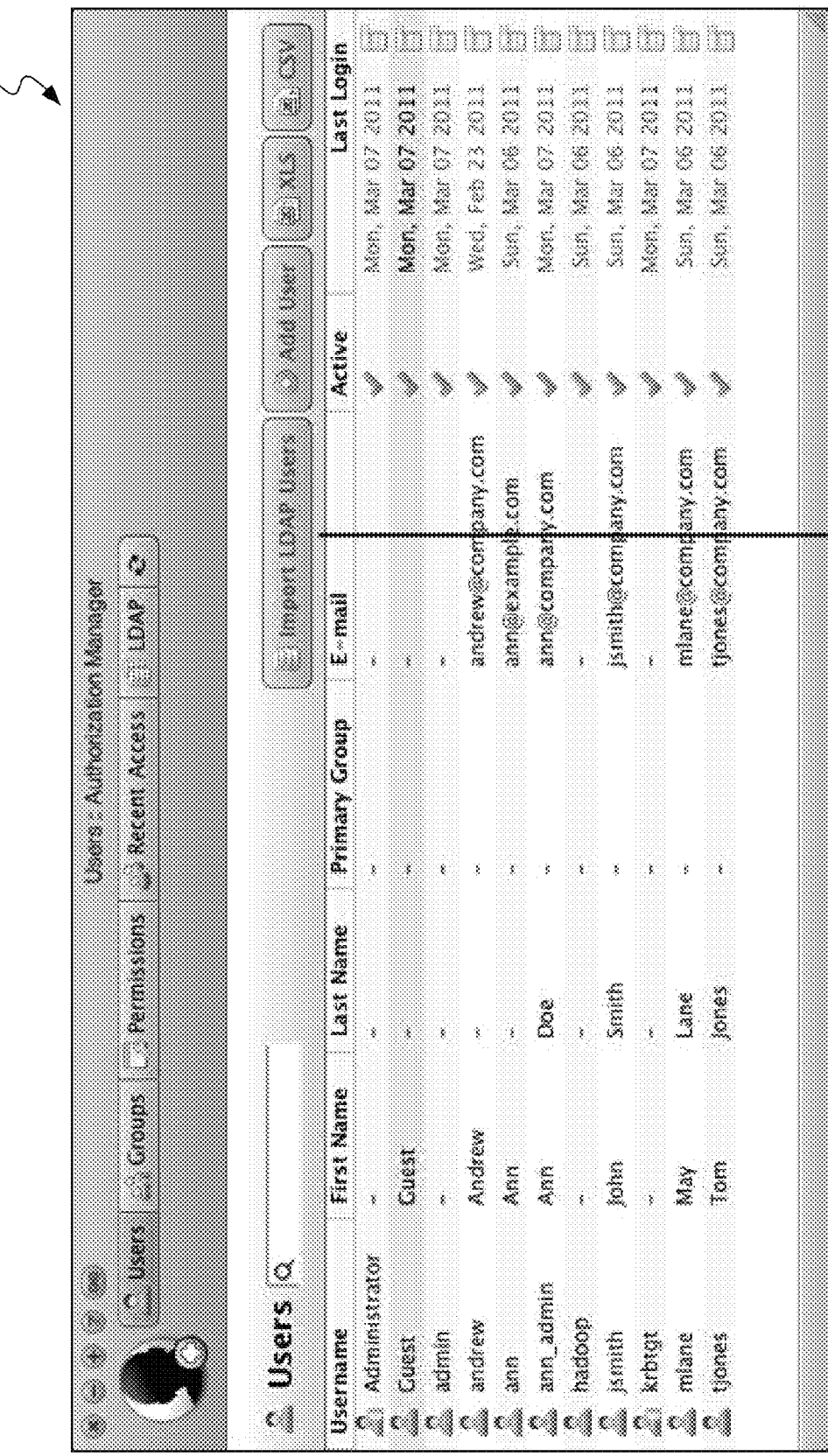
FIG. 66-68 depicts example screenshots showing user interfaces for importing users and groups from an LDAP directory.
Figure 67:
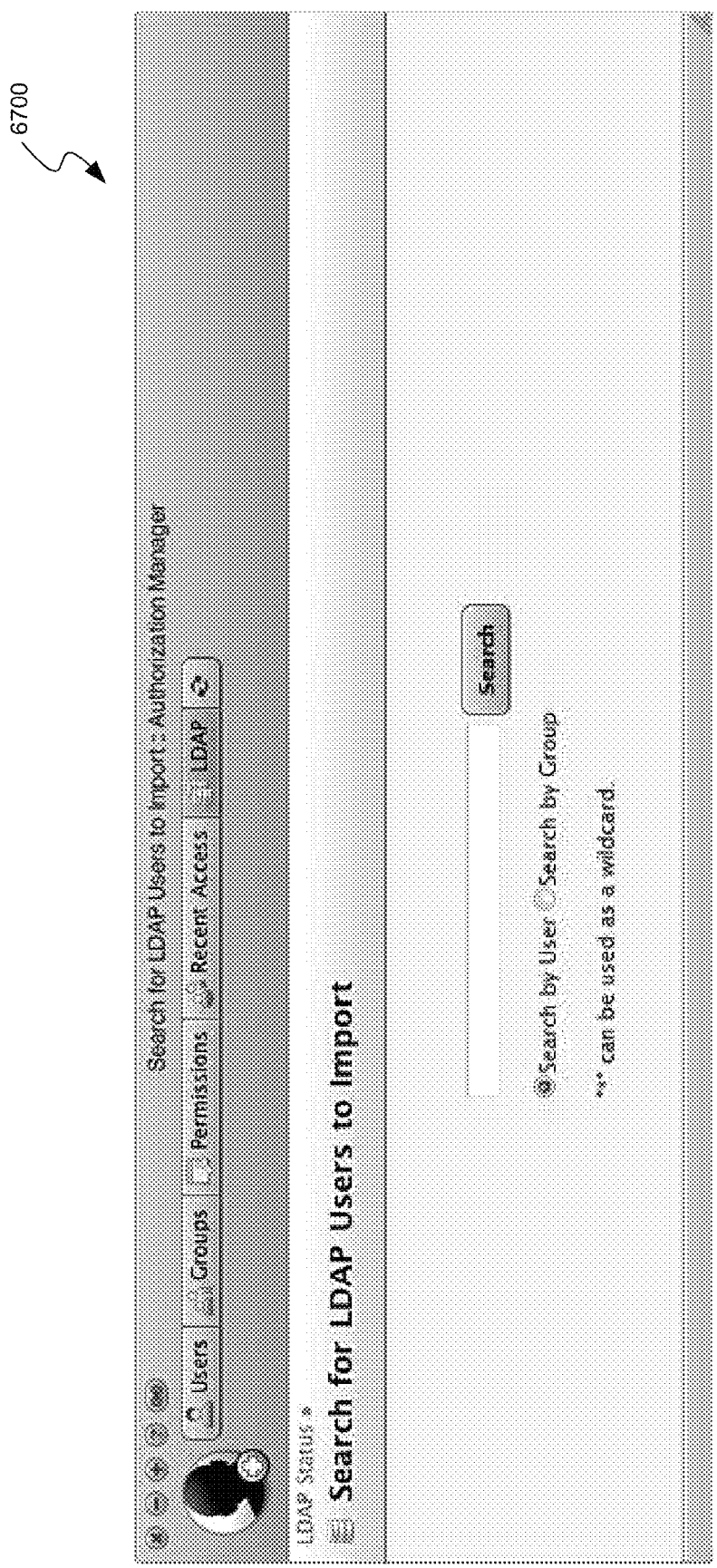
Figure 68:
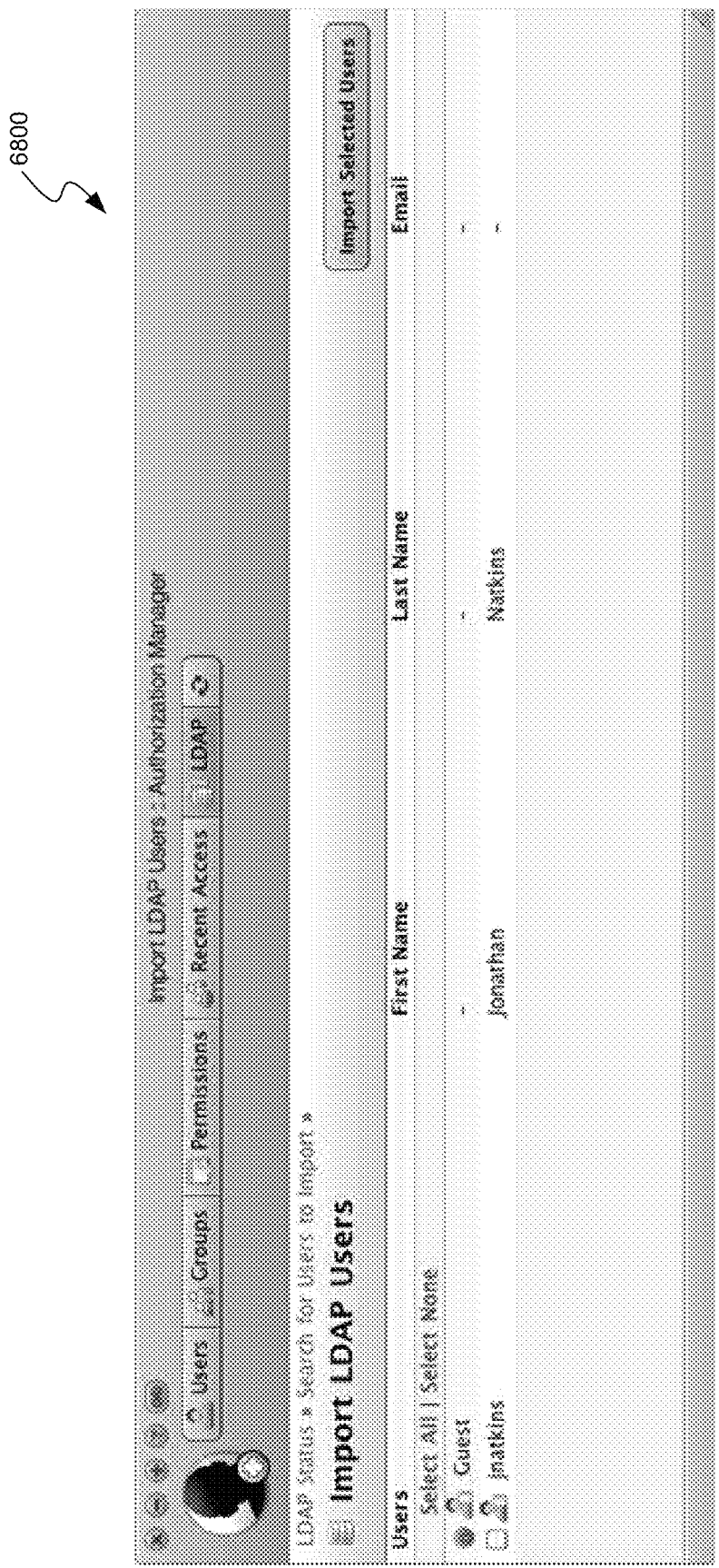

For each user, the report shows their name and primary group membership, the last login date and time, the IP address of the client system from which the user connected, and the date and time of the last launch of the Hue application FIG. 66-68 depicts example screenshots showing user interfaces for importing users and groups from an LDAP directory.

Figure 69:
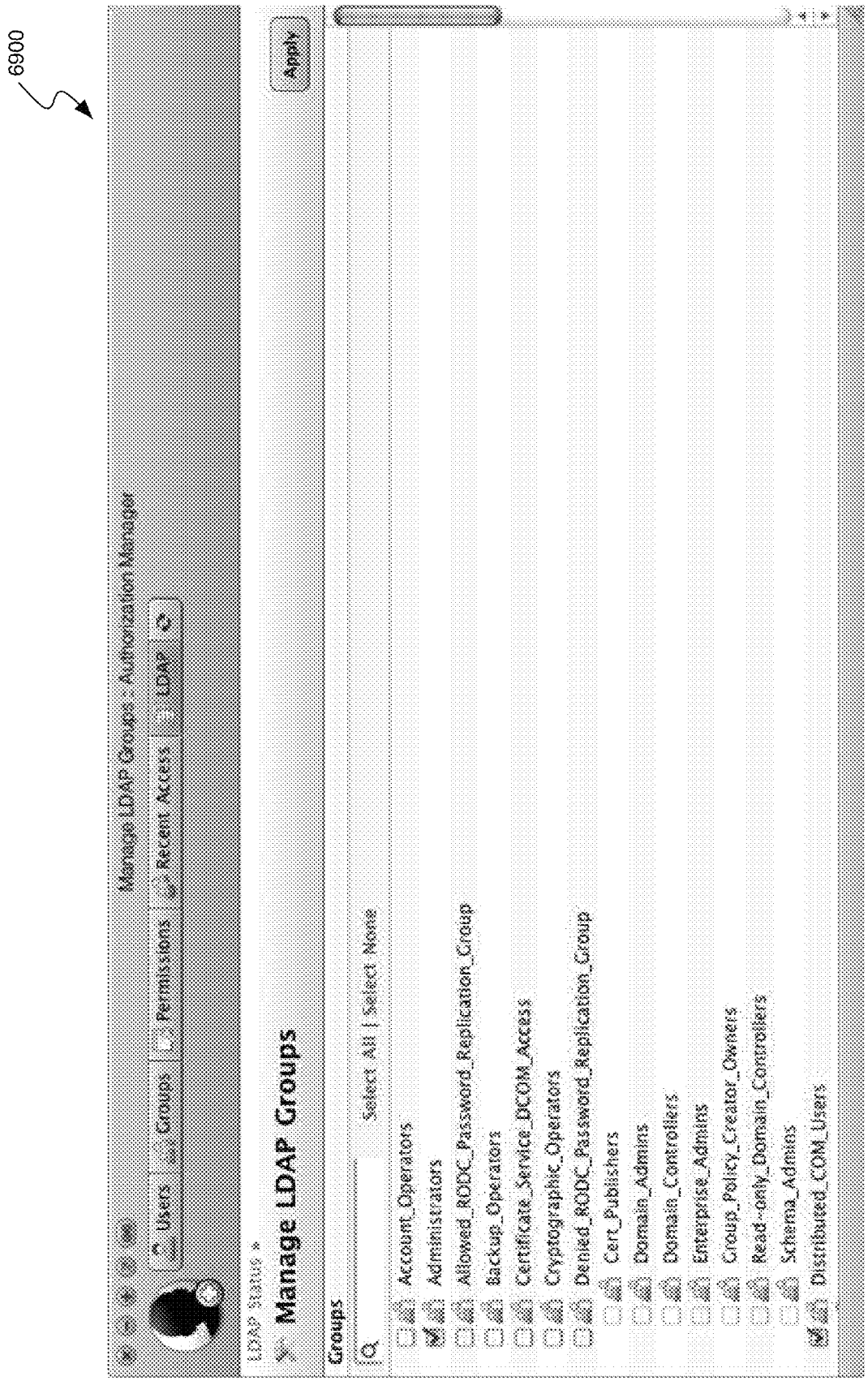
FIG. 69 depicts an example screenshot showing the user environment for managing imported user groups.

FIG. 69 depicts an example screenshot showing the user environment 6900 for managing imported user groups. The Import LDAP Users command can be used to import all groups found in the LDAP directory, many of which may not be relevant to the users. The groups that are not of interest from the Manage LDAP Groups page can be hidden.

Figure 70:
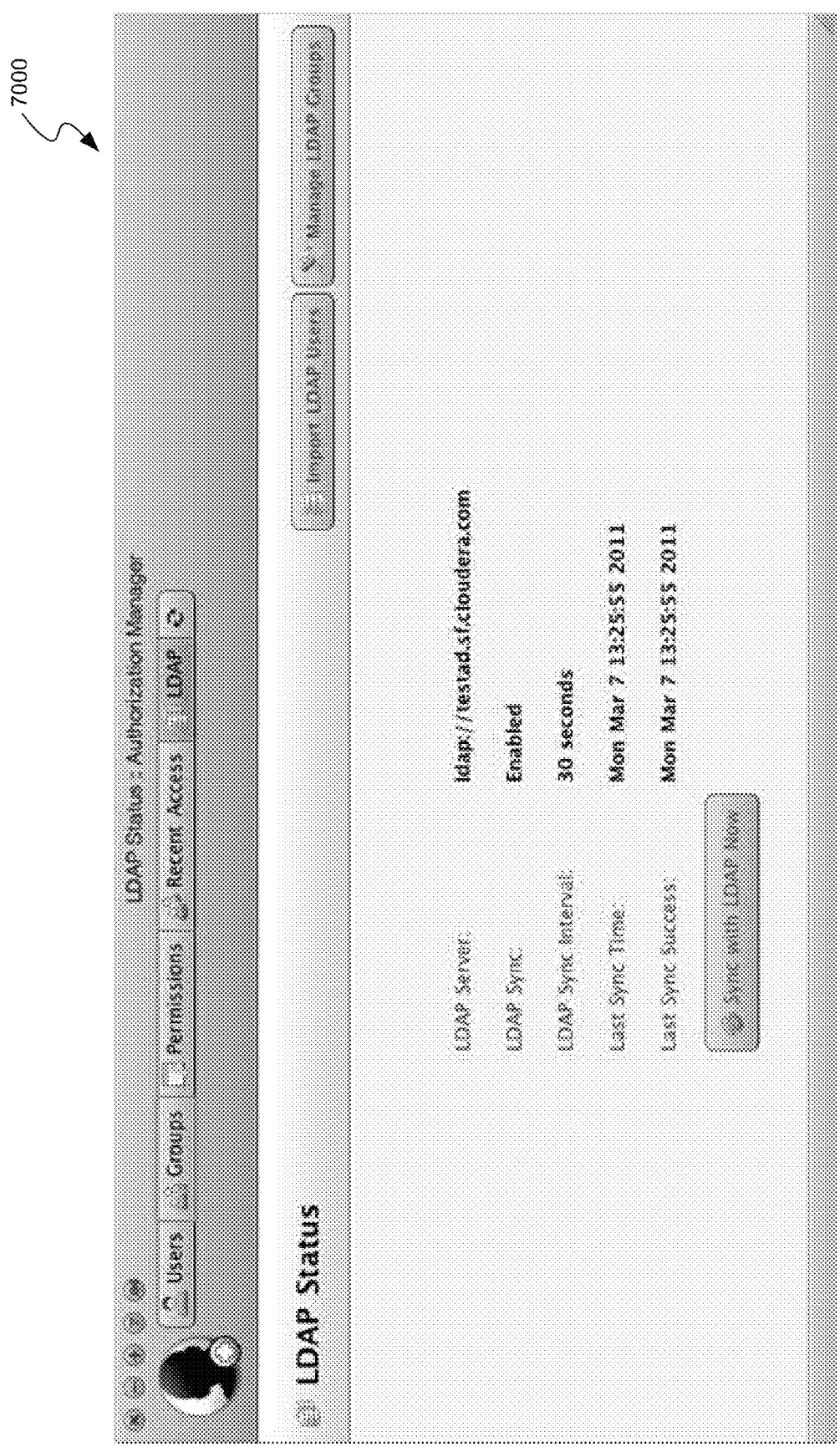
FIG. 70 depicts an example screenshot showing the user environment for viewing LDAP status.

FIG. 70 depicts an example screenshot 7000 showing the user environment for viewing LDAP status.

The sync timestamps show the dates and times of the most recent LDAP directory synchronization, and the most recent successful and unsuccessful syncs. If periodic LDAP synchronization is disabled, manual synchronization can be used on demand. Sync with LDAP Now can be used to initiate database synchronization. This causes an immediate sync with the LDAP directory, regardless of whether periodic sync is enabled.

Figure 71:
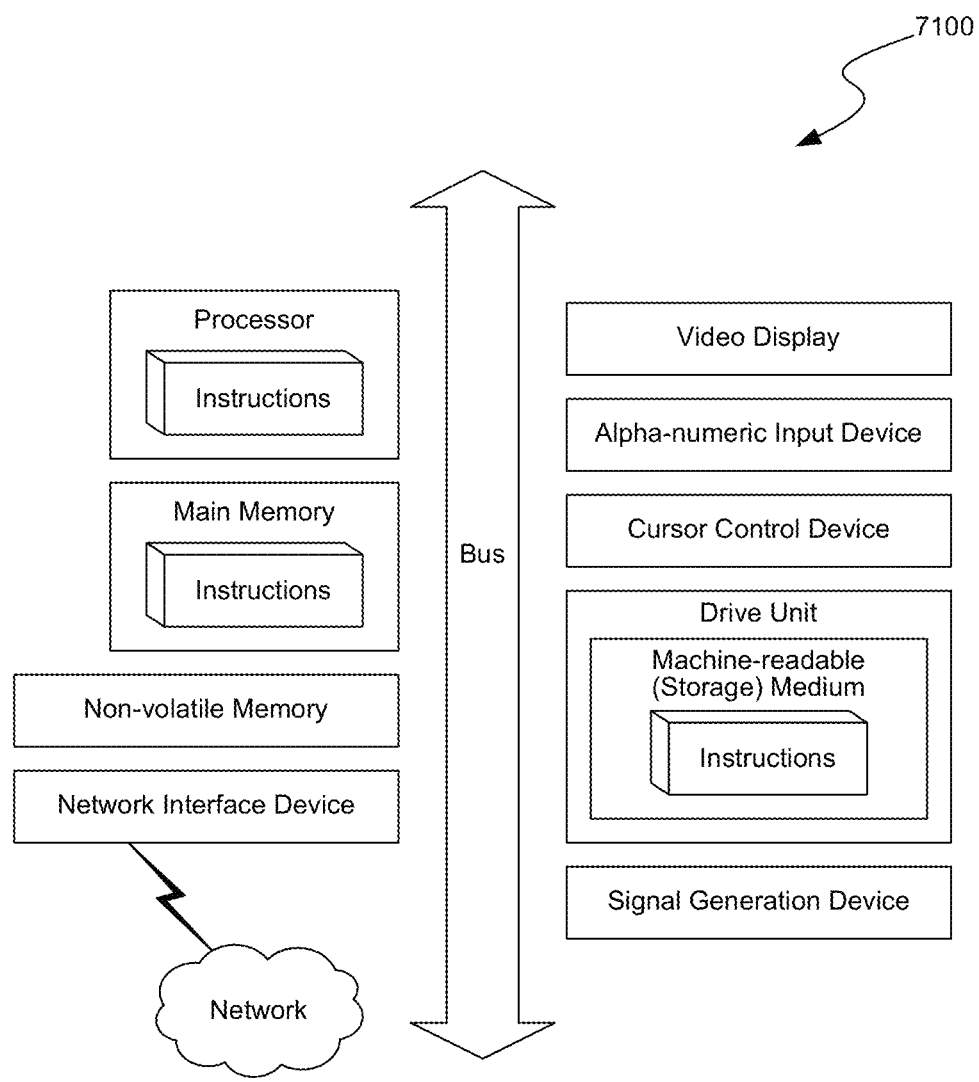
FIG. 71 shows a diagrammatic representation of a machine in the example form of a computer system within which a set of instructions, for causing the machine to perform any one or more of the methodologies discussed herein, may be executed.

FIG. 71 shows a diagrammatic representation of a machine in the example form of a computer system within which a set of instructions, for causing the machine to perform any one or more of the methodologies discussed herein, may be executed.

In the example of FIG. 71, the computer system 7100 includes a processor, memory, non-volatile memory, and an interface device. Various common components (e.g., cache memory) are omitted for illustrative simplicity. The computer system 7100 is intended to illustrate a hardware device on which any of the components depicted in the example of FIG. 1 (and any other components described in this specification) can be implemented. The computer system 7100 can be of any applicable known or convenient type. The components of the computer system 7100 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 7100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1900. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 71 reside in the interface.

In operation, the computer system 7100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A system to manage and configure a computing cluster including a catalog of hosts, the system comprising:
   a plurality of agents deployed to the catalog of hosts,
      wherein the agents are configured to start an in-memory process on each of the catalog of hosts to aggregate statistics associated with each of the catalog of hosts,
      wherein, to aggregate the statistics, the agents are configured to perform a plurality of tests suitable for one or more of: (1) a distributed file storage system jointly operated among the catalog of hosts, (2) a distributed data processing system jointly operated among the catalog of hosts, or (3) a distributed database management system jointly operated among the catalog of hosts,
      wherein the plurality of tests, including a canary test, are configured with one or more configurable thresholds, and
      wherein the agents are further configured to transmit the aggregated statistics and a plurality of heartbeat signals to a server; and
   the server, having a memory and a processor, coupled over a network to the computing cluster, wherein the server, when in operation,
      tracks or updates a data model associated with the catalog of hosts in the computing cluster, wherein the data model specifies one or more of: services assigned to each of the hosts, configurations assigned to each of the hosts, or configurations regarding the deployed agents;
      provides a user interface for inputting configuration settings that are to be deployed among the catalog of hosts in the computing cluster;
      configures the agents deployed to the hosts in the computing cluster based on the configuration settings, wherein the configuration settings include the one or more configurable thresholds;
      tracks the aggregated statistics received from the agents deployed to the hosts over time; and
      depicts on the user interface results from said tracking, wherein the user interface includes a chart that illustrates how the aggregated statistics for a select host changes over time.

2. The system of claim 1, wherein, the server further maintains a history of the health and the performance metrics.

3. The system of claim 1, wherein, the server deploys the agents to each of the hosts and communicates with the agents to send the configuration settings to configure each of the hosts in the computing cluster.

4. The system of claim 3, wherein the agents are further configured to start and stop in-memory processes on each of the hosts to run services that provide distributed storage and distributed processing functionalities which together form the computing cluster.

5. The system of claim 3, wherein, the agents create directories, processes, and files on hosts in a user-specific manner.

6. The system of claim 4, wherein, the server performs health calculations of the hosts based on the statistics collected by the agents.

7. The system of claim 1, wherein, the services include Hadoop services.

8. The system of claim 1, wherein, the data model is stored in a repository coupled to the server, wherein the data model further specifies roles assigned to each of the hosts.

9. The system of claim 3, wherein the data model further specifies monitoring information regarding the in-memory process on each of the hosts.

10. The system of claim 3, wherein
    the configuration settings include configurations for Hadoop services to be run in the computing cluster.

11. The system of claim 3, wherein, the configurations for the Hadoop services are specified via the user interface accessible via a web browser.

12. The system of claim 3, wherein the user interface includes a time selector feature allowing selection of a time range within which to view services, activities, logs, or events, that are recorded in the aggregated statistics with respect to the catalog of hosts.

13. The system of claim 3, wherein the server further provides, via the user interface, enablement of a selection of a service during installation to be run on the catalog of hosts in the computing cluster.

14. The system of claim 10, wherein the server further provides recommended configuration settings of the Hadoop service or the hosts in the computing cluster to run the service; wherein, the recommended configuration settings include suggested ranges for parameters and invalid values for the parameters.

15. The system of claim 3, wherein, the aggregated statistics, after being collected, are transmitted to the server in real time or near real time.

16. The system of claim 3, wherein the aggregated statistics include historical information regarding the computing cluster.

17. The system of claim 3, wherein the server further:
    generates an alert responsive to detecting an event in the computing cluster meeting a criteria.

* * * * *

UNITED STATES PATENT AND TRADEMARK OFFICE
CERTIFICATE OF CORRECTION

PATENT NO. : 9,172,608 B2  
APPLICATION NO. : 13/566943  
DATED : October 27, 2015  
INVENTOR(S) : Philip Zeyliger et al.

Page 1 of 1

It is certified that error appears in the above-identified patent and that said Letters Patent is hereby corrected as shown below:

On the Title Page

In item (56), in column 2, under "Other Publications", line 1, delete "Clouders," and insert -- Cloudera, --, therefor.

On the page 2, in column 2, under "Other Publications", line 18, delete "Applicaiton" and insert -- Application --, therefor.

On the page 2, in column 2, under "Other Publications", line 21, delete "s008," and insert -- 2008, --, therefor.

In the Specification

In column 1, line 16, delete "SYSTEMS"and" and insert -- SYSTEMS" and --, therefor.

In column 1, line 38, delete "configured" and insert -- configured. --, therefor.

In column 8, line 11, delete "changes" and insert -- changes. --, therefor.

In column 11, line 36-37, delete "limits)" and insert -- limits). --, therefor.

In column 11, line 52, delete "configured" and insert -- configured. --, therefor.

In column 12, line 26, delete "example, The" and insert -- example, the --, therefor.

In column 13, line 13, delete "processes" and insert -- processes. --, therefor.

In column 13, line 38, delete "name, The" and insert -- name, the --, therefor.

In column 13, line 61, delete "running" and insert -- running. --, therefor.

In column 15, line 53, delete "computing" and insert -- computing. --, therefor.

In column 16, line 19, delete "page" and insert -- page. --, therefor.

In column 16, line 56, delete "file" and insert -- file. --, therefor.

In column 20, line 2, delete "th" and insert -- the --, therefor.

In column 20, line 51, delete "application" and insert -- application. --, therefor.

In column 20, line 67, delete "Now" and insert -- now --, therefor.

Signed and Sealed this  
Eighth Day of March, 2016

Michelle K. Lee  
*Director of the United States Patent and Trademark Office*